United States Patent
Roger et al.

(10) Patent No.: US 12,221,504 B2
(45) Date of Patent: Feb. 11, 2025

(54) GRAFT POLYMERS, METHODS FOR PREPARING SAME, AND USES THEREOF PARTICULARLY FOR METAL CAPTURE

(71) Applicant: UNIVERSITE PARIS-SACLAY, Saint Aubin (FR)

(72) Inventors: Philippe Gérard Roger, Limours (FR); Mohamad Maaz, Beirut (LB); Bilal Nsouli, Beirut (LB); Tamara Elzein, Beirut (LB); Nadine Barroca, Orsay (FR); Bénédicte Lepoittevin, Orsay (FR)

(73) Assignees: UNIVERSITE PARIS-SACLAY, Saint Aubin (FR); CONSEIL NATIONAL DE LA RECHERCHE, Beirut (LB)

( * ) Notice: Subject to any disclaimer, the term of this patent is extended or adjusted under 35 U.S.C. 154(b) by 1056 days.

(21) Appl. No.: 16/652,818

(22) PCT Filed: Oct. 2, 2017

(86) PCT No.: PCT/FR2017/052706
§ 371 (c)(1),
(2) Date: Apr. 1, 2020

(87) PCT Pub. No.: WO2019/068962
PCT Pub. Date: Apr. 11, 2019

(65) Prior Publication Data
US 2020/0231722 A1    Jul. 23, 2020

(51) Int. Cl.
*C08F 26/06* (2006.01)
*C08F 126/06* (2006.01)
(Continued)

(52) U.S. Cl.
CPC ............ *C08F 26/06* (2013.01); *C08F 126/06* (2013.01); *C08F 226/06* (2013.01);
(Continued)

(58) Field of Classification Search
CPC ...... C08F 126/06; C08F 126/08; C08F 26/06; C08F 26/08; C08F 226/06; C08F 226/08
See application file for complete search history.

(56) References Cited

U.S. PATENT DOCUMENTS

| | | | |
|---|---|---|---|
| 4,199,470 A | | 4/1980 | Yasuda et al. |
| 4,424,359 A | * | 1/1984 | Kaschig .............. C07D 213/22 |
| | | | 546/261 |

(Continued)

FOREIGN PATENT DOCUMENTS

| | | | |
|---|---|---|---|
| WO | WO-2016152996 A1 * | 9/2016 | ............. B01D 15/40 |
| WO | WO2017/085312 | 5/2017 | |

OTHER PUBLICATIONS

International Search Report, PCT/FR2017/052706, dated Jun. 25, 2018.
Qing-Feng Li et al: "Highly luminescent hydrogels synthesized by covalent grafting of lanthanide complexes onto PNIPAM via one-pot free radical polymerization", Journal of Materials Chemistry C: Materials for Optical and Electronic Devices, vol. 4, No. 15, Jan. 1, 2016 (Jan. 1, 2016), pp. 3195-3201, XP055481024, UK, ISSN: 2050-7526, DOI: 10.1039/C6T00033613, Schema 1.
(Continued)

*Primary Examiner* — Ling Siu Choi
*Assistant Examiner* — David L Miller
(74) *Attorney, Agent, or Firm* — NIXON & VANDERHYE

(57) ABSTRACT

Disclosed are novel polymers that are grafted onto a substrate. These polymers contain monomer units derived from 4-vinylpyridine and monomer units derived from a co-monomer. The polymers may be complexed with a metal, and linear or crosslinked. Also disclosed are methods for preparing these polymers by radical polymerisation, as well as to their use for metal capture in aqueous media, particularly uranium capture in seawater or in final nuclear waste from nuclear power plants.

14 Claims, 2 Drawing Sheets

(51) Int. Cl.
    *C08F 226/06*     (2006.01)
    *C08F 259/04*     (2006.01)
    *C08F 259/06*     (2006.01)
    *C08F 292/00*     (2006.01)
    *C08G 63/183*     (2006.01)
    *C08K 5/5419*     (2006.01)
    *C08F 26/08*     (2006.01)
    *C08F 126/08*     (2006.01)
    *C08F 226/08*     (2006.01)

(52) U.S. Cl.
    CPC .......... *C08F 259/04* (2013.01); *C08F 259/06* (2013.01); *C08F 292/00* (2013.01); *C08G 63/183* (2013.01); *C08K 5/5419* (2013.01); *C08F 26/08* (2013.01); *C08F 126/08* (2013.01); *C08F 226/08* (2013.01)

(56) References Cited

U.S. PATENT DOCUMENTS

2004/0076623 A1*   4/2004   Ede ...................... G01N 33/545
                                                                     424/94.1
2018/0050282 A1*   2/2018   Nagai .................. B01J 20/3204

OTHER PUBLICATIONS

Maaz et al. "Surface initiated supplemental activator and reducing agent atom transfer radical polymerization (SI-SARA-ATRP) of 4-vinylpyridine on poly(ethylene terephthalate)", Journal of Colloid and Interface Science 500 (2017) 69-78.

* cited by examiner

GRAFT POLYMERS, METHODS FOR PREPARING SAME, AND USES THEREOF PARTICULARLY FOR METAL CAPTURE

BACKGROUND OF THE INVENTION

Field of the Invention

The present invention relates to novel graft polymers, methods for preparing same, and uses thereof particularly for metal capture.

Description of the Related Art

Uranium, in its current form (mining) is a non-renewable resource whose resources known today represent about a century of consumption. Two possibilities can be exploited to help overcome the uranium shortage:
draw from the oceans dissolved uranium,
recycle used fuel to reduce the loss of fissile material via final waste.

The oceans, with an estimated reserve of 4,500 million tons (nearly 1,000 times the terrestrial reserves) represent an interesting source of nuclear fuel with more than a millennium of consumption. In recent years, research has intensified to discover simple means of recovering uranium from seawater present at 3.3 ppb.

New materials, generally polymers, have been developed for the capture of marine uranium. After being immersed in seawater, these polymers form a uranium-polymer complex, and allow the extraction of uranium from seawater. The reprocessing of these polymers out of water makes it possible to decomplex the uranium and to recover it. But the presence of poisons for polymers reduces the effectiveness of this method. The vanadium present in seawater competes with uranium and complexes with current polymers instead of uranium, which limits the recovery capacity of these polymers.

The recycling of used fuels from nuclear power stations is already integrated into the life cycle of uranium. Currently, the reprocessing of uranium is based on liquid-liquid extraction methods in the presence of complexing compounds such as the DIAMEX or PUREX methods. These techniques use toxic compounds and have a very high cost.

SUMMARY OF THE INVENTION

One aspect of the invention relates to new polymers grafted onto a support and whose polymers can be both solvated and non-solvated depending on the conditions of the medium in which they are found and can easily pass from a state to the other.

Another aspect of the invention relates to new polymers grafted onto a support which are capable of being able to complex with metals, in particular with metals in the trace form in the medium in which they are found.

Another aspect of the invention relates to methods for capturing metals and in particular uranium, in particular in seawater.

Another aspect of the invention relates to a method for the selective capture of uranium in seawater, with high yields.

Another aspect of the invention relates to a method for the reprocessing of spent nuclear fuel for the recovery of unreacted fissile materials.

Another aspect of the invention relates to the use of new polymers grafted on a support and complexed with metals as catalysts in heterogeneous catalysis. Another aspect of the invention relates to the use of new polymers grafted onto a support for labeling cells in the biomedical field, or the labeling of luxury products in the field of combating counterfeiting.

The present invention relates to a composition comprising or consisting of a polymer grafted onto a support, in particular covalently, said polymer having a degree of polymerization n, ranging from 1 to 10,000, and containing n monomer units, said monomer units being:
  either monomer units derived from 4-vinylpyridine, in which the carbons in positions 2 and 6 can be substituted by one of the substituents of the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiol of 1 to 20 carbons, phosphine of 1 to 20 carbons, said substituents can be cyclized with each other and can contain sulfur or phosphorus atoms,
  or monomer units derived from a co-monomer,
  provided that the two substituents cannot both be hydrogen,
  and provided that said monomer units derived from 4-vinylpyridine represent at least 20% of the degree of polymerization n,
said polymer optionally being complexed with a metal,
said polymer being linear or crosslinked,
said polymer being irreversibly linked to a support.

The polymers used in the present invention have the advantage of having different solvation properties as a function of the substituent groups on the monomer units derived from 4-vinylpyridine and of the organization of the constituent monomer units of the polymer. For example, when the substituent groups in positions 2 and 6 of all the monomer units are carboxylic acid groups, the solvation of the polymer, without support, thus obtained varies according to the pH of the solution. In neutral or basic medium, the polymer is solvated in an aqueous medium. In a very acidic aqueous medium, the polymer can no longer be solvated. This property makes it possible to easily vary the solvation of the polymer obtained and thus to change the behavior of the polymer for the capture of metals.

The polymers according to the present invention have the advantage of being grafted onto a support, which makes it possible to easily immobilize these polymers. Thus, the recovery of these polymers in solution or their conservation in the reactor is facilitated compared to free polymers, in particular in the case of heterogeneous catalysis.

The polymers according to the present invention comprise more than 20% of monomer units derived from 4-vinylpyridine, in particular more than 30%, in particular more than 40%, in particular more than 50%, in particular more than 60%, in particular more than 70%, in particular more than 80%, in particular more than 90% and in particular 100%.

The polymers according to the present invention are adaptable and can be optimized according to the difficulties encountered. For example, in the case where the substituent groups in positions 2 and 6 are very bulky, a spacer co-monomer can be added at significant ratios (>50%) to limit the steric hindrance around the monomer units derived from 4-vinylpyridine.

The polymers according to the present invention can comprise:

a) either a single type of monomer units derived from 4-vinylpyridine, without a monomer unit derived from a co-monomer, the polymer is then a homopolymer,
b) or a single type of monomer units derived from 4-vinylpyridine, and a single type of monomer units derived from a co-monomer, the polymer is then a copolymer,
c) or a single type of monomer units derived from 4-vinylpyridine, and several types of monomer unit derived from a different co-monomer, the polymer is then a copolymer,
d) or several different types of monomer units derived from 4-vinylpyridine, without a monomer unit derived from a co-monomer,
e) or several types of monomer units derived from 4-vinylpyridine, and only one type of monomer units derived from a co-monomer, the polymer is then a copolymer,
f) or several types of monomer units derived of different 4-vinylpyridine, and several types of monomer units derived from a different co-monomer. The polymer is then a copolymer.

The polymers according to the present invention are complexed or not with a metal, for example a complex

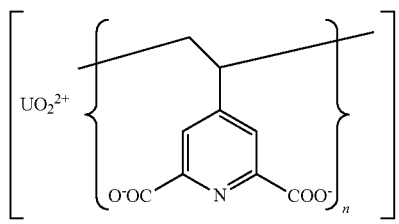

each monomer unit may or may not be complexed with a metal independently of each other.

According to the present invention, the term "polymer" means a chain of monomer units. The number of monomer units forming a polymer, according to the present invention, can be equal to 1. Thus, a monomer grafted onto a support forms part of the invention. In what follows, the term polymer does not include the support.

According to the present invention, the term "support" means a material to which the polymer is linked, either directly or indirectly, and which makes it possible to immobilize said polymer. Said support is either directly usable for the synthesis of the polymer, or capable of being transformed in order to be able either to graft a polymer of the invention, or to be usable for the synthesis of the polymer. The support is stable and insoluble under the conditions of storage and under the conditions of use of the polymer.

According to the present invention, the term "polymer grafted on a support" means the assembly formed by the polymer, the support on which said polymer is stored and the optional link between said polymer and said support if the link is indirect.

According to the present invention, the term "homopolymer" means a polymer in which all the constituent monomer units of the polymer have the same formula, that is to say that all the monomer units are monomer units derived from 4-vinylpyridine and all the monomer units derived from 4-vinylpyridine have the same substituent groups respectively in position 2, and in position 6. The metals optionally complexed on the monomer units can vary within the same homopolymer. The conjugate forms of the same acid/base couple are considered to be identical for the concept of homopolymer. For example, a polymer having a COOH group on a first monomer unit and a COO⁻ group on a second monomer unit will remain to be considered as a homopolymer.

According to the present invention, the term "copolymer" means a polymer in which at least one monomer unit is derived from a co-monomer and at least one monomer unit is derived from 4-vinylpyridine.

According to the present invention, with "a 4-vinylpyridine derivative" is understood a compound of Formula

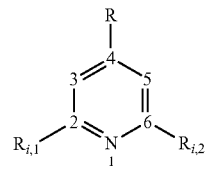

in which $R_{i,1}$ and $R_{i,2}$ may be substituted by one of the substituents of the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amino of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents being able to be cyclized with one another and optionally containing sulfur or phosphorus atoms.

According to the present invention a "monomer derived from 4-vinylpyridine" means a compound of Formula

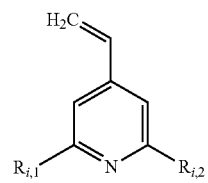

in which the definitions of $R_{i,1}$ and $R_{i,2}$ are as indicated above.

According to the present invention, the term "co-monomer" means a compound of formula

in which $B_i$ is different from a 4-vinylpyridine derivative.

According to the present invention, the term "monomer unit derived from 4-vinylpyridine" means the basic brick

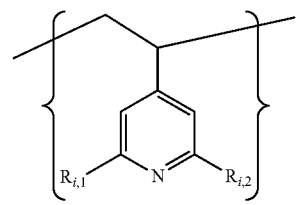

which constitutes the polymer and whose definitions of $R_{i,1}$ et $R_{i,2}$ are as indicated above.

According to the present invention, the term "monomer unit derived from a co-monomer" means the basic brick of formula

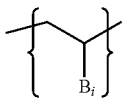

constitutes the polymer and in which $B_i$, is different from a 4-vinylpyridine derivative.

According to the present invention, the term "linked to a support irreversibly" means that the polymer cannot be detached from the support under the conditions of use.

According to the present invention, the term "linear polymer" means a polymer in which all of the monomer units are linked in a single direction forming a chain without branching or crosslinking.

According to the present invention, the term "crosslinked polymer" means a polymer in which at least two linear polymers are linked together by at least one crosslinking bridge, said crosslinking bridge being formed by a monomer unit derived from a-co-monomer belonging to at least one of the two linear polymers and said monomer unit derived from a co-monomer being linked by covalent link to the carbon chain of the other linear polymer.

According to the present invention, the term "carbon chain" is understood to mean the series of linear carbon formed during the polymerization by the carbon-carbon double bonds of the monomers which constitute the polymer.

According to the present invention, the term "alkyl radical of 1 to 20 carbons" means an acyclic carbon chain, saturated, linear or branched, comprising from 1 to 20 carbon atoms. Examples of alkyl radicals of 1 to 20 carbons include methyl, ethyl, propyl, butyl groups . . . . Within the alkyl radical, one or more hydrogens can be substituted by a group chosen from: halogen, hydroxyl, alkoxyl, amino, nitro, cyano, trifluoro, carboxylic acid, carboxylic ester, phosphine, thiols . . .

According to the present invention, the term "alkene radical of 2 to 20 carbons" means an acyclic carbon chain, linear or branched, comprising from 2 to 20 carbon atoms and comprising at least one carbon-carbon double bond. Examples of alkene radicals of 2 to 20 carbons include ethenyl, propenyl, butenyl, . . . Within the alkene radical, one or more hydrogens can be substituted by a group chosen from: halogen, hydroxyl, alkoxyl, amino, nitro, cyano, trifluoro, carboxylic acid, carboxylic ester, phosphine, thiols . . .

According to the present invention, the term "aryl radical of 2 to 20 carbons" means a carbon chain comprising at least one saturated or partially saturated ring and, comprising from 2 to 20 carbon atoms, without heteroatoms in the rings.

Examples of aryl radicals of 2 to 20 carbons include phenyl, benzyl, . . . Within the aryl radical, one or more hydrogens can be substituted by a group chosen from: halogen, hydroxyl, alkoxyl, amino, nitro, cyano, trifluoro, carboxylic acid, carboxylic ester, phosphine, thiols . . .

According to the present invention, the term "heterocycle of 1 to 5 rings" means a carbon chain comprising from 1 to 5 saturated or partially saturated rings, having at least one ring which contains a different carbon atom to form the ring and comprising from 2 to 20 carbon atoms. Examples of heterocycle comprising 2 to 20 carbons include pyrrolidinyl, piperidinyl . . . . Within the heterocycle, one or more hydrogens can be substituted by a group chosen from: halogen, hydroxyl, alkoxyl, amino, nitro, cyano, trifluoro, carboxylic acid, carboxylic ester, phosphine, thiol . . .

According to the present invention, the term "thiols of 1 to 20 carbons" means a carbon chain comprising from 1 to 20 carbons of formula $SR_2$.

According to the present invention, the term "phosphine of 1 to 20 carbons" means a carbon chain comprising from 1 to 20 carbons of formula $PR_3$.

According to a particular embodiment, the composition of the invention, as defined above, comprises or consists of a polymer grafted on a support, in particular covalently, having a degree of polymerization n, ranging from 1 to 10,000, and containing n monomer units, said monomer units being:

either monomer units derived from 4-vinylpyridine, in which the carbons in positions 2 and 6 can be substituted by one of the substituents of the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 cycles in which the heteroatom is either nitrogen, or oxygen, or sulfur, or phosphorus, amide of 1 to 20 carbons, thiols of 1 to 20 carbons, phosphine of 1 to 20 carbons, said substituents can be cyclized with each other and can contain sulfur or phosphorus atoms, or monomer units derived from a co-monomer, provided that when one of the substituents chosen represents either hydrogen, or an alkyl radical of 1 to 4 carbons, or an aryl radical of 1 to 4 carbons, or an alkene radical of 1 to 4 carbons, the other substituent is different from hydrogen, the alkyl radical of 1 to 4 carbons, the aryl radical of 1 to 4 carbons, and the alkene radical of 1 to 4 carbons, and provided that said monomer units derived from 4-vinylpyridine represent at least 20% of the degree of polymerization n, said polymer optionally being complexed with a metal, said polymer being linear or crosslinked, said polymer being irreversibly linked to a support. According to a particular embodiment, the composition of the invention as defined above, comprises or consists of a polymer grafted on a support and having one or more types of monomer units derived from 4-vinylpyridine and one or more types of monomer units derived from a co-monomer, said polymer being complexed or not with one or more different metals.

The composition according to the invention comprises or consists of a polymer grafted on a support, of Formula I, Formula I

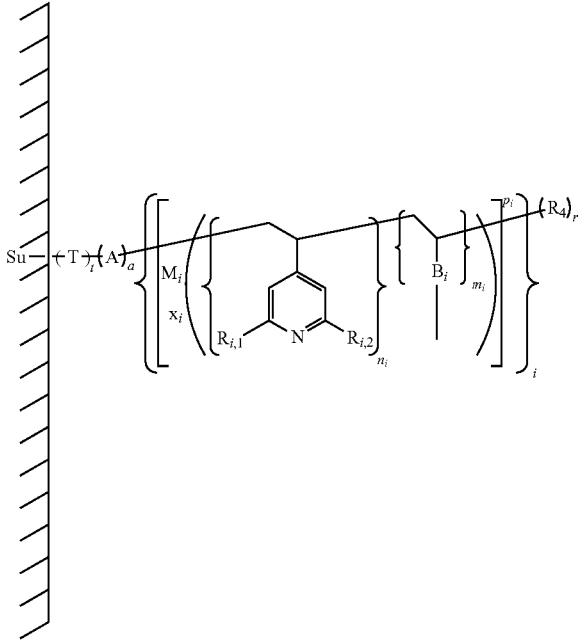

in which:
Su is the support on which the polymer is grafted,
A is a compound derived from a polymerization initiator,
T is a compound making the link between the support and the optional compound resulting from a polymerization initiator or between the support and the first monomer unit,
$R_4$ is a compound allowing the propagation of the polymerization, whether or not derived from said polymerization initiator, or allowing the termination of the polymerization, or a transfer agent,
t, a and r are identical or different and are worth 0 or 1,
i is a strictly positive, indexed integer varying from 1 to n, itself included from 1 to 10,000, and for each i:
$R_{i,1}$ and $R_{i,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and optionally containing sulfur or phosphorus atoms,
provided that when $R_{i,1}$ represents hydrogen, then $R_{i,2}$ is different from hydrogen, and vice versa,
$B_i$ is a monomer unit derived from a co-monomer, whether or not forming a crosslinking bridge,
$M_i$ is a metallic cation,
$n_i$ et $m_i$, are integers equal to 0 or 1,
$n_i+m_i=1$,
$x_i$ is a number from 0 to 6,
$p_i$ is the electrical charge of the metal complex ranging from −6 to +6,
said polymer being linear when there is no $B_i$ forming a crosslinking bridge, said polymer being crosslinked when there is at least one $B_i$ forming crosslinking bridge between two linear polymers.

In this embodiment, the polymer grafted onto a support of Formula I can be, for example:
a copolymer comprising at least one type of monomer units derived from 4-vinylpyridine and at least one type of monomer units derived from a co-monomer,
a polymer comprising at least two types of monomer units derived from 4-vinylpyridine and without monomer unit derived from a co-monomer,
a homopolymer comprising a single type of monomer units derived from 4-vinylpyridine
said polymer optionally being complexed or not with metals.

In this embodiment, the polymer grafted onto a support of Formula I can take any form of organization of copolymers, in particular a random copolymer, a block copolymer, a periodic copolymer, or a random copolymer. These polymers can themselves be linear or crosslinked and complexed or not with metals.

In this embodiment, each monomer unit which forms the grafted polymer on a support of Formula I can be electrically charged, positively or negatively depending on the monomer unit and the presence or absence of a complexed metal itself charged.

In this embodiment, the support is covalently linked to the polymer:
either directly,
or by means of a single compound T making the link between the support and the polymer,
or by means of a single compound A derived from a polymerization initiator and making the link between the support and the polymer,
or via a compound T linked to a compound A derived from a polymerization initiator and serving as link between the support and the polymer,
and the end of the polymer is:
either the last carbon in the polymer chain, which implies r=0 in Formula I,
or a compound allowing the propagation of the polymerization such as for example a chlorine atom Cl,
or a compound allowing the termination of the polymerization,
or a transfer agent such as, for example, benzyl benzodithioate.

In this embodiment, the compound T can be:
a compound from the support, and/or
a chemical compound that modifies the surface of the support to create surface binding sites.

In this embodiment, for example, when the support is silica $SiO_2$, the surface of said support is pretreated with a mixture of $H_2SO_4/H_2O_2$, which allows the formation of SiOH site on the surface of the support. In this case, the compound T (here SiOH) is a compound derived from the support.

In this embodiment, for example, when the support is polyethylene terephthalate (PET), the surface of said support is pretreated with polyethyleneimine. This compound splits support surface bonds and binds to the support, which creates many $NH_2$ and NH bond sites on the surface of the pretreated support. In this case, the compound T consists of a chemical compound which modifies the surface and of a compound derived from the support.

According to the present invention, the term "binding site" means sites located on the surface of the support and on which compounds can come to link, in particular polymerization initiators or monomer units or a polymer of the present invention.

According to the present invention, the term "polymerization initiator" means a compound which makes it possible to initiate polymerization. The monomers, which constitute the final polymer, react on this compound after its initiation.

According to the present invention, the term "compound permitting the propagation of the polymerization" means a compound capable of reacting with a monomer to increase the degree of polymerization of the polymer in formation by one.

According to the present invention, the term "compound allowing the termination of the polymerization" means a compound incapable of reacting with a monomer to continue the polymerization and incapable of being primed again.

According to the present invention, the term "transfer agent" means a compound incapable of reacting alone with a monomer to continue the polymerization, but which can be activated by a radical compound of the reaction medium and become a compound allowing the propagation of polymerization. As RAFT "transfer agent", there may be mentioned, for example, a compound of formula R—S—C(=S)—Z such as benzyl benzodithioate.

According to a particular embodiment, the composition of the invention as defined above, comprises or consists of a polymer grafted on a support and having one or more types of monomer units derived from 4-vinylpyridine and one or more types of monomer units derived from a co-monomer, said polymer being complexed or not with one or more different metals, being linear and being non-crosslinked.

The composition according to the invention comprises or consists of a polymer grafted on a support, of Formula II,

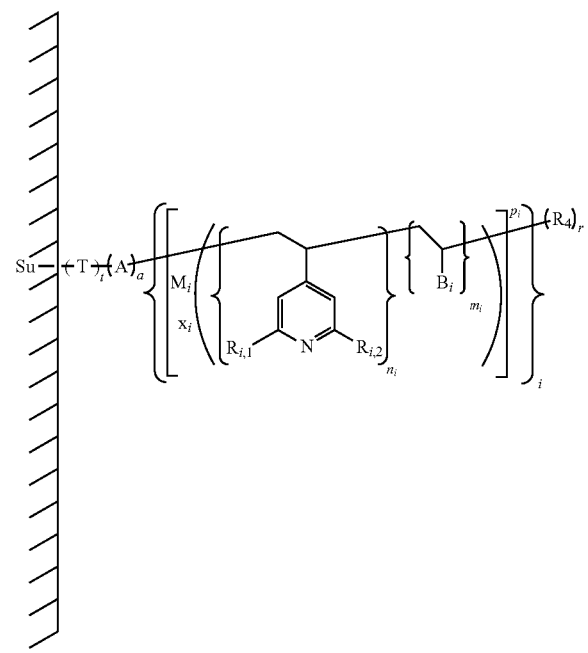

Formula II in which
the definitions of Su, $R_{i,1}$, $R_{i,2}$, T, A, $n_i$, $m_i$, $R_4$, $M_i$, t, a, r, $x_i$, $p_i$ and i are as described in Formula I,
$B_i$ is a monomer unit derived from a co-monomer, not forming a crosslinking bridge.

In this embodiment, the absence of crosslinking makes it possible to increase the solvation of the polymers.

According to a particular embodiment, the composition of the invention as defined above, comprises or consists of a polymer grafted on a support and having one or more types of monomer units derived from 4-vinylpyridine and not having monomer units derived from a co-monomer, said polymer being complexed or not with one or more different metals, being linear and being non-crosslinked.

The composition according to the invention comprises or consists of a polymer grafted on a support of Formula III, Formula III

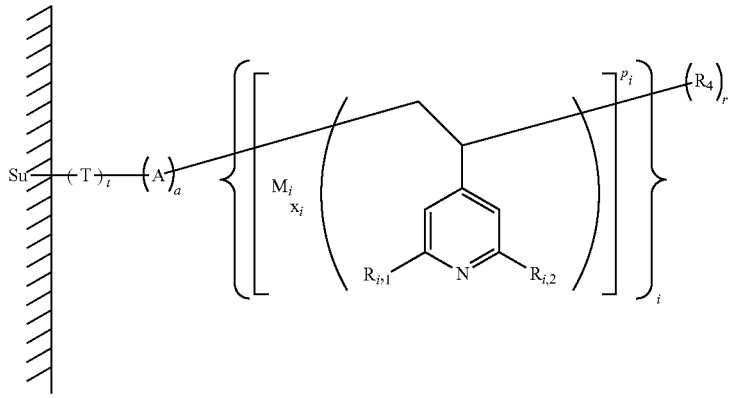

in which:

the definitions of Su, $R_{i,1}$, $R_{i,2}$, T, A, $R_4$, $M_i$, t, a, r, $x_i$, $p_i$ and i are as described in Formula I.

In this embodiment, the absence of co-monomer makes it possible to increase the capacity for capture of metals by the polymer grafted on a support. If 100% of the monomer units are monomer units derived from 4-vinylpyridine, the two substituent groups in positions 2 and 6 of which are carboxylic acid groups, the capacity for complexing with the metal is doubled, compared with the capacity for complexing a polymer containing 50% of monomer units derived from co-monomers.

In this embodiment, the possibility of having several monomer units derived from the different 4-vinylpyridine makes it possible to complex different metals according to the monomer units or to complex the same metal differently according to the monomer units. These differences make it possible to obtain different catalytic sites on the same polymer and thus to carry out catalytic reactions requiring several different catalytic sites with a single catalyst.

According to a particular embodiment, the composition of the invention as defined above, comprises or consists of a polymer grafted on a support and a single type of monomer units derived from 4-vinylpyridine and not having monomer units derived from a comonomer, said polymer being complexed or not with one or more different metals, being linear and being non-crosslinked.

The composition according to the invention comprises or consists of a polymer grafted on a support, of Formula IV in which:

the definitions of Su, T, A, $R_4$, $M_i$, t, a, r, $x_i$, $p_i$ and i are as described in Formula I, $R_{i,1}$ and $R_{i,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and optionally containing sulfur or phosphorus atoms, provided that when $R_1$ represents hydrogen, then $R_2$ is different from hydrogen, and vice versa.

In this embodiment, the polymer grafted onto a support of Formula IV is a homopolymer.

In this embodiment, the polymer grafted on a support can be optimized for a single action. For example, the polymer comprising only monomer units derived from 4-vinylpyridine, the two substituent groups in positions 2 and 6 of which are carboxylic acid groups, exhibits optimal activity for the capture of uranyl ions in aqueous solution.

Formula IV

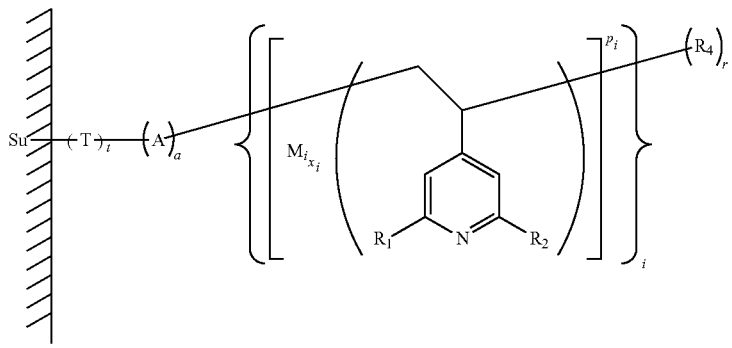

According to a particular embodiment, the composition of the invention as defined above, comprises or consists of a polymer grafted on a support and a single type of monomer units derived from 4-vinylpyridine, of which the two substituent groups in positions 2 and 6 are carboxylic acid groups, and having no monomer units derived from a co-monomer, said polymer being complexed or not with a single metal, being linear and being non-crosslinked.

The composition according to the invention comprises or consists of a homopolymer of chelidamic acid grafted onto a support, of Formula V,

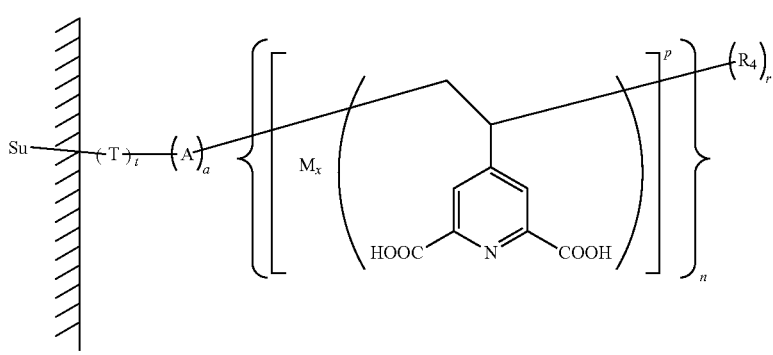

Formula V in which:

the definitions of Su, T, A, $R_4$, t, a, and r are as described in Formula I,

M is a metallic cation, x is a number comprised from 0 to 6, p is the electrical charge of the metal complex ranging from −6 to +6.

In this embodiment, the polymer grafted on a support of Formula V is a homopolymer with a single type of monomer units derived from 4-vinylpyridine, the two substituent groups in positions 2 and 6 of which are carboxylic acid groups.

In this embodiment, the constituent monomer units of the polymer grafted onto a support of Formula V are either all complexed with the same metal, or all not complexed.

In this embodiment, the constituent monomer units of the polymer grafted onto a support of Formula V all have the same electrical charge.

In this embodiment, the constituent polymers of Formula V have the advantage of being able to easily solvate in an aqueous medium, with a solvency dependent on the pH conditions of the medium and with an ability to complex with the metals optionally present in the solution.

According to a particular embodiment, the composition of the invention as defined above, comprises or consists of a polymer grafted on a support and a single type of monomer units derived from 4-vinylpyridine, of which the two substituent groups in positions 2 and 6 are carboxylic acid groups, and having no monomer units derived from a co-monomer, said polymer being uncomplexed, being linear and being non-crosslinked.

The composition according to the invention comprises or consists of a homopolymer of chelidamic acid grafted onto a support, of Formula VI,

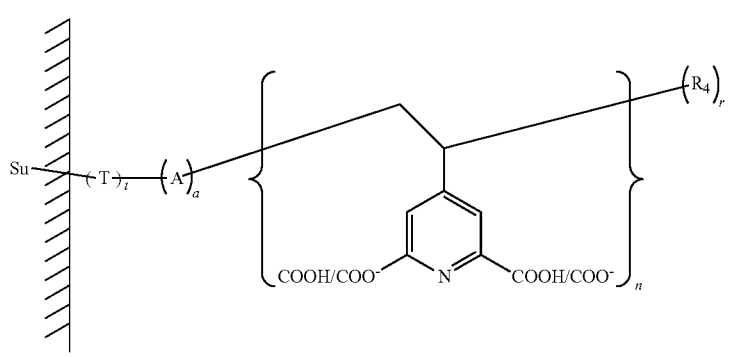

Formula VI in which:

the definitions of Su, T, A, $R_4$, t, a, and r are as described in Formula I, in particular the polymers, grafted on a support, of Formula VII, Formula VIII, Formula IX, Formula X, Formula XI,

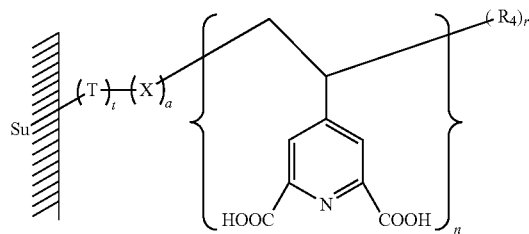
Formula VII
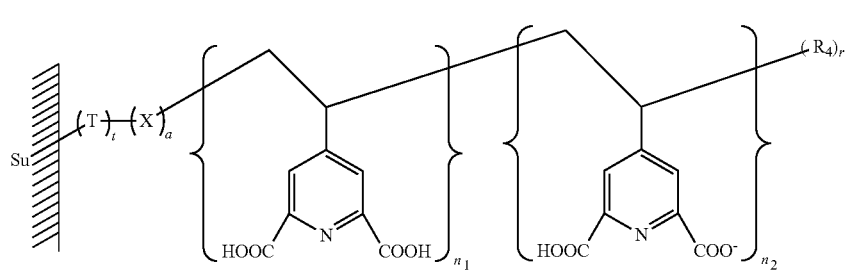
Formula VIII
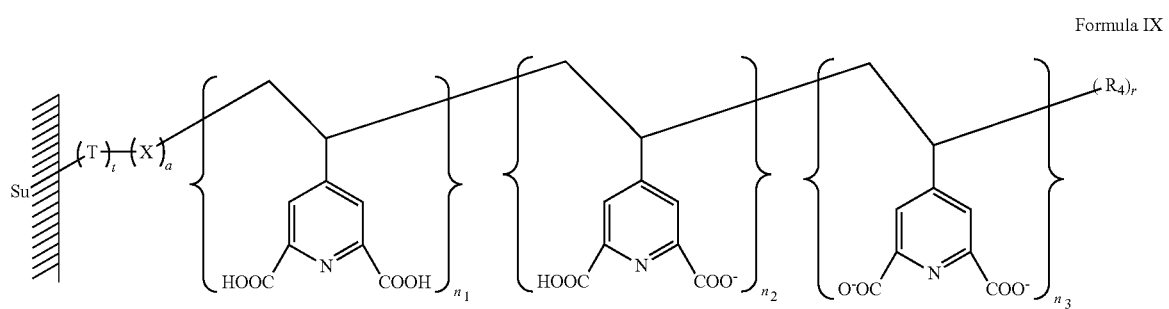
Formula IX
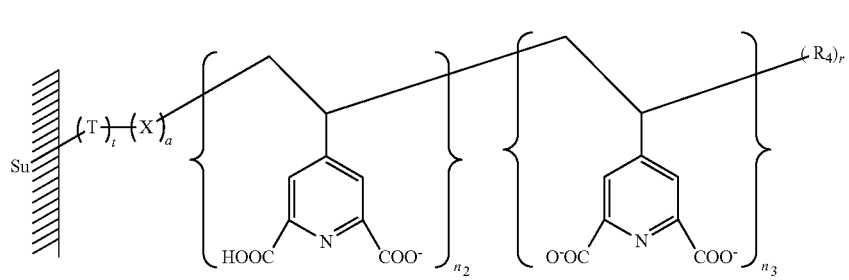
Formula X
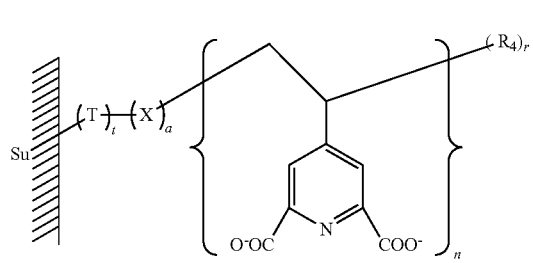
Formula XI in which:
the definitions of $R_4$, A, T, a, t and r are as described in Formula I,
M, and m are non-zero integers,
in the Formula VIII, $n_1+n_2=n$,
in Formula IX, $n_1+n_2+n_3=n$,
in Formula X, $n_2+n_3=n$.

In this embodiment, the polymer grafted onto a support of Formula VI is a homopolymer comprising a single type of monomer units derived from 4-vinylpyridine, the two substituent groups in positions 2 and 6 of which are carboxylic acid groups, not complexed with a metal.

In this embodiment, the polymer grafted onto a support of Formula VI varies according to the pH of the solution in which the polymer is found. The polymer grafted onto a support of Formula VI thus has one of the following formulas:
in a very acidic medium, the polymer grafted on a support of Formula VII,
by slightly increasing the pH, the polymer grafted on a support of Formula VIII,
by continuing to increase the pH, the polymer grafted on a support of Formula IX,
by continuing to increase the pH, the polymer grafted on a support of Formula X,
in neutral and basic medium, the polymer grafted on a support of Formula XI.

In this embodiment, the $n_1/n_2$ ratio of the polymer grafted on a support of Formula VIII; the $n_1/n_2$ and $n_1/n_3$ ratios of the polymer grafted onto a support of Formula IX and the $n_2/n_3$ ratio of the polymer grafted onto a support of Formula X depend on the pH of the solution. The variation in the ratios between $n_1$, $n_2$ and $n_3$ for the polymers of Formula VIII, Formula IX and Formula X, has an impact on the overall charge of the polymer, the capacity of the polymer to solvate, as well as on the capacity of the polymer to complex metals.

According to a particular embodiment, the composition of the invention as defined above, comprises or consists of a polymer grafted on a support and a single type of monomer units derived from 4-vinylpyridine, of which the two substituent groups in positions 2 and 6 are methyl ester groups, and having no monomer units derived from a co-monomer, said polymer being uncomplexed, being linear and being non-crosslinked.

The composition according to the invention comprises or consists of a homopolymer grafted on a support, of Formula XII,

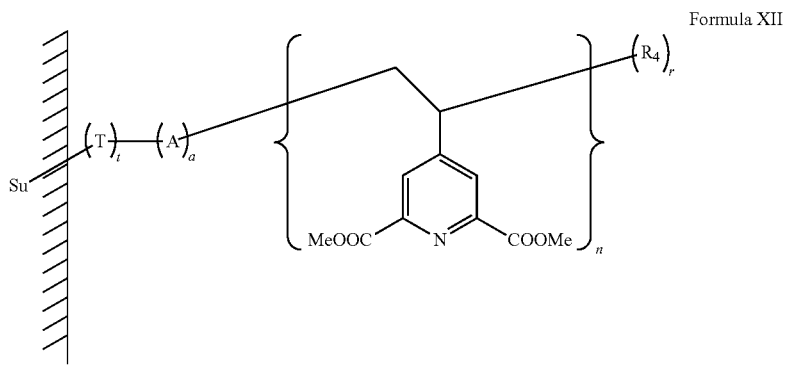

Formula XII in which:
the definitions of Su, T, A, $R_4$, t, a, and r are as described in Formula I.

In this embodiment, the polymer grafted on a support of Formula XII is a homopolymer with a single type of monomer units derived from 4-vinylpyridine, the two substituent groups in positions 2 and 6 of which are methyl ester groups.

In this embodiment, no monomer unit constituting the polymer grafted on a support of Formula XII is complexed with a metal.

In this embodiment, the polymer thus obtained is solvated in organic solution such as DMSO and acetonitrile. This property allows easier polymerization of the monomer derived from 4-vinylpyridine, the two substituent groups in positions 2 and 6 of which are methyl ester groups.

According to a particular embodiment, the composition of the invention as defined above, comprises or consists of a polymer grafted on a support and a single type of monomer units derived from 4-vinylpyridine, of which the two substituent groups in positions 2 and 6 are carboxylic acid groups, and having no monomer units derived from a comonomer, said polymer being complexed with uranium, being linear and being non-crosslinked.

The composition according to the invention comprises or consists of a homopolymer of chelidamic acid, complexed with uranium, and grafted on a support, of Formula XIII, Formula XIII
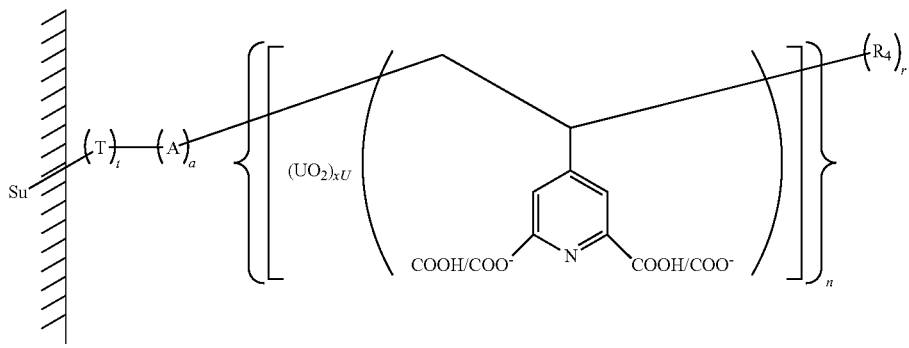
in which:
the definitions of Su, T, A, R$_4$, t, a, and r are as described in Formula I,
xU is a rational number comprised from 0 to 6, in particular polymers, grafted onto a support of Formula VII, Formula XIV, Formula XV, Formula X
Formula VII
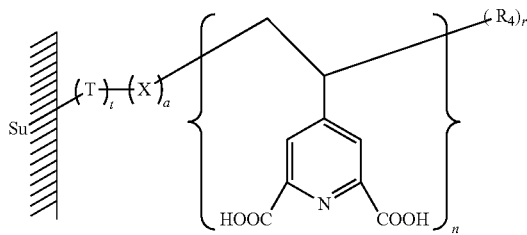
Formula XIV
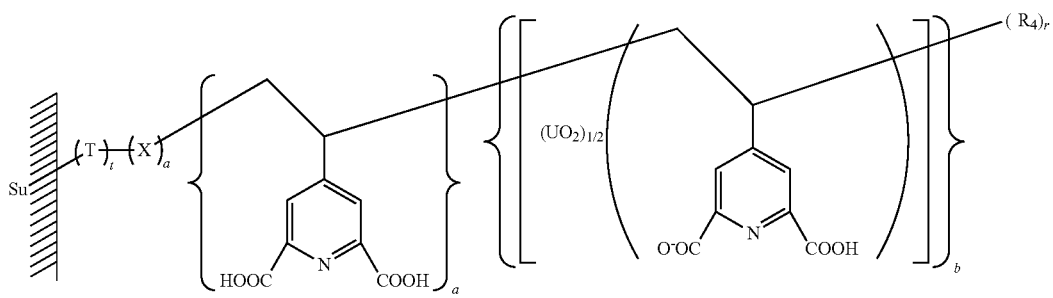
Formula XV
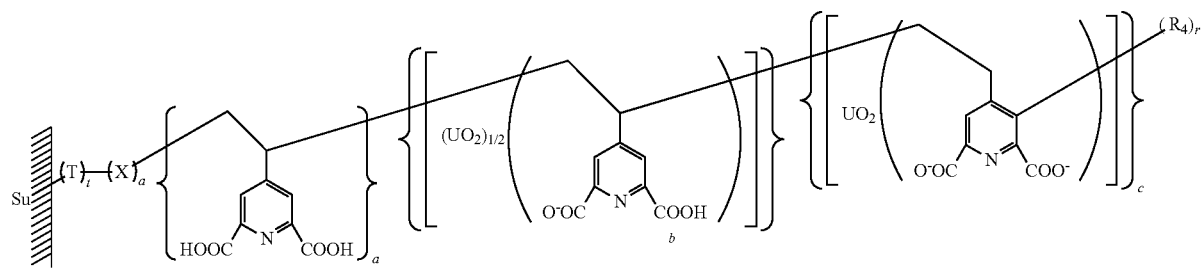

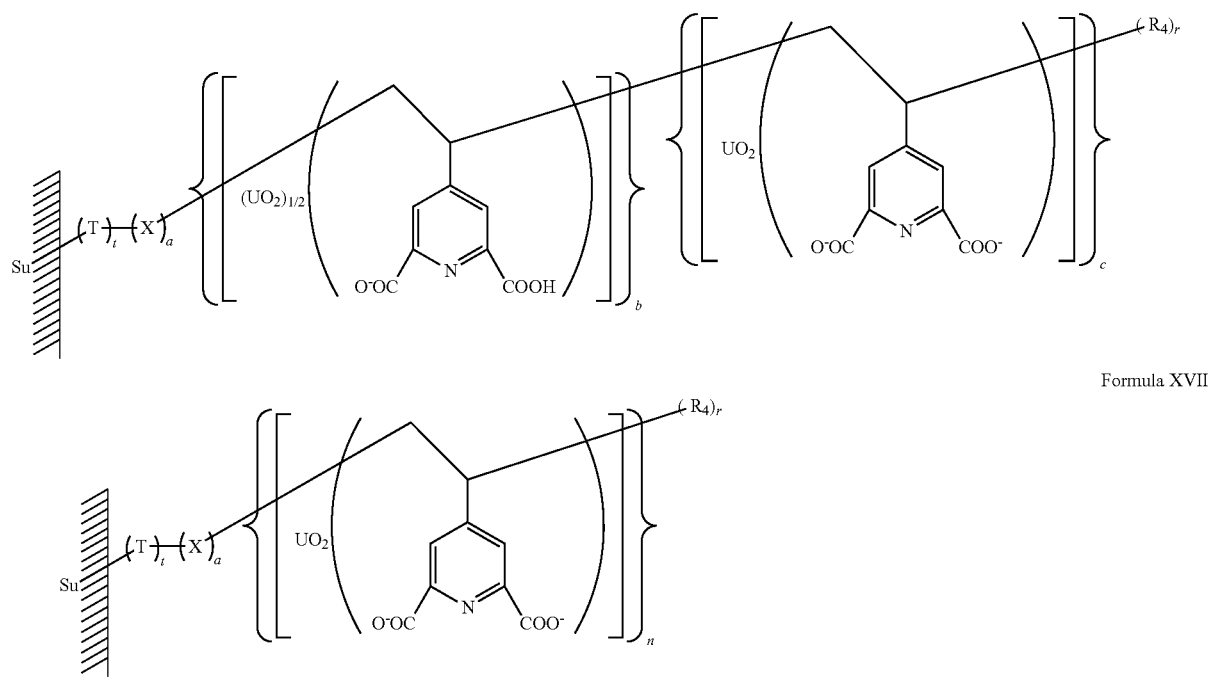

Formula XVI

Formula XVII in which:
the definitions of Su, T, A, R$_4$, t, a, and r are as described in Formula I,
n$_1$, n$_2$ and n$_3$ are non-zero integers,
in Formula XIV, n$_1$+n$_2$=n,
in Formula XV, n$_1$+n$_2$+n$_3$=n,
in Formula XVI, n$_2$+n$_3$=n.

In this embodiment, the polymer grafted on a support of Formula XIII is a homopolymer grafted on a support, comprising a single type of monomer units derived from 4-vinylpyridine, of which the two substituent groups in positions 2 and 6 are carboxylic acid groups, and in which each monomer unit forms or not a complex with a uranyl cation.

In this embodiment, the polymer grafted onto a support of Formula XIII varies according to the pH of the solution in which the polymer is found. The polymer grafted onto a support of Formula XIII thus has one of the following formulas:

In a very acidic medium, the polymer grafted onto a support of Formula VII,
by slightly increasing the pH, the polymer grafted onto a support of Formula XIV,
by continuing to increase the pH, the polymer grafted onto a support of Formula XV,
by continuing to increase the pH, the polymer grafted onto a support of Formula XVI,
in neutral and basic medium, the polymer grafted onto a support of Formula XVII.

In this embodiment, the n$_1$/n$_2$ ratio of the polymer grafted onto a support of Formula XIV; the n$_1$/n$_2$ and n$_1$/n$_3$ ratios of the polymer grafted onto a support of Formula XV and the n$_2$/n$_3$ ratio of the polymer grafted onto a support of Formula XVI depend on the pH of the solution.

The variation in the ratios between n$_1$, n$_2$ and n$_3$ for the polymers, grafted onto a support, of Formula XIV, Formula XV and Formula XVI, has an impact on the overall charge of the polymer, the capacity of the polymer to solvate, as well as the capacity of the polymer to complex metals.

In this embodiment, for example, in a neutral pH solution containing uranyl ions, the constituent polymer of Formula V solvates and becomes the constituent polymer of Formula XI. This polymer complexes with uranyl ions and becomes the constituent polymer of Formula XVII which precipitates. The constituent polymer of Formula XVII is then placed in an aqueous solution with a very acidic pH. The polymer reacts and releases uranyl ions while the polymer becomes the constituent polymer of Formula VII. The constituent polymer of Formula VII can no longer be solvated and precipitates.

According to a particular embodiment, the composition of the invention, as defined above, comprises or consists of a polymer grafted on a support, said polymer having at least one monomer unit derived from a co-monomer, in particular monomer units derived from styrene, acrylic acid or tert-butyl acrylate.

In this embodiment, the polymer contains at least one monomer unit derived from a co-monomer and in particular, the co-monomer is either styrene, or acrylic acid, or tert-butyl acrylate.

In this embodiment, the co-monomers can act:
as a spacer by reducing the steric hindrance around the monomer units derived from 4-vinylpyridine which can allow easier access of metals to the complexing sites, or
as an agent for modifying the properties of the polymer, in particular radiation resistance or thermal resistance.

According to a particular embodiment, the composition of the invention, as defined above, comprises or consists of a copolymer grafted on a support, in which the level of monomer units derived from a co-monomer varies from a value strictly greater than 0% to a value lower than 80%.

In this embodiment, the polymer contains at least one monomer unit derived from a co-monomer, but the proportion of monomer units derived from a co-monomer can take all the values from a value strictly greater than 0 up to 80%, in particular from a value strictly greater than 0 to 10%, from a value strictly greater than 0 to 20%, from a value strictly greater than 0 to 30%, from a value strictly greater than 0 to 40%, from a value strictly greater than 0 to 50%, from a value strictly greater than 0 to 60%, from a value strictly greater than 0 to 70% or from a value strictly greater than 0 to 80%.

According to a particular embodiment, the composition of the invention as defined above, comprises or consists of a polymer grafted on a support, having a single type of monomer units derived from 4-vinylpyridine and a single type of monomer units derived from a co-monomer, said polymer being not complexed by a metal, being linear, being non-crosslinked, and being polymerized by blocks.

The composition according to the invention comprises or consists of a two-block copolymer grafted onto a support, said polymer being of Formula XVIII, In this embodiment, the polymer is polymerized in the form of blocks, with a first block containing all the monomer units derived from a co-monomer, and a second block containing all the monomer units derived from 4-vinylpyridine.

In this embodiment, the polymer has the characteristics and properties of each block. If the support is not stable in water but the grafted polymer must be used in an aqueous medium, a hydrophobic block near the support makes it possible to protect the support from the action of water while the external block can be active in the aqueous medium. According to a particular embodiment, the composition of the invention as defined above, comprises or consists of a polymer grafted on a support, having:

either a single type of monomer units derived from 4-vinylpyridine, the two substituent groups in positions 2 and 6 of which are methyl ester groups, and a single type of monomer units derived from a co-monomer, Formula XVIII

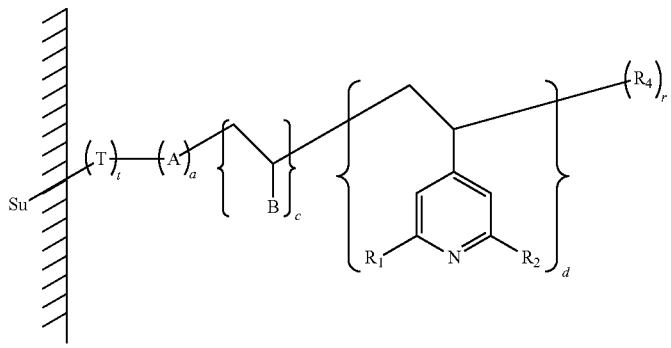

in which:

The definitions of Su, T, A, $R_1$, $R_2$, $R_4$, t, a, and r are as described in the Formula IV, B is a monomer unit derived from a co-monomer, d is the degree of polymerization of the block consisting of the monomer units derived from 4-vinylpyridine and d is an integer, c is the degree of polymerization of the block consisting of the monomer units derived from the co-monomer and c is an integer, d+c=n.

According to the present invention, the term "block copolymer" means a polymer in which at least one monomer unit is derived from a co-monomer and in which the monomer units of identical formula are linked to one another.

styrene, said polymer being not complexed by a metal, being linear, being non-crosslinked, and being block polymerized, or a single type of monomer units derived from 4-vinylpyridine, the two substituent groups in positions 2 and 6 of which are carboxylic acid groups, and a single type of monomer units derived from a co-monomer, styrene, said polymer being not complexed by a metal, being linear, being non-crosslinked, and being block polymerized.

The composition according to the invention comprises or consists of a two-block copolymer, grafted on a support, said polymer being of Formula XIX or of Formula XIX b, Formula XIX

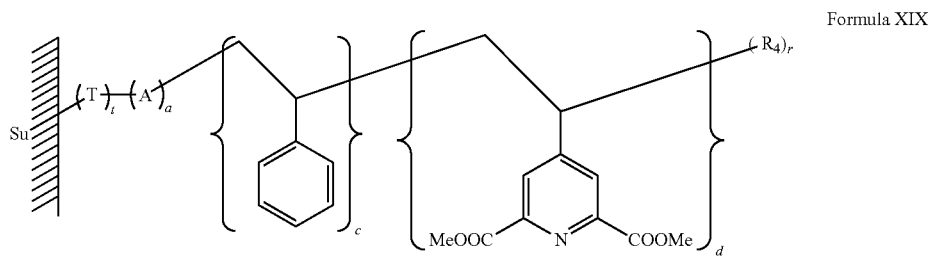

-continued

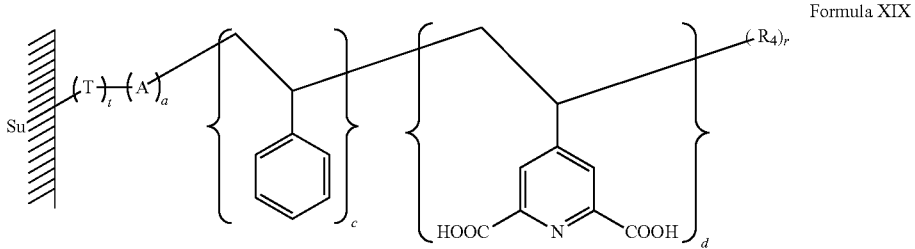

Formula XIX b in which:
the definitions of Su, T, A, $R_4$, t, a, and r are as described in Formula I, The composition according to the invention comprises or consists of a crosslinked copolymer, grafted on a support, said polymer being of Formula XX,

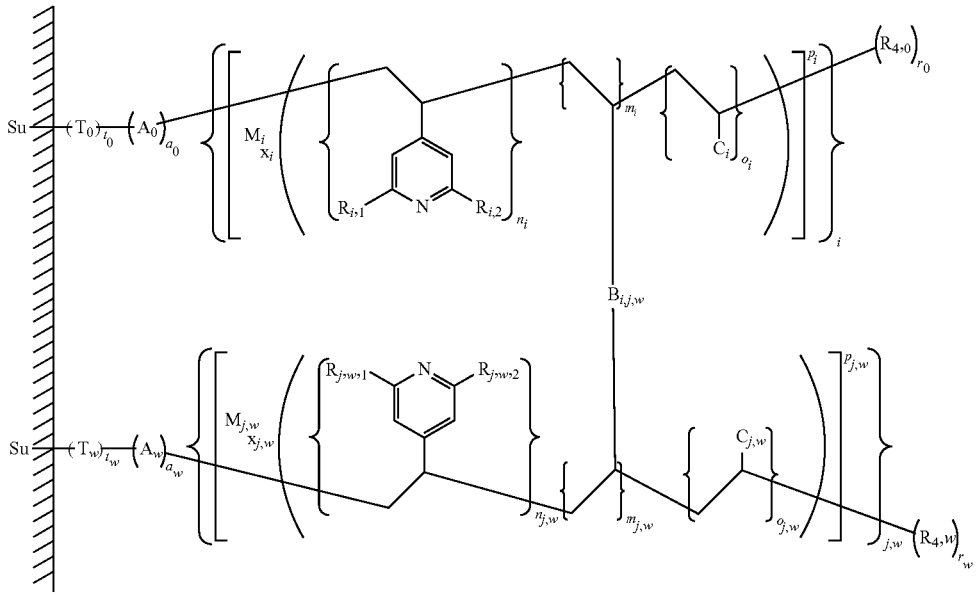

Formula XX the definitions of c and d are as described in Formula XVIII.

In this embodiment, the polymer is polymerized in the form of blocks, with a first block containing only monomer units derived from styrene, and a second block containing all the monomer units derived from 4-vinylpyridine.

In this embodiment, the polymer grafted onto a support of Formula XIX b, is not solvated in an aqueous medium. The block consisting of monomer units derived from styrene is hydrophobic. The block consisting of monomer units derived from 4-vinylpyridine, the two substituent groups in positions 2 and 6 of which are carboxylic acid groups, is hydrophilic. Thus, if the support is not stable in water, the polystyrene block will limit the contact between the support and the water, while the block of monomer units derived from 4-vinylpyridine may be active in the aqueous medium.

According to a particular embodiment, the composition of the invention, as defined above, comprises or consists of a copolymer grafted on a support, and having one or more types of monomer units derived from 4-vinylpyridine different and one or more types of monomer units derived from a co-monomer, said polymer being complexed or not with one or more different metals, being non-linear and being crosslinked with at least one other polymer.

in which:
Su is the support on which the polymers are fixed,
w is a strictly positive, indexed whole number, varying from 1 to the number of polymers crosslinked with the polymer of index 0, itself comprised from 1 to 1000,
$A_0$ and the $A_w$ are compounds originating from polymerization initiators,
$T_0$ and the $T_w$ are compounds making the link between the support and the optional compounds originating from polymerization initiators or between the support and the respective first monomer unit,
$R_{4,0}$ and the $R_{4,w}$, are compounds permitting the propagation of the polymerization, whether or not derived from said polymerization initiator, or allowing the termination of the polymerization, or a transfer agent,
$t_0$, $a_0$, $t_w$, $a_w$ and the $r_w$ are the same or different and are worth 0 or 1,
i and j, w are strictly positive, indexed integers, varying respectively from 1 to $n_i$, and from 1 to $n_{j,w}$, $n_i$ et $n_{j,w}$ being included from 1 to 9999,
$n_i + n_{j,w} = n$, n being between 3 and 10,000,
and for each i and each j, w:
$R_{i,1}$, $R_{i,2}$, $R_{j,w,1}$ and $R_{j,w,2}$ are substituents chosen from the following group: hydrogen, alkyl radical of 1 to 20 carbons, alkene radical of 3 to 20 carbons, radical aryl of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings including the heteroatom is either nitrogen, or oxygen, or sulfur, or phosphorus, amide of 1 to 20 carbons, thiols of 1 to 20 carbons, phosphine of 1 to 20 carbons, said substituents being able to be cyclized between them and which may contain sulfur or phosphorus atoms, copolymer grafted on a support, and having one or more types of monomer units derived from 4-vinylpyridine different and one or more types of monomer units derived from a co-monomer, said polymer being complexed or not with one or more different metals, being non-linear and being crosslinked with at least one other polymer.

The composition according to the invention comprises or consists of a crosslinked copolymer, grafted on a support, said polymer being of Formula XX,

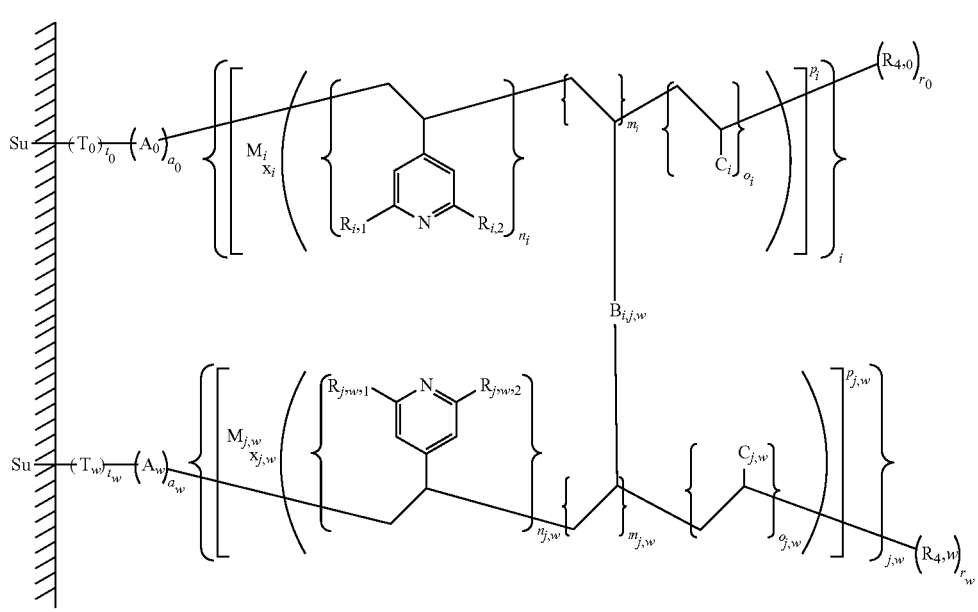

Formula XX provided that when $R_{i,1}$, represents hydrogen, then $R_{i,2}$ is different from hydrogen, and vice versa, provided that when $R_{j,w,1}$ represents hydrogen, then $R_{j,w,2}$ is different from hydrogen, and vice versa, $B_{i,j,w}$ is a monomer unit derived from a co-monomer, forming a crosslinking bridge between the polymer 0 in position i and the polymer of index w in position j, the $C_i$ and the $C_{j,w}$ are monomer units derived from a co-monomer which does not form a crosslinking bridge, $n_i$, $m_i$, $o_i$, $n_{j,w}$, $m_{j,w}$, and the $o_{j,w}$, are integers equal to 0 or 1, $n_i+m_i+o_i=1$, $n_{j,w}+m_{j,w}+o_{j,w}=1$ the sum of the $o_{j,w}$, is non-zero, and the sum of $o_i$ is non-zero.

In this embodiment, the polymer grafted on a support of Formula XX is a crosslinked copolymer grafted on a support in which the crosslinking bridges are formed only on monomer units derived from a co-monomer.

In this embodiment, the polymer grafted onto a support of Formula XX may contain monomer units derived from a co-monomer which does not form a crosslinking bridge.

In this embodiment, the polymer can form a hydrogel. This hydrogel on the surface of the support can improve the mechanical stability of the polymer assembly plus support.

According to a particular embodiment, the composition of the invention, as defined above, comprises or consists of a in which Su is the support on which the polymers are fixed, w is a strictly positive, indexed integer varying from 1 to the number of polymers crosslinked with the polymer of index 0, itself comprised from 1 to 1000, $A_0$ and the $A_w$ are compounds derived from polymerization initiators, $T_0$ and the $T_w$ are compounds making the link between the support and the optional compounds originating from polymerization initiators or between the support and the respective first monomer unit, $R_{4,0}$ and the $R_{4,w}$ are compounds allowing the propagation of the polymerization, whether or not originating from said polymerization initiator, or allowing the termination of the polymerization, or a transfer agent, $t_0$, $a_0$, $r_0$, the $t_w$, the $a_w$ and the $r_w$ are the same or different and are worth 0 or 1, i and j,w are integers strictly positive, indexed, varying respectively from 1 to $n_i$, and from 1 to $n_{j,w}$, $n_i$ and $n_{j,w}$ being included from 1 to 9999, $n_i+n_{j,w}=n$, n being between 3 and 10,000, and for each i and each j, w:

$R_{i,1}$, $R_{i,2}$, $R_{j,w,1}$ and $R_{j,w,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents optionally being be cyclized with each other and optionally containing sulfur or phosphorus atoms, from a co-monomer, 1,4-divinylbenzene, said polymer being not complexed by a metal, being non-linear and being crosslinked with at least one other polymer.

The composition according to the invention comprises or consists of a crosslinked copolymer grafted onto a support, said copolymer being of Formula XXI,

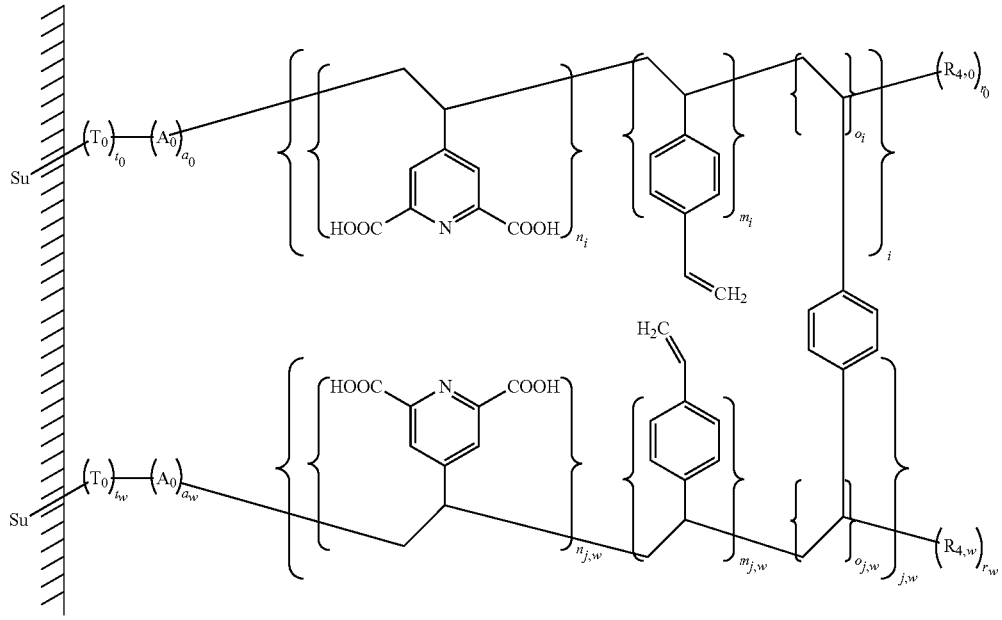

Formula XXI provided that when $R_{i,1}$ (respectively $R_{i,2}$) represents either hydrogen, or an alkyl radical of 1 to 4 carbons, or a aryl radical of 1 to 4 carbons, or an alkene radical of 1 to 4 carbons, then $R_{i,2}$ (respectively $R_{i,1}$) is different from hydrogen, from the alkyl radical of 1 to 4 carbons, the aryl radical of 1 to 4 carbons, and the alkene radical of 1 to 4 carbons, provided that when $R_{j,w,1}$ (respectively $R_{j,w,2}$) represents either hydrogen, or an alkyl radical of 1 to 4 carbons, or an aryl radical of 1 to 4 carbons, or an achene radical of 1 to 4 carbons, then $R_{j,w,2}$ (respectively $R_{j,w,1}$) is different from hydrogen, from the alkyl radical of 1 to 4 carbons, from the aryl radical of 1 to 4 carbons, and from the alkene radical of 1 to 4 carbons, $B_{i,j,w}$ is a monomer unit derived from a co-monomer, forming a crosslinking bridge between the polymer 0 in position i and the polymer of index w in position j.

$C_i$ and $C_{j,w}$ are monomer units derived from a co-monomer which does not form a crosslinking bridge, $n_i$, $m_i$, $o_i$, $n_{j,w}$, $m_{j,w}$, and the $o_{j,w}$ are integers equal to 0 or 1, $n_i + m_i + o_i = 1$, $n_{j,w} + m_{j,w} + o_{j,w} = 1$, the sum of $o_{j,w}$, is non-zero, and the sum of $o_i$ is non-zero.

According to a particular embodiment, the composition of the invention, as defined above, comprises or consists of a copolymer grafted on a support, and having a single type of monomer units derived from 4-vinylpyridine, in which the two substituent groups in positions 2 and 6 are carboxylic acid groups, and a single type of monomer units derived in which:
the definitions of Su, w, $T_0$, $T_w$, $A_0$, $A_w$, $R_{4,0}$, $R_{4,w}$, $t_0$, $a_0$, i, j,w, $n_i$, $m_i$, $o_i$, $n_{j,w}$, $m_{j,w}$, $o_{j,w}$, $r_0$ and $r_w$ are as defined in Formula XX.

In this embodiment, the polymer grafted onto a support of Formula XXI is a crosslinked copolymer comprising a single type of monomer units derived from 4-vinylpyridine, the two substituent groups in positions 2 and 6 of which are carboxylic acid groups, and comprising a single type of monomer units derived from a co-monomer, 1,4-divinylbenzene.

In this embodiment, the monomer units derived from 1,4-divinylbenzene of the polymer grafted on a support of Formula XXI may or may not form a crosslinking bridge. At least one crosslinking bridge is formed in the polymer grafted onto a support of Formula XXI.

According to a particular embodiment, the composition of the invention, as defined above, comprises or consists of a polymer grafted on a support, in which said polymer is complexed with a metal.

In this embodiment, the polymer is complexed with at least one metal atom, in particular for its use as a chelating agent or as a catalyst.

According to a particular embodiment, the composition of the invention, as defined above, comprises or consists of a polymer grafted on a support, in which said polymer is complexed with a metal chosen from actinides, lanthanides or transition metals.

In this embodiment, the polymer is complexed to a particular family of metals. According to a particular embodiment, the composition of the invention, as defined above, comprises or consists of a polymer grafted on a support, in which said polymer is complexed with uranium.

In this embodiment, the polymer grafted on a support is complexed only with uranium. This polymer is useful for recovering uranium from seawater or used nuclear fuel. It also allows the preparation of uranium-based catalysts to catalyze reactions such as the degradation of volatile organic compounds in the gas phase or the oxidation of methane to methanol.

According to a particular embodiment, the composition of the invention, as defined above, comprises or consists of a polymer grafted on a support, said polymer is solvated in aqueous solution and in particular in sea water.

In this embodiment, the polymer, without support, is solvated in aqueous solutions and more particularly in sea water. This is in particular the case for an homopolymer with a monomer unit derived from 4-vinylpyridine, the two substituent groups in positions 2 and 6 of which are carboxylic acid groups. The carboxylic acid groups facilitate the solvation of the polymer under neutral or basic pH conditions, as is the case in seawater.

According to a particular embodiment, the composition of the invention, as defined above, comprises or consists of a polymer grafted on a support, said polymer being complexed with a metal, and being solvated or not in aqueous solution.

In this embodiment, the polymer is solvated or not depending on the conditions in which the polymer is found, when the polymer is complexed with a metal.

According to a particular embodiment, the composition of the invention, as defined above, comprises or consists of a polymer grafted on a support, said polymer being solvated in aqueous solution not complexed by a metal and not solvated in solution complexed with a metal, in particular with uranium.

In this embodiment, the polymer is solvated in an aqueous solution and the polymer precipitates together with the metal when the polymer and the metal complex. This is the case in particular of the polymer grafted on a support of Formula VI, which is solvated in water at neutral pH and which once complexed with uranium gives Formula XIII, and precipitates at neutral pH.

According to a particular embodiment, the composition of the invention, as defined above, comprises or consists of a polymer grafted on a support, said polymer being solvated in organic solvents, in particular acetonitrile, and dimethyl sulfoxide (DMSO).

In this embodiment, the polymer is solvated in an organic solution such as acetonitrile, this is in particular the case for an homopolymer comprising a monomer unit derived from 4-vinylpyridine, the two substituent groups of which in positions 2 and 6 are methyl ester groups.

According to a particular embodiment, the composition of the invention, as defined above, comprises or consists of a polymer grafted on a support, said support Su of Formula I being chosen from the polyvinyl chloride copolymer-polyvinylidene chloride (PVC-co-PVDC), polyvinyl chloride (PVC), PET or $SiO_2$.

In this embodiment, the polymers of the present invention can be grafted onto various supports based on polymers, such as PVC or on inorganic bases such as silica.

According to a particular embodiment, the composition of the invention, as defined above, comprises or consists of a polymer grafted on a support, said compound T of Formula I being chosen from SiOH or the compound of Formula XXII.

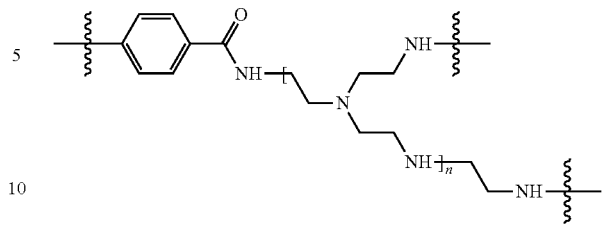

Formula XXII

In this embodiment, the link between the polymer and the support contains or consists of a compound T derived from the support or of a compound modifying the surface of the support, which serves as a link between the support and either the optional polymerization initiator, or the polymer.

In this embodiment, the link between the support and the polymer consists either of compound T only, or of compound T linked to compound A.

According to a particular embodiment, the composition of the invention, as defined above, comprises or consists of a polymer grafted on a support, in which A of Formula I is derived from a chosen polymerization initiator among 4-(chloromethyl)benzoyl chloride, benzyl chloride, AIBN, methyl 2-bromo-2-methylpropanoate or the compound of Formula XXIII

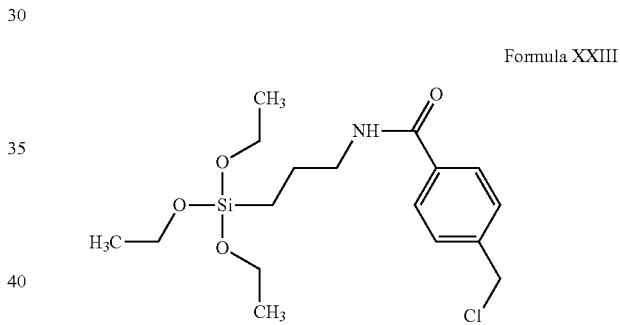

Formula XXIII

In this embodiment, a polymerization initiator fragment binds the polymer with either a compound T or directly the support. The above list is not exhaustive and includes all of the polymerization initiators which can be used in radical polymerizations.

According to a particular embodiment, the composition of the invention, as defined above, comprises or consists of a polymer grafted on a support, said compound $R_4$ of Formula I being chosen from a chlorine atom, or the compounds of Formula XXIV.

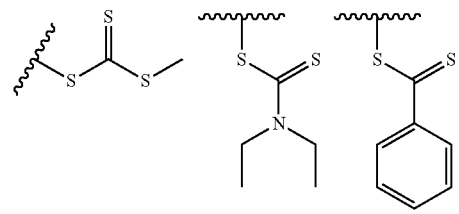

Formula XXIV

In this embodiment, the end of the polymer is not the last carbon in the polymer chain. The list is not exhaustive and includes all of the transfer agents which can be used in so-called controlled radical polymerizations.

According to a particular embodiment, the composition of the invention, as defined above, comprises or consists of a polymer grafted on a support of Formula XXV, Formula XXVI, Formula XXVII, Formula XXVIII, Formula XXIX, or Formula XXX.

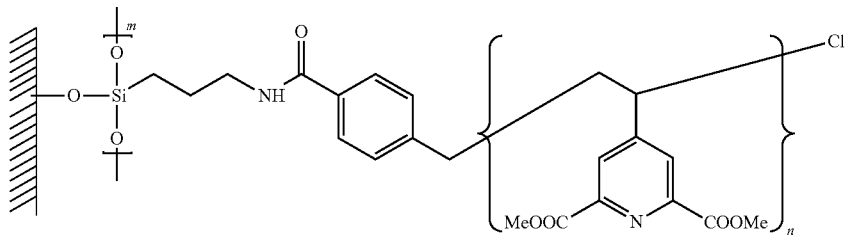

Formula XXV

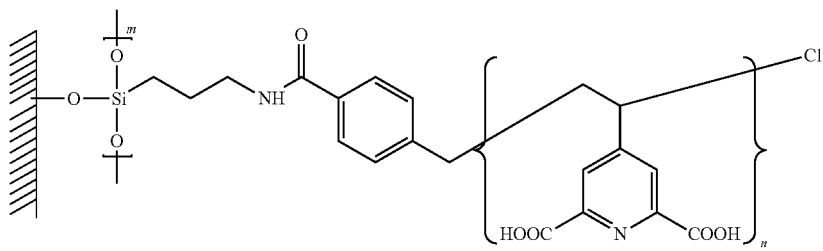

Formula XXVI

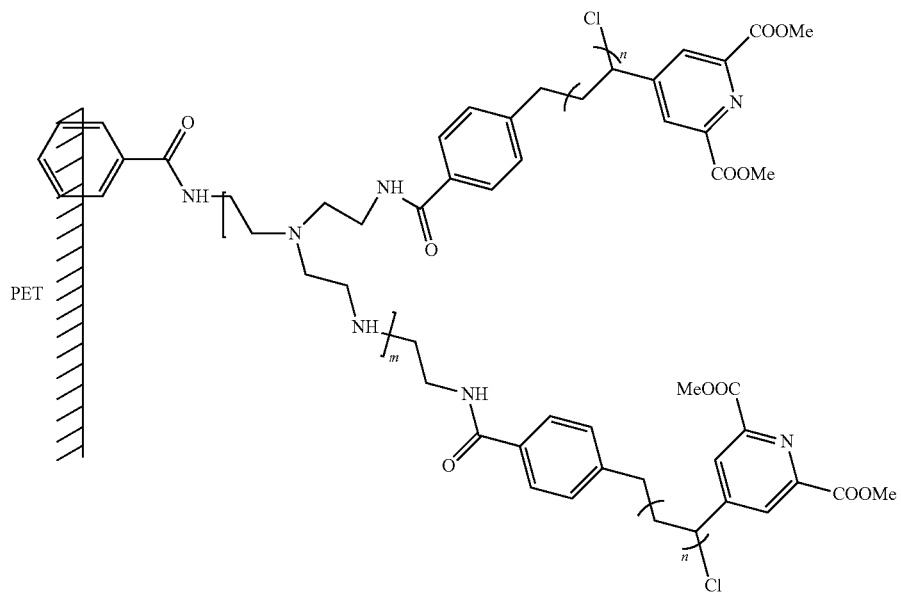

Formula XXVII

-continued

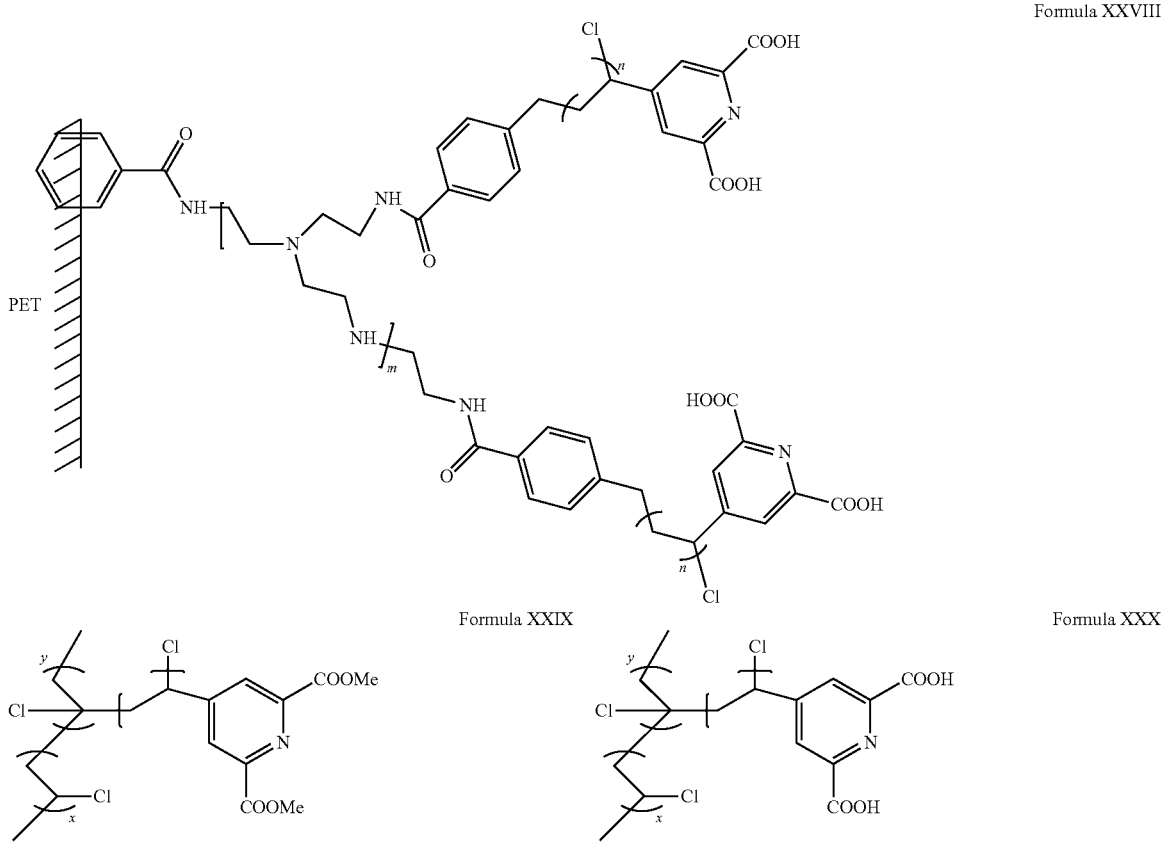

In this embodiment, the polymers of Formula XXV to Formula XXXIX are:
homopolymers consisting of monomer units derived from 4-vinylpyridine and substituted by two carboxylic acid groups for the polymers grafted onto a support of Formula XXVI, Formula XXVIII and Formula XXX,
homopolymers consisting of monomer units derived from 4-vinylpyridine and substituted by two methyl ester groups for the polymers grafted onto a support of Formula XXV, Formula XXVII and Formula XXIX.

The polymers grafted onto a support of Formula XXV and of Formula XXVI are supported on a silica support. The polymers grafted onto a support of Formula XXVII and of Formula XXVIII are supported on PET fibers. The polymers grafted onto a support of Formula XXIX and of Formula XXX are supported on PVC-co-PDVC fibers.

The present invention further relates to a method for the preparation of a polymer grafted in particular covalently to a support, as defined above, said method being carried out according to the "grafted to" or "grafted from" technique.

According to the present invention, the term "grafted to" means a polymerization technique in which the polymer at the end of the polymerization step is not grafted to the support but is free. The step of grafting to the support is after the polymerization.

According to the present invention, the term "grafted from" means a polymerization technique in which the initiation is carried out either on a compound covalently linked to the support, or directly on the support. The monomers then react on the support to form the polymer chain. The polymer grafted on a support grows from said support according to this technique.

The present invention further relates to a method for the preparation of a polymer grafted in particular covalently to a support, as defined above, comprising the following preparation steps:
a. optionally a step of pretreatment of the support by bringing said support into contact with a pretreatment reagent and/or a physical pretreatment, in order to obtain a support that may be pretreated,
b. optionally a pre-grafting step on the support which may be pretreated by bringing said support, which may be pretreated, into contact with a polymerization initiator, in order to obtain a support which may be pretreated and optionally pre-grafted,
c. a radical polymerization step starting with the initiation of the support, if necessary pretreated and optionally pre-grafted, then continuing by bringing the support optionally pretreated and optionally pre-grafted with:
at least one monomer derived from 4-vinylpyridine in which the carbons in positions 2 and 6 can be substituted by one of the substituents of the following group: hydrogen, alkyl radical of 1 to 20 carbons, alkene radical of 1 to 20 carbons, aryl radical of 1 to 20 carbons, alchohol of 1 to 20 carbons, ether of 1 to 20 carbons, ester of 1 to 20 carbons, amine of 1 to 20 carbons, heterocycle of 1 to 5 rings of which the heteroatom is either nitrogen, or oxygen, or sulfur, or phosphorus, amide of 1 to 20 carbons, thiols of 1 to 20 carbons, phosphine of 1 to 20 carbons, said substituents being able to be cyclized with one another and optionally containing sulfur or phosphorus atoms, and optionally at least one co-monomer,
with or without crosslinking,
to obtain a polymer grafted onto the support,
d. an optional modification step by bringing the polymer grafted onto the support into contact with a reagent to modify at least one of the above-mentioned substituents, to obtain a polymer grafted onto the support and optionally modified,
e. an optional complexation step by bringing the polymer grafted onto the support and optionally modified with a metal cation to obtain a polymer grafted onto the support, optionally modified and optionally complexed.

The method for the synthesis of a polymer grafted onto a support according to the present invention is a "grafted from" method.

The polymer synthesis method according to the present invention has the advantage of being able to carry out the polymerization step in a solution in which the monomers which form the monomer units are not solvated. The presence of the modification step makes it possible to polymerize monomers having groups in positions 2 and 6 different from the final groups. For example, the monomer derived from 4-vinylpyridine, the two substituent groups of which in positions 2 and 6 are carboxylic acid groups, is not solvated in organic solution. It is therefore very difficult to polymerize this monomer in organic solution. On the other hand, the monomer derived from 4-vinylpyridine, the two substituent groups of which in positions 2 and 6 are methyl ester groups, is solvated in an organic medium. The polymerization of the monomer derived from 4-vinylpyridine, in which the two substituent groups in positions 2 and 6 are methyl ester groups, is then possible and the following modification step makes it possible to hydrolyze the ester function into an acid function. The polymer thus obtained, with the acid functions, is non-solvated in an organic medium.

The polymer synthesis method according to the present invention has the advantage of being able to easily control the polymerization step. The presence of the modification step makes it possible to protect the two groups of monomers derived from 4-vinylpyridine. Indeed, if the groups in positions 2 and 6 are very reactive (COOH, $NH_2$ ... ), these groups are likely to react during the polymerization step. This can lead to the formation of uncontrolled ramifications and/or the loss of certain grouping. The post-polymerization modification step makes it possible to carry out the polymerization using protective groups which are subsequently eliminated during the modification step. The use of controllable radical polymerization such as RAFT or ATRP polymerization improves control over the polymerization.

The method for the synthesis of the polymers according to the present invention can comprise an additional step of preparation of the monomers derived from 4-vinylpyridine.

According to the present invention, the term "radical polymerization" means the polymerization technique which makes it possible to polymerize monomers and the propagation of which is ensured by the presence of a radical. Examples of radical polymerizations are: so-called conventional radical polymerization, polymerization by reversible chain transfer by addition-fragmentation (RAFT), polymerization via nitroxide (NMP), radical polymerization by atom transfer (ATRP), radical polymerization by atom transfer by additional activator and reducing agent (SARA ATRP).

According to the present invention, the term "priming of the support, optionally pretreated and optionally pre-grafted", the step enabling polymerization to be initiated. For example in the case of radical polymerization, this step makes it possible, by physical or chemical means, to create a radical on the support which may be pretreated and optionally pre-grafted on which a monomer unit can react.

According to a particular embodiment, the method for the preparation, as defined above, of a polymer grafted onto a support of the invention of Formula I, Formula I

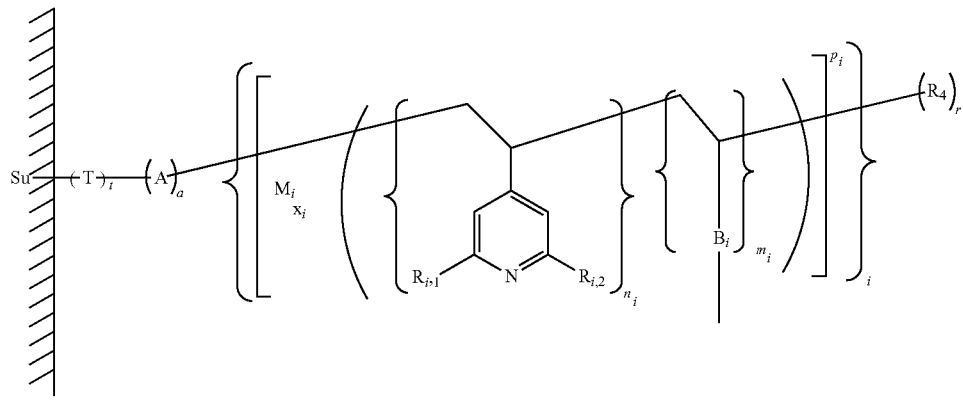

in which:
Su is the support on which the polymer is fixed,
A is a compound derived from a polymerization initiator,
T is a compound making the link between the support and the optional compound resulting from a polymerization initiator or between the support and the first monomer unit,
$R_4$ is a compound allowing the propagation of the polymerization, whether or not derived from said polymerization initiator, or allowing the termination of the polymerization, or a transfer agent,
t, a and r are identical or different and are worth 0 or 1,
i is a strictly positive, indexed integer varying from 1 to n, itself included from 1 to 10,000,
and for each i:
$R_{i,1}$ and $R_{i,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents being able to be cyclized with one another and which may contain sulfur or phosphorus atoms, provided that when $R_{i,1}$ represents hydrogen, then $R_{i,2}$ is different from hydrogen, and vice versa, $B_i$ is a monomer unit derived from a co-monomer, whether or not forming a crosslinking bridge, $M_i$ is a metallic cation, $n_i$ and $m_i$ are integers equal to 0 or 1, $n_i+m_i=1$, $x_i$ is a number from 0 to 6, $p_i$ is the electrical charge of the metal complex ranging from −6 to +6, said polymer being linear when there is no $B_i$ forming a crosslinking bridge, said polymer being crosslinked when there is at least one B, belonging to two linear polymers, includes a. optionally a step of pretreatment of the support by bringing said support into contact with a pretreatment reagent and/or by the action of a physical pretreatment on said support, in order to obtain a support that may be pretreated with Formula XXXI,

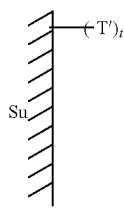

Formula XXXI in which

T' is a compound resulting from the pretreatment of the support Su, containing fragments either of the support, or of the pretreatment reagent, or of both, t is an integer equal to 0 or 1, b. optionally a step of pre-grafting onto the optionally pretreated support of Formula XXXI by bringing the support into contact with a polymerization initiator, in order to obtain a support that is optionally pretreated and optionally pre-grafted of Formula XXXII,

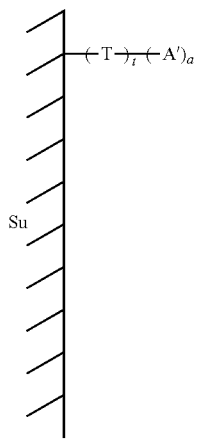

Formula XXXII in which

A' is a compound resulting from the pre-grafting step on the support, containing fragments of the polymerization initiator, a is an integer equal to 0 or 1, c. a radical polymerization step starting with the priming of the optionally pretreated and optionally pre-grafted support of Formula XXXII followed by the contacting of the optionally pretreated and optionally pre-grafted support with the 4-vinylpyridine derivative of Formula XXXIII,

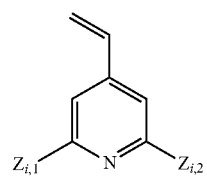

Formula XXXIII in which:

$Z_{i,1}$ and $Z_{i,2}$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and optionally containing sulfur or phosphorus atoms, said polymerization step being carried out:
optionally with at least one co-monomer,
with or without crosslinking, to obtain a polymer grafted on a support of Formula XXXIV,

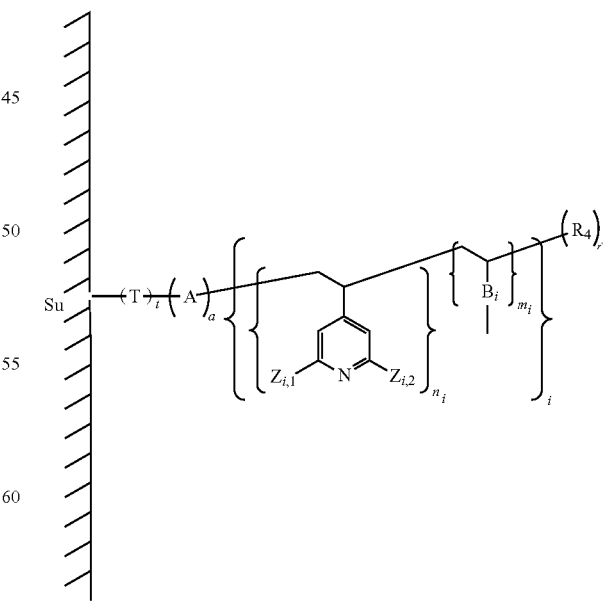

Formula XXXIV d. a modification step, when at least one of the $Z_{i,1}$ is different from $R_{i,1}$ or when at least one of the $Z_{i,2}$ is different from $R_{i,2}$, of the said polymer Formula XXXIV with a reagent for modifying at least one of the above substituents $Z_{i,1}$ and $Z_{i,2}$, said reagent containing a hydroxide, carbonate or phosphate anion, in order to obtain the polymer grafted on a support of Formula XXXV, Formula XXXV

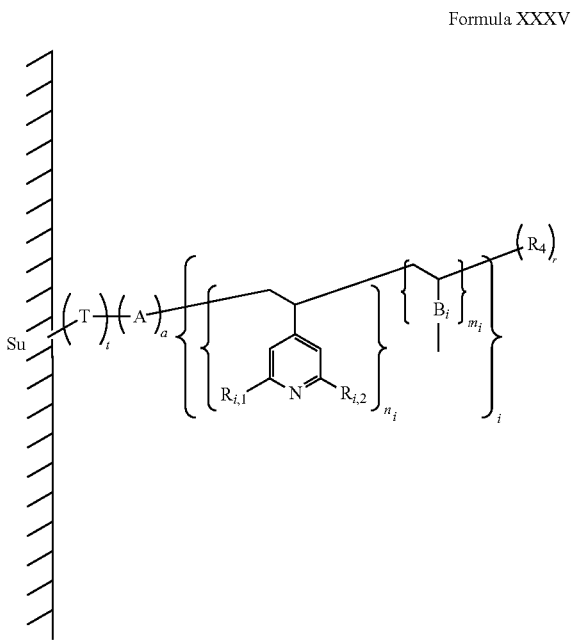

e. optionally a complexing step of said polymer grafted on a support of Formula XXXV with at least one metal cation to obtain the polymer grafted on a support of Formula I.

In this embodiment, the method for synthesizing a polymer grafted onto a support of Formula I begins:
either by a step of pretreatment of the support if the surface of the support does not have a binding site,
or by a step of pre-grafting of the support if the surface of the support has bonding sites, but these said bonding sites cannot undergo initiation making it possible to initiate radical polymerization,
or by a radical polymerization step if the surface of the support has bonding sites, and these said bonding sites can undergo initiation making it possible to initiate radical polymerization.

In this embodiment, the method for synthesizing the polymer grafted onto a support of Formula I is a polymerization according to the "grafted from" technique.

The method for synthesizing a polymer grafted onto a support of Formula I continues:
either by a step of pre-grafting the support if the support has been pretreated and said pretreated support cannot undergo priming to initiate radical polymerization, said method continuing in this case by a radical polymerization step using the pretreated and pre-grafted support as a polymerization initiator,
or by a radical polymerization step if the support has been pretreated and said pretreated support can undergo initiation to initiate radical polymerization, using the pretreated support as a polymerization initiator,
or by a radical polymerization step if the support has not been pretreated and said support has been pre-grafted, using the pre-grafted support as a polymerization initiator.

After polymerization and obtaining a polymer grafted on a support of Formula XXXIV, if the substituent groups of the monomer units derived from 4-vinylpyridine are different in Formula I and Formula XXXIV, a modification step is carried out to allow the substituent groups of Formula XXXIV different from those of Formula I to react and thus obtain the polymer grafted on a support of Formula XXXV.

If the polymer grafted on a support of Formula I is complexed with metals, a step of complexing the polymer grafted on a support of Formula XXXV is necessary to obtain the polymer grafted on a support of Formula I.

In this embodiment, the polymerization step of said synthesis method makes it possible to polymerize co-monomers, as well as different types of monomers derived from 4-vinylpyridine. During said polymerization step, crosslinking bridges can form.

According to a particular embodiment, the method for the preparation, as defined above, of a polymer of the invention grafted onto a support, of Formula II, in which the definitions of $R_{i,1}$ and $R_{i,2}$ are such that described in Formula II, includes:

a. a step of pretreatment of the support by bringing the support into contact with a pretreatment reagent and/or by the action of a physical pretreatment on said support, in order to obtain a pretreated support of Formula XXXI, b. optionally a step of pre-grafting of the pretreated support of Formula XXXI by bringing it into contact with a polymerization initiator, in order to obtain a pretreated and optionally pre-grafted support of Formula XXXII, c. a radical polymerization step starting with the initiation of the optionally pretreated and optionally pre-grafted support of Formula XXXII followed by the contacting of the optionally pretreated and optionally pre-grafted support with the 4-vinylpyridine derivative of Formula XXXIII, and optionally with at least one co-monomer, with or without crosslinking, to obtain a polymer grafted on a support of Formula XXXVI Formula XXXVI

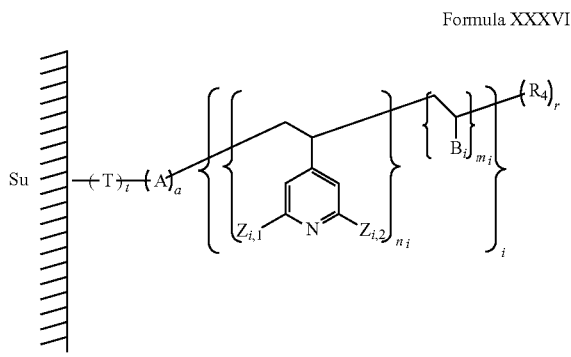

in which:
the definitions of A, $R_4$, $B_i$, $n_i$, $m_i$, r, a, and i are as described in Formula II,
the definitions of $Z_{i,1}$ and $Z_{i,2}$ are as described in Formula XXXIII, d. a modification step, when at least one of the $Z_{i,1}$ is different from $R_{i,1}$ or when at least one of the $Z_{i,2}$ is different from $R_{i,2}$, of said polymer grafted onto a support of Formula XXXVI with a reagent for modifying at least one of $Z_{i,1}$ or $Z_{i,2}$, said reagent containing a hydroxide, carbonate or phosphate anion, to obtain the polymer grafted on n support of Formula XXXVII,

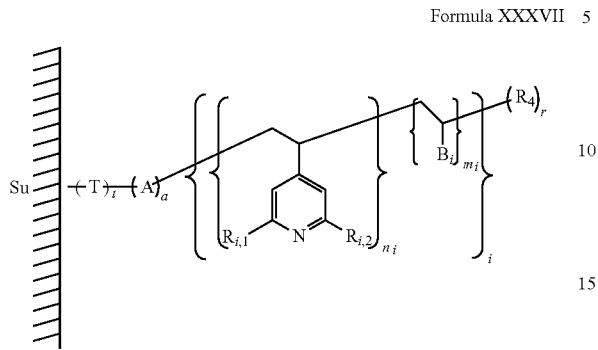

Formula XXXVII e. optionally a complexation step of said polymer grafted on a support of Formula XXXVII with at least one metal cation to obtain the polymer grafted on a support of Formula II In this embodiment, the method for synthesizing the grafted polymer on a support of Formula II is a polymerization according to the "grafted from" technique.

In this embodiment, the method for synthesizing the polymer grafted on a support of Formula II begins with the radical polymerization of the monomers forming the polymer grafted on a support of Formula XXXVI. These monomers consist of monomers derived from 4-vinylpyridine which may not have the same substituents as the monomer units derived from 4-vinylpyridine present in Formula II, as well as optionally co-monomers. The co-monomer is either chosen not to form a crosslinking bridge, or absent.

After the polymerization and the obtaining of a polymer grafted on a support of Formula XXXVI, if the substituent groups of the monomer units derived from 4-vinylpyridine are different in Formula II and Formula XXXVI, a modification step is carried out for allow the substituent groups of Formula XXXVI different from those of Formula II to react and thus obtain the polymer grafted on a support of Formula XXXVII.

If the polymer grafted on a support of Formula II is complexed with metals, a step of complexing the polymer grafted on a support of Formula XXXVII is carried out to obtain the polymer grafted on a support of Formula II.

According to a particular embodiment, the method for the preparation, as defined above, of a polymer grafted onto a support of the invention grafted onto a support, of Formula II with t=1, in which the definitions of $R_{i,1}$ and $R_{i,2}$ are as in Formula II, includes:

a. a step of pretreatment of the support by bringing the support into contact with a pretreatment reagent and/or by the action of a physical pretreatment on said support, in order to obtain a pretreated support of Formula XXXVIII,

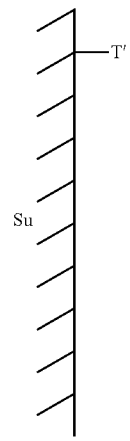

Formula XXXVIII in which:

the definitions of Su and T' are as described in Formula XXXI, b. optionally a step of pre-grafting of the pretreated support of Formula XXXVIII by contacting with a polymerization initiator, in order to obtain a pretreated and optionally pre-grafted support of Formula XXXIX,

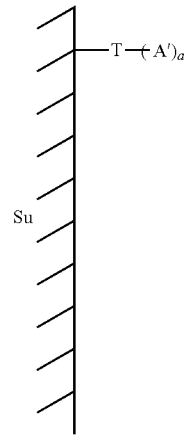

Formula XXXIX in which:

the definitions of T, A' and a are as described in Formula XXXII, c. a radical polymerization step starting with the priming of the pretreated and optionally pre-grafted support of Formula XXXIX followed by the contacting of the pretreated and optionally pre-grafted support with the 4-vinylpyridine derivative of Formula XXXIII, and with optionally at least one co-monomer, with or without crosslinking, to obtain a polymer grafted on a support of Formula XL,

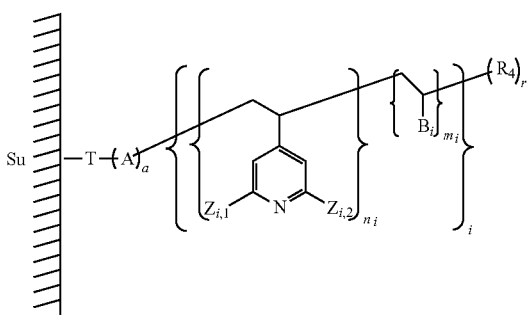

in which:
the definitions of A, $R_4$, $B_i$, $n_i$, $m_i$, r, a, and $l$ are as described in Formula II,
the definitions of $Z_{i,1}$ and $Z_{i,2}$ are as described in Formula XXXIII, d. a modification step, when at least one of $Z_{i,1}$ is different from $R_{i,1}$ or when at least one of $Z_{i,2}$ is different from $R_{i,2}$, of said polymer grafted on a support of Formula XL with a reagent for modifying at least one of $Z_{i,1}$ or $Z_{i,2}$, said reagent containing a hydroxide, carbonate or phosphate anion, to obtain the polymer grafted on a support of Formula XLI, Formula XLI

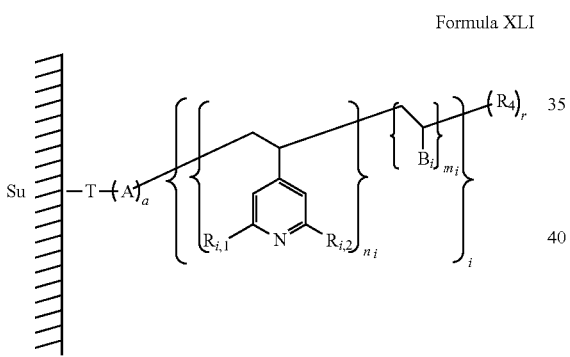

e. optionally a step of complexation of said polymer grafted on a support of Formula XLI with at least one metal cation to obtain the polymer grafted on a support of Formula II in which t=1.

In this embodiment, the method for synthesizing the polymer grafted onto a support of Formula II in which t=1 is a polymerization according to the "grafted from" technique.

In this embodiment, the method for the synthesis of the polymer grafted onto a support of Formula II in which t=1 begins with a step of pretreatment of the support to obtain a pretreated support.

Said method for the synthesis of the polymer grafted onto a support of Formula II in which t=1, continues:
either by a pre-grafting step, if the surface bonding sites of this pretreated support are not capable of undergoing priming to initiate radical polymerization, to obtain a pretreated and pre-grafted support, followed by step of radical polymerization using the pretreated and pre-grafted support as initiator,
or by the polymerization step if the surface bonding sites of this pretreated support are capable of undergoing initiation to initiate a radical polymerization, using the pretreated support as a polymerization initiator.

After the polymerization and the obtaining of a polymer grafted on a support of Formula XL, if the substituent groups of the monomer units derived from 4-vinylpyridine are different in Formula II and Formula XL, a modification step is carried out for allow the substituent groups of Formula XL different from those of Formula II, to react and thus obtain the polymer grafted on a support of Formula XLI.

If the polymer grafted on a support of Formula II is complexed with metals, a step of complexing the polymer grafted on a support of Formula XLI is carried out to obtain the polymer grafted on a support of Formula II in which t=1.

According to a particular embodiment, the method for the preparation, as defined above, of a polymer of the invention grafted onto a support, of Formula II with t=1 and a=1, in which the definitions of $R_{i,1}$ and $R_{i,2}$ are as described in Formula II,
said method comprises:

a. a step of pretreatment of the support by bringing the support into contact with a pretreatment reagent and/or by the action of a physical pretreatment on said support, in order to obtain a pretreated support of Formula XXXVIII, Formula XXXVIII

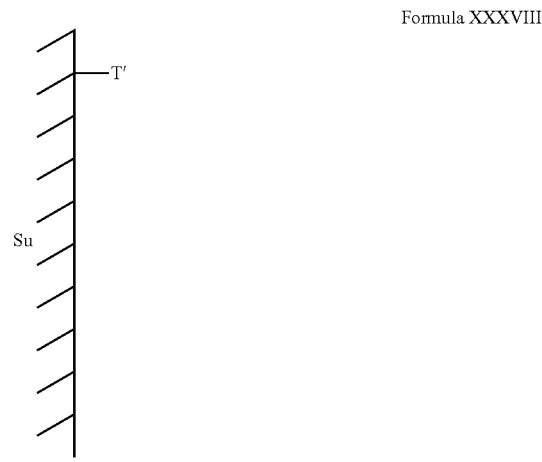

in which:
the definitions of Su and T' are as described in Formula XXXI, b. a step of pre-grafting said pretreated support of Formula XXXVIII by bringing it into contact with a polymerization initiator, in order to obtain a pretreated and pre-grafted support of Formula XLII, Formula XLII

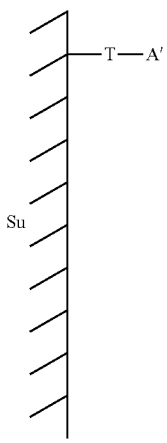

in which:

the definitions of T and A' are as described in Formula XXXII, c. a radical polymerization step starting with the priming of the pretreated and pre-grafted support of Formula XLII followed by bringing the pretreated and pre-grafted support into contact with the 4-vinylpyridine derivative of Formula XXXIII and optionally with at least one co-monomer to obtain a polymer grafted on a support of Formula XLIII, Formula XLIII

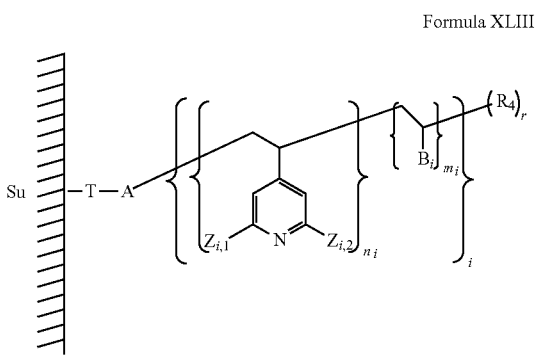

in which:

the definitions of A, $R_4$, $B_j$, $n_j$, $m_j$, r and i are as described in Formula II, the definitions of $Z_{i,1}$ and $Z_{i,2}$ are as in Formula XXXIII, d. a modification step, when at least one of the $Z_{i,1}$ is different from $R_{i,1}$ or when at least one of the $Z_{i,2}$ is different from $R_{i,2}$ of said polymer grafted on a support of Formula XLIII with a reagent for modifying at least one of $Z_{i,1}$ or $Z_{i,2}$ said reagent containing a hydroxide, carbonate or phosphate anion, to obtain the polymer grafted on a support of Formula XLIV, Formula XLIV

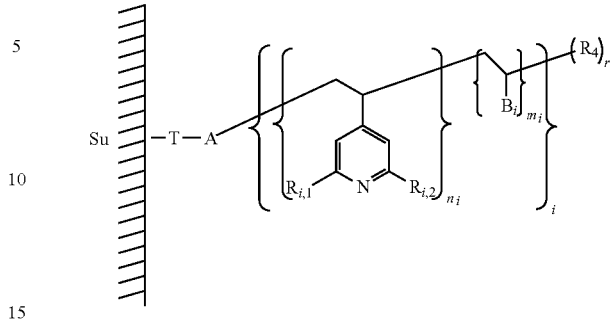

e. optionally a complexing step of said polymer grafted on a support of Formula XLIV with at least one metal cation to obtain the polymer grafted on a support of Formula II, in which t=1 and a=1.

In this embodiment, the method for synthesizing the polymer grafted onto a support of Formula II, in which t=1 and a=1 is a polymerization according to the "grafted from" technique.

In this embodiment, the method for the synthesis of the polymer grafted onto a support of Formula II in which t=1 and a=1 comprises:

a step of pretreatment of the support to obtain a pretreated support, a pre-grafting step to obtain a pretreated and pre-grafted support, a radical polymerization step using the pretreated and pre-grafted support as initiator.

After the polymerization and the obtaining of a polymer grafted onto a support of Formula XLIII, if the substituent groups of the monomer units derived from 4-vinylpyridine are different in Formula II and Formula XLIII, a modification step is carried out for allow the substituent groups of Formula XLIII different from those of Formula II to react and thus obtain the polymer grafted on a support of Formula XLIV.

If the polymer grafted on a support of Formula II is complexed with metals, a step of complexing the polymer grafted on a support of Formula XLIV is carried out to obtain the polymer grafted on a support of Formula II in which t=1 and a=3.

According to a particular embodiment, the method for the preparation, as defined above, of a polymer of the invention grafted onto a support, of Formula II with t=0 and a=0, in which the definitions of $R_{i,1}$ and $R_{i,2}$ are as described in Formula II, does not include a pretreatment or priming step and includes:

a. a radical polymerization step starting with the priming of the support and followed by bringing the support into contact with the 4-vinylpyridine derivative of Formula XXXIII, and optionally with at least one co-monomer, with or without crosslinking, for obtain a polymer grafted onto a support of Formula XLV, XLV formula

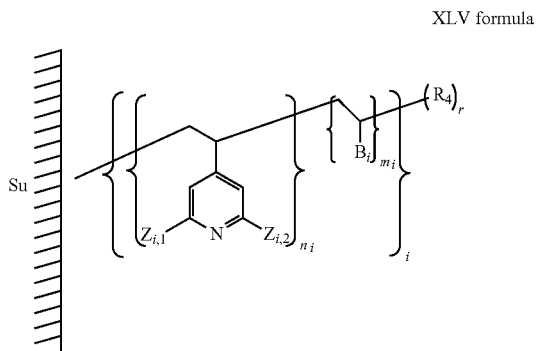

in which:
the definitions of Su, $R_4$, $B_i$, $n_i$, $m_i$, r and i are as described in Formula II,
the definitions of $Z_{i,1}$ and $Z_{i,2}$ are such when in Formula XXXIII,
b. a modification step, when at least one of $Z_{i,1}$ is different from $R_{i,1}$ or when at least one of $Z_{i,2}$ is different from $R_{i,2}$, of said polymer grafted on a support of Formula XLV with a reagent to modify at least one of $Z_{i,1}$ or $Z_{i,2}$ said reagent containing a hydroxide, carbonate or phosphate anion, to obtain the polymer grafted on a support of Formula XLVI, XLVI formula

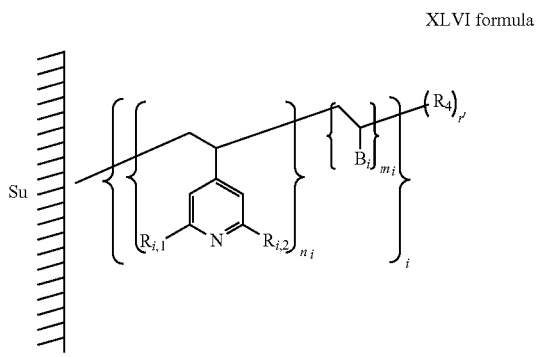

c. optionally a complexing step of said polymer grafted on a support of Formula XLVI with at least one metal cation to obtain the polymer grafted on a support of Formula II.

In this embodiment, the method for the synthesis of the polymer grafted onto a support of Formula II in which t=0 and a=0 is a polymerization according to the "grafted from" technique.

In this embodiment, the method for synthesizing the polymer grafted onto a support of Formula II in which t=0 and a=0 does not include either a pretreatment step or a pre-grafting step. The surface of the support has binding sites capable of undergoing initiation to initiate radical polymerization. The method how by the radical polymerization step using the support as initiator.

After the polymerization and obtaining of a polymer grafted on a support of Formula XLV, if the substituent groups of the monomer units derived from 4-vinylpyridine are different in Formula II and Formula XLV, a modification step is carried out for allow the substituting groups of Formula XLV different from those of Formula II to react and thus obtain the polymer grafted on a support of Formula XLVI.

If the polymer grafted on a support of Formula II is complexed with metals, a step of complexing the polymer grafted on a support of Formula XLVI is carried out to obtain the polymer grafted on a support of Formula II in which t=0 and a=0.

According to a particular embodiment, the method for the preparation, as defined above, of a polymer of the invention grafted onto a support, of Formula III with t=1 and a=1 in which the definitions of $R_{i,1}$ and $R_{i,2}$ are as described in Formula III, includes:
a. a step of pretreatment of the support by bringing the support into contact with a pretreatment reagent and/or by the action of a physical pretreatment on said support, in order to obtain a pretreated support of Formula XXXVIII,
b. a step of pre-grafting the pretreated support of Formula XXXVIII by bringing it into contact with a polymerization initiator, to obtain a pretreated and pre-grafted support of Formula XLII,
c. a radical polymerization step, starting with priming of the pretreated and pre-grafted support of Formula XLII then continuing by bringing the pretreated and pre-grafted support into contact with the 4-vinylpyridine derivative of Formula XXXIII, to obtain a polymer grafted on a support of Formula XLVII, Formula XLVII

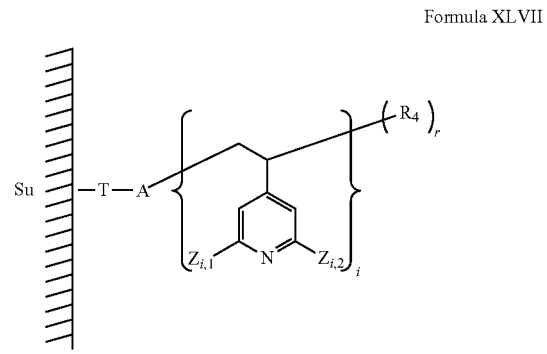

in which:
the definitions of T, A, $R_4$, r and i are as described in Formula III,
the definitions of $Z_{i,1}$ and $Z_{i,2}$ are as described in Formula XXXIII,
d. a modification step, when at least one of the $Z_{i,1}$ is different from $R_{i,1}$ or when at least one of the $Z_{i,2}$ is different from $R_{i,2}$, of said polymer grafted on a support of Formula XLVII with a reagent for modify at least one of the $Z_{i,1}$ or $Z_{i,2}$, said reagent containing a hydroxide, carbonate or phosphate anion, to obtain the polymer grafted on a support of Formula XLVIII,

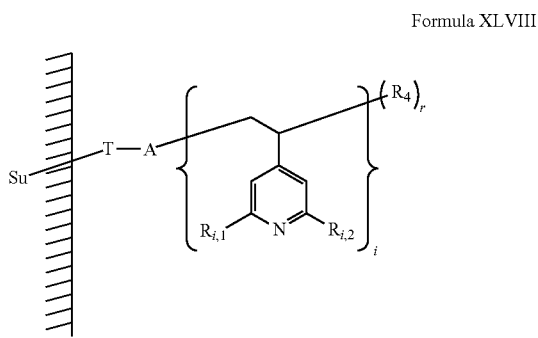

Formula XLVIII e. optionally a complexing step of said polymer grafted on a support of Formula XLVIII with at least one metal cation to obtain the polymer grafted on a support of Formula III, in which t=1 and a=1.

In this embodiment, the method for the synthesis of the polymer grafted onto a support of Formula III, in which t=1 and a=1 is a polymerization according to the "grafted from" technique. In this embodiment, the method for synthesizing the polymer grafted onto a support of Formula III, in which t=1 and a=1 comprises:

- a step of pretreatment of the support to obtain a pretreated support,
- a pre-grafting step to obtain a pretreated and pre-grafted support,
- a radical polymerization step using the pretreated and pre-grafted support as initiator.

After the polymerization and obtaining of a polymer grafted on a support of Formula XLVII, if the substituent groups of the monomer units derived from 4-vinylpyridine are different in Formula III and in Formula XLVII, a modification step is carried out to allow the substituent groups of Formula XLVII different from those of Formula III to react and thus obtain the polymer grafted on a support of Formula XLVIII.

If the polymer grafted on a support of Formula III is complexed with metals, a step of complexing the polymer grafted on a support of Formula XLVIII is carried out to obtain the polymer grafted on a support of Formula III, in which t=1 and a=1.

According to a particular embodiment, the method for the preparation, as defined above, of a polymer of the invention grafted onto a support, of Formula IV with t=1 and a=1, in which the definitions of $R_1$ and $R_2$ are as described in Formula IV, includes:

a. a step of pretreatment of the support by bringing the support into contact with a pretreatment reagent and/or by the action of a physical pretreatment on said support, in order to obtain a pretreated support of Formula XXXVIII, b. a step of pre-grafting the pretreated support of Formula XXXVIII by bringing it into contact with a polymerization initiator, in order to obtain a pretreated and pre-grafted support of Formula XLII, c. a radical polymerization step, starting with the priming of the pretreated and pre-grafted support of Formula XLII, followed by bringing the pretreated and pre-grafted support into contact with the 4-vinylpyridine derivative of Formula XLIX,

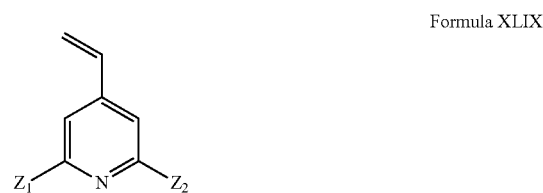

Formula XLIX in which:

$Z_1$ and $Z_2$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and optionally containing sulfur or phosphorus atoms to obtain a polymer grafted on a support of Formula L

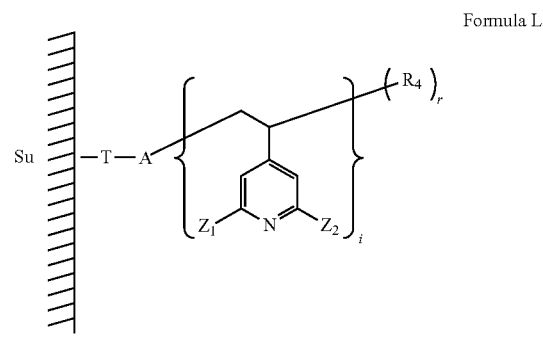

Formula L in which:

the definitions of T, A, $R_4$, r and are as described in Formula IV, d. a modification step, when $Z_1$ is different from $R_1$ or when $Z_2$ is different from $R_2$, of said polymer grafted on a support of Formula L with a reagent to modify at least one of the above substituents $Z_1$ and $Z_2$, and containing a hydroxide anion, carbonate or phosphate, to obtain the polymer grafted on a support of Formula LI,

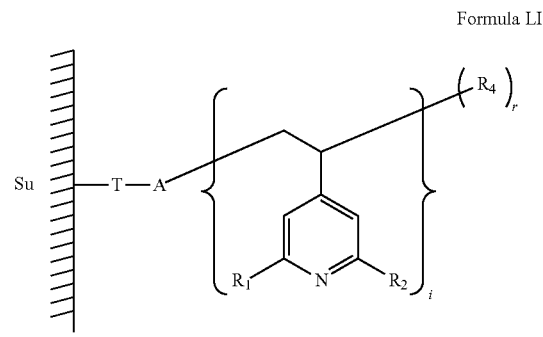

Formula LI e. optionally a step of complexing said polymer grafted on a support of Formula LI with at least one metal cation to obtain the polymer grafted on a support of Formula IV in which t=1 and a=1.

In this embodiment, the method for the synthesis of the polymer grafted onto a support of Formula IV, in which t=1 and a=1 is a polymerization according to the "grafted from" technique.

In this embodiment, the method for the synthesis of the polymer grafted onto a support of Formula IV, in which t=1 and a=1 comprises:
  a step of pretreatment of the support to obtain a pretreated support,
  a step of pre-grafting to obtain a pretreated and pre-grafted support,
  a radical polymerization step using the pretreated and pre-grafted support as initiator.

After the polymerization and obtaining of a polymer grafted on a support of Formula L, if the substituent groups of the monomer units derived from 4-vinylpyridine are different in Formula IV and in Formula L, a modification step is carried out to allow the substituent groups of Formula L different from those of Formula IV to react and thus obtain the polymer grafted on a support of Formula LI.

If the polymer grafted on a support of Formula IV is complexed with metals, a step of complexing the polymer grafted on a support of Formula LI is carried out to obtain the polymer grafted on a support of Formula in which t=1 and a=1.

According to a particular embodiment, the method for the preparation, as defined above, of a polymer of the invention grafted onto a support, of Formula XX, in which the definitions of $R_{j,w,1}$, $R_{j,w,2}$, $R_{i,1}$ and $R_{i,2}$ are as described in Formula XX, includes:
  a. a step of pretreatment of the support by bringing the support and pretreatment reagents into contact, in order to obtain a pretreated support of Formula LII,

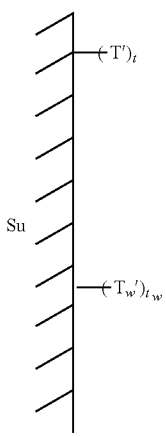

Formula LII in which:
  T' and $T_w'$ are compounds derived from the pretreatment of the support Su, containing either fragments of the support, or fragments of the pretreatment reagents, or fragments of the support and fragments of the pretreatment reagents,
  t and $t_w$ are integers equal to 0 or 1,
  b. optionally a step of pre-grafting onto the optionally pretreated support of Formula LII by bringing the support into contact with polymerization initiators, in order to obtain a support that is optionally pretreated and optionally pre-grafted of Formula LIII,

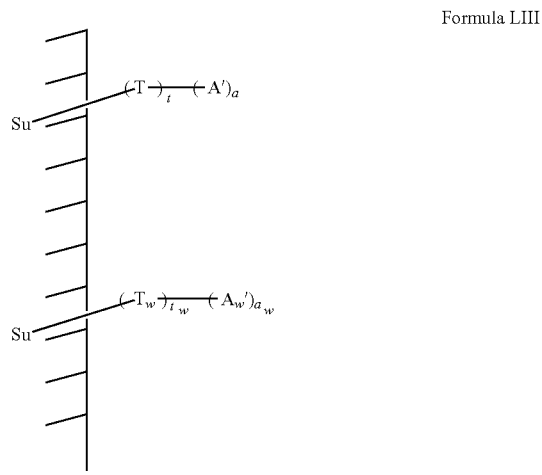

Formula LIII in which:
  A' and $A_w'$ are compounds resulting from the pre-grafting step on the support, containing fragments of polymerization initiators,
  a and aw are integers equal to 0 or 1,
  c. a radical polymerization step, starting with the priming of the pretreated and pre-grafted support of Formula III, said priming is followed by bringing the pretreated and pre-grafted support into contact with the 4-vinylpyridine derivative of Formula XXXIII and of Formula LIV,

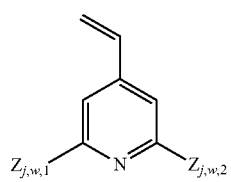

Formula LIV in which:
  $Z_{j,w,1}$ and $Z_{j,w,2}$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and optionally containing sulfur or phosphorus atoms,
said polymerization step being carried out:
  optionally with at least one co-monomer,
  with or without crosslinking, to obtain a polymer grafted onto a support of Formula LV,

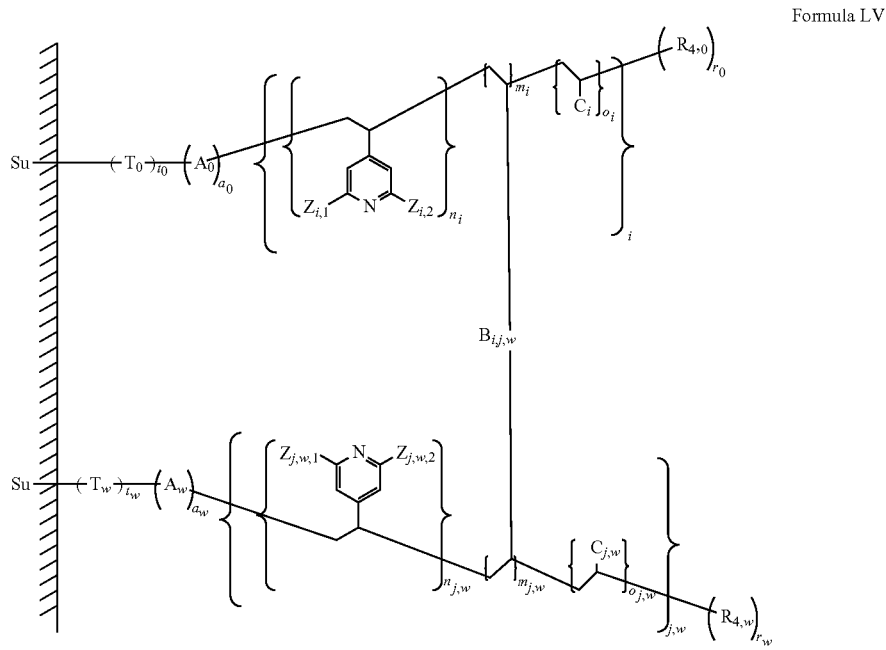

Formula LV in which:

the definitions of $Z_{i,1}$, $Z_{i,2}$, Su, w, $T_0$, $T_w$, $A_0$, $A_w$, $B_{i,j,w}$, $C_i$, $C_{j,w}$, $R_{4,0}$, $R_{4,w}$, $t_0$, $t_w$, $a_0$, $a_w$, $n_i$, $m_i$, $o_i$, $n_{j,w}$, $m_{j,w}$, $o_{j,w}$, $r_0$ and $r_w$ are as described in Formula XX, d. a modification step, when at least one of the $Z_{i,1}$ is different from $R_{i,1}$ or when at least one of the $Z_{i,2}$ is different from $R_{i,2}$ or when at least one of the is different from $R_{j,w,1}$ or when at least one of the $Z_{j,w,2}$ is different from $R_{j,w,2}$, of said polymer grafted on a support of Formula LV with a reagent for modifying at least one of $Z_{i,1}$ or $Z_{i,2}$, said reagent containing a hydroxide, carbonate or phosphate anion, to obtain the polymer grafted on a support of Formula LVI,

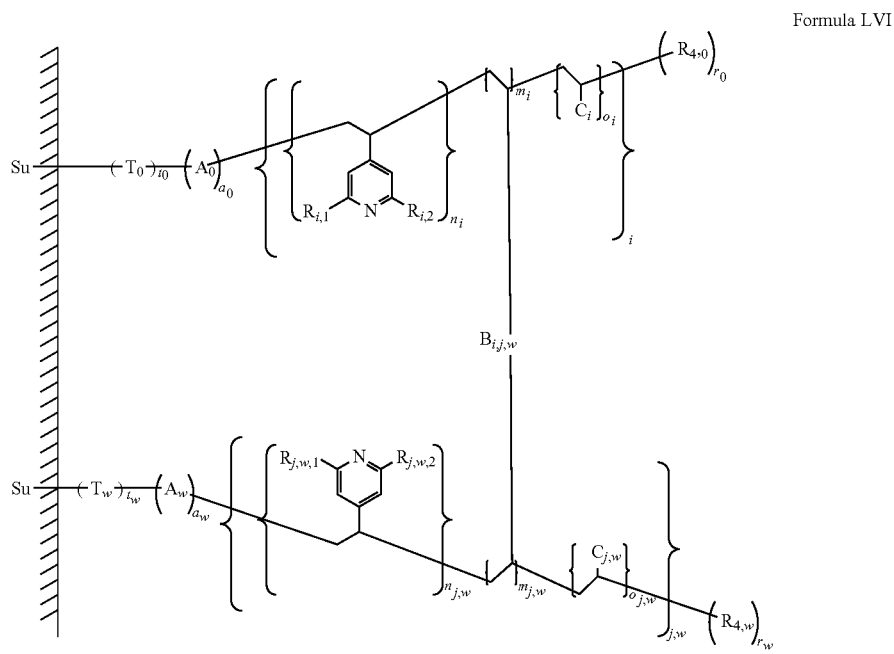

Formula LVI e. optionally a complexing step of said polymer grafted on a support of Formula LVI with at least one metal cation to obtain the polymer grafted on a support of Formula XX.

In this embodiment, the method for synthesizing the polymer grafted onto a support of Formula XX is a polymerization according to the "grafted from" technique.

In this embodiment, the method for synthesizing a polymer grafted onto a support of Formula XX begins:
- either by a step of pretreatment of the support if the surface of the support does not have a binding site,
- or by a step of pre-grafting of the support if the surface of the support has binding sites, but that these so-called binding sites cannot undergo priming to initiate radical polymerization,
- or by a radical polymerization step if the surface of the support has binding sites, and these said binding sites can undergo initiation to initiate radical polymerization.

The method for synthesizing a polymer grafted onto a support of Formula XX continues:
- either by a step of pre-grafting the support, if the support has been pretreated and said pretreated support cannot be primed to initiate radical polymerization, said method continuing in this case with a radical polymerization step using the pretreated and pre-grafted support as a polymerization initiator,
- or by a radical polymerization step, if the support has been pretreated and said pretreated support can undergo initiation to initiate radical polymerization, using the pretreated support as a polymerization initiator,
- or by a radical polymerization step if the support has not been pretreated and said support has been pre-grafted, using the pre-grafted support as a polymerization initiator.

The polymerization step polymerizes all of the cross-linked polymers simultaneously by bringing the support into contact, co-monomers capable of forming crosslinking bridges, co-monomers not capable of forming crosslinking bridges, as well as monomers derived from 4-vinylpyridine.

After the polymerization and the obtaining of a polymer grafted on a support of Formula LV, if the substituent groups of the monomer units derived from 4-vinylpyridine are different in Formula XX and Formula LV, a modification step is carried out for allow the substituent groups of Formula LV different from those of Formula XX to react and thus obtain the polymer grafted on a support of Formula LVL.

If the polymer grafted on a support of Formula XX is complexed with metals, a step of complexing the polymer grafted on a support of Formula LVI is necessary to obtain the polymer grafted on a support of Formula XX.

The present invention further relates to a method for the preparation of a polymer grafted in particular covalently to a support, as defined above, comprising the following preparation steps:
a. optionally a step of pretreatment of the support by bringing said support into contact with a pretreatment reagent and/or by the action of a physical pretreatment on said support, in order to obtain a support that may be pretreated,
b. a radical polymerization step by bringing into contact:
   an initiated polymerization initiator,
   at least one monomer derived from 4-vinylpyridine in which the carbons in positions 2 and 6 can be substituted by one of the substituents of the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings of which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and being able to contain sulfur or phosphorus atoms,
   and optionally at least one co-monomer.
to obtain a free polymer,
c. a step of grafting onto the support optionally pretreated by bringing said support optionally pretreated with the free polymer, in order to obtain a polymer grafted onto the support,
d. optionally a modification step by bringing the polymer grafted onto the support into contact with a reagent to modify at least one of the abovementioned substituents $Z_{i,1}$ and $Z_{i,2}$, to obtain a polymer grafted onto the support and optionally modified,
e. optionally a complexation step by bringing the polymer grafted onto the support and optionally modified with a metal cation to obtain a polymer grafted onto the support, optionally modified and optionally complexed.

The steps of this method can be in any order, provided that:
step a is before step c,
step b is before step c,
step b is before step d,
step d is before step e,
in particular the following orders: abcde; abdce; abdec; bacde; badce; badec; bdace; bdaec; bdeac.

The method for the synthesis of a polymer grafted onto a support according to the present invention can be a "grafted to" method.

The polymer synthesis method according to the present invention has the advantage of being flexible. The method steps can take place in different orders. The constraints to be respected are:
the optional pre-treatment step takes place before the grafting step,
the polymerization step takes place before the grafting step,
the polymerization step takes place before the modification step,
the modification step takes place before the complexation step.

Eligible step orders are:
pretreatment, polymerization, grafting, modification, complexation,
pretreatment, polymerization, modification, grafting, complexation,
pretreatment, polymerization, modification, complexation, grafting,
polymerization, pretreatment, grafting, modification, complexation,
Polymerization, pretreatment, modification, grafting, complexation,
polymerization, pretreatment, modification, complexation, grafting,
polymerization, modification, pretreatment, grafting, complexation,
polymerization, modification, pretreatment, complexation, grafting,
polymerization, modification, complexation, pretreatment, grafting.

The method for the synthesis of the polymers according to the present invention can comprise an additional step of preparation of the monomers derived from 4-vinylpyridine.

According to the present invention, the term "initiated polymerization initiator" means a polymerization initiator which has undergone the initiation phase and which is capable of binding to a monomer to form the first monomer unit. According to a particular embodiment, the method for the preparation, as defined above, of a polymer of the invention grafted onto a support, of Formula II, in which the definitions of $R_1$ and $R_2$ are such as described in Formula II, comprises:

a. a radical polymerization step by bringing a primed polymerization initiator into contact with a 4-vinylpyridine derivative of Formula XXXIII,

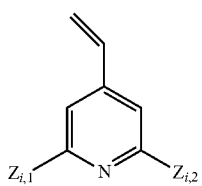

Formula XXXIII in which:
$Z_{i,1}$ and $Z_{i,2}$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether with 1 to 20 carbons, ester with 1 to 20 carbons, amine with 1 to 20 carbons, heterocycle with 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents being able to be cyclized with one another and optionally containing sulfur or phosphorus atoms, with optionally at least one co-monomer,
to obtain a free polymer of Formula LVII,

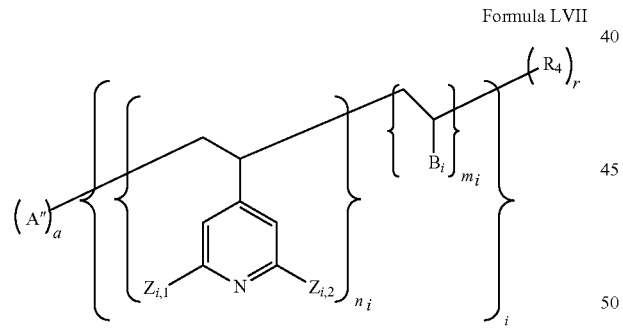

Formula LVII in which:
the definitions of $R_4$, $B_i$, $n_i$, $m_i$, r, a, and; are as described in Formula II,
A" is a compound derived from the polymerization initiator, b. optionally a pretreatment step of the support by bringing said support into contact with a pretreatment reagent and/or by the action of a physical pretreatment on said support, in order to obtain an optionally pretreated support of Formula XXXI, c. a step of grafting onto the optionally pretreated support of Formula XXXI by bringing the optionally pretreated support into contact with the free polymer of Formula LVII, to obtain a polymer grafted onto the support of Formula XXXIV,

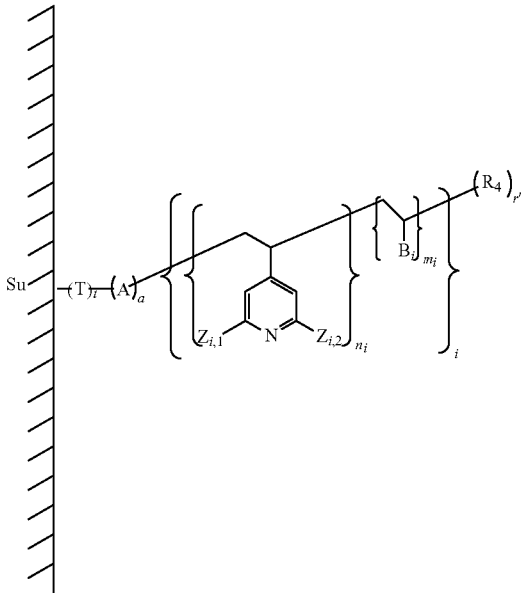

Formula XXXIV in which:
A is a compound derived from the polymerization initiator, d. a modification step, when at least one of $Z_{i,1}$ is different from $R_{i,1}$ or when at least one of $Z_{i,2}$ is different from $R_{i,2}$ of said polymer Formula XXXIV with a reagent for modifying one at least of the above substituents $Z_{i,1}$ and $Z_{i,2}$, said reagent containing a hydroxide, carbonate or phosphate anion, to obtain the polymer grafted on a support of Formula XXXV

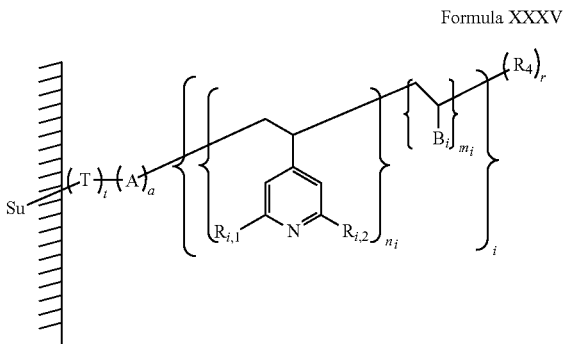

Formula XXXV e. optionally a complexation step of said polymer grafted on a support of Formula XXXV with at least one metal cation to obtain the polymer grafted on a support of Formula II.

In this embodiment, the method for synthesizing a polymer grafted onto a support of Formula II comprises the following steps: polymerization, modification, complexation, pretreatment, grafting.

In this embodiment, the method for synthesizing the polymer grafted onto a support of Formula II is a polymerization according to the "grafted to" technique.

According to a particular embodiment, the method for the preparation, as defined above, of a polymer of the invention grafted onto a support, of Formula II, in which the definitions of $R_{i,1}$ and $R_{i,2}$ are as described in Formula II, includes:

a. a radical polymerization step by bringing a polymerization initiator initiated into contact with a 4-vinylpyridine derivative of Formula XXXIII, with optionally at least one co-monomer, to obtain a free polymer of Formula LVII, Formula LVII

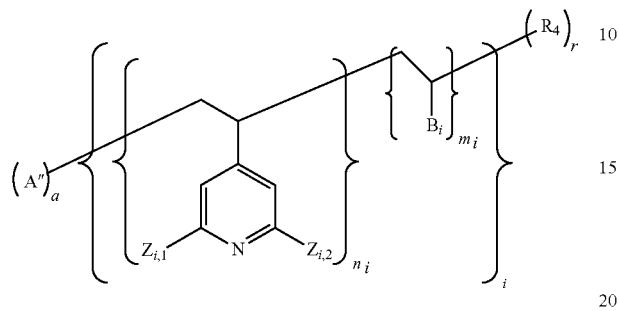

in which:
the definitions of $R_4$, $B_i$, $n_i$, $m_i$, r, a, and i are as described in Formula II,
the definitions of $Z_{i,1}$, $Z_{i,2}$ are as in Formula XXXIII,
the definition of A" is such that in Formula LVII,
b. a modification step, when at least one of $Z_{i,1}$ is different from $R_{i,1}$ or when at least one of $Z_{i,2}$ is different from $R_{i,2}$, of said Formula LVII with a reagent for modifying at least one of the above substituents $Z_{i,1}$ and $Z_{i,2}$, said reagent containing a hydroxide, carbonate or phosphate anion, to obtain the free polymer of Formula LVIII, Formula LVIII

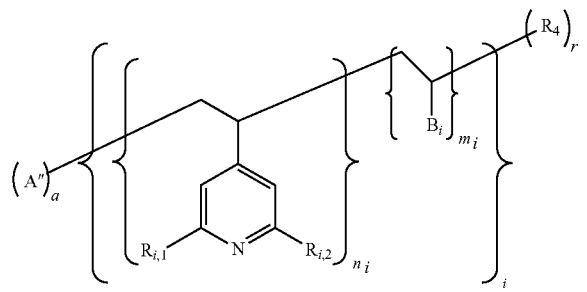

c. optionally a step of complexing said free polymer of Formula LVIII with at least one metal cation to obtain the free polymer of Formula LIX, in which:
the definitions of $M_i$, $x_i$, and $p_i$, are as described in Formula II,
d. optionally a step of pretreatment of the support by bringing said support into contact with a pretreatment reagent and/or by the action of a physical pretreatment on said support, in order to obtain an entirely pretreated support of Formula XXXI, Formula XXXI

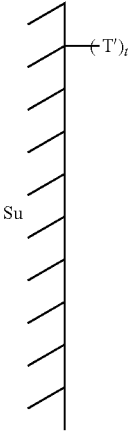

in which:
T' is a compound derived from the pretreatment of the support Su, containing either fragments of the support, or fragments of the pretreatment reagent, or fragments of the support and of the pretreatment reagent,
t is an integer equal to 0 or 1,
e. a step of grafting onto the support optionally pretreated with Formula XXXI by bringing the support into contact with the free polymer of Formula LIX, in order to obtain a polymer grafted on the support of Formula II In this embodiment, the method for the synthesis of a polymer grafted onto a support of Formula II is in the form of polymerization, modification, complexation, pretreatment, grafting.

In this embodiment, the method for synthesizing the polymer grafted onto a support of Formula II is a polymerization according to the "grafted to" technique.

According to a particular embodiment, said step of polymerization of the method of preparation, as defined above, of a polymer grafted on a support of the invention Formula LIX

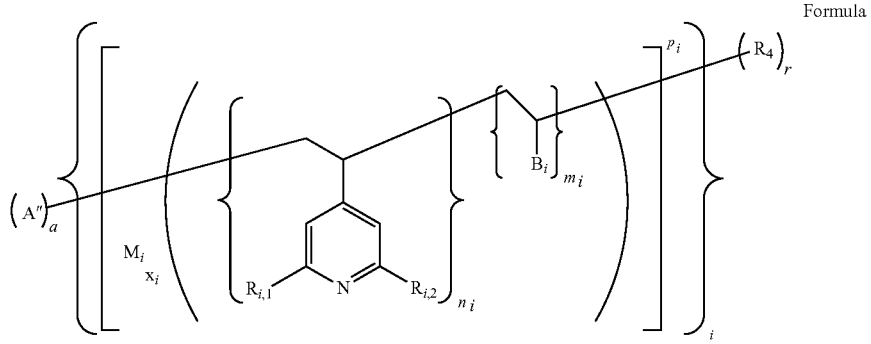

grafted on a support, brings into contact a derivative of 4-vinylpyridine of Formula XLIX,

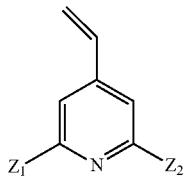

Formula XLIX in which:
Z$_1$ and Z$_2$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, the said substituents optionally being cyclized with one another and optionally containing sulfur or phosphorus atoms, with a polymer grafted onto a support of Formula LX,

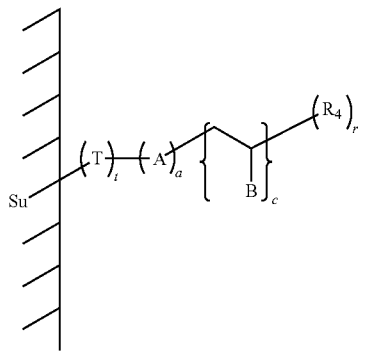

Formula LX in which:
the definitions of Su, A, T, B, R$_4$, r, a, t and c are as described in Formula XVIII, to obtain a polymer grafted onto a support of Formula LXI, Formula LXI

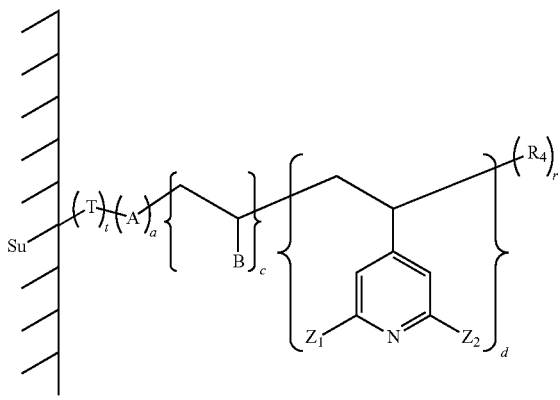

in which:
the definition of d is as described in Formula XVIII.

In this embodiment, the polymerization step of the method for synthesizing the polymer grafted onto a support of Formula XVIII is a block polymerization starting with the initiation of a polymer grafted onto a support of Formula LX. This initiation makes it possible to initiate the step of radical polymerization of the monomers derived from 4-vinylpyridine. This polymerization makes it possible to form a block following the first preexisting block on the polymerization initiator used.

In this embodiment, the polymerization step of the method for synthesizing the grafted polymer on a support of Formula XVIII is a "grafted from" technique.

According to a particular embodiment, said method for the preparation, as defined above, of a polymer of the invention, includes:

a. a step of pretreatment of the support by bringing said support into contact with a pretreatment reagent and/or by the action of a physical pretreatment on said support, in order to obtain a pretreated support of Formula XXXI, b. a step of pre-grafting said pretreated support of Formula XXXI by bringing it into contact with a polymerization initiator, in order to obtain a pretreated and pre-grafted support of Formula XXXII, c. a radical polymerization step by bringing the pretreated and pre-grafted support of Formula XXXII into contact with a co-monomer of Formula LXII to obtain said free polymer of Formula LX,

Formula LXII in which the definition of B is as described in Formula XVIII, before the radical polymerization step by bringing a monomer derived from 4-vinylpyridine of Formula XXXIII into contact with a polymer grafted onto a support of Formula LX.

In this embodiment, the method for synthesizing the polymer grafted onto a support of Formula XVIII begins with the polymerization of the co-monomers which allows the synthesis of the polymer grafted onto a support of Formula LX This polymer grafted onto a support is then used as polymerization initiator.

According to a particular embodiment, said polymerization step of the preparation method, as defined above, of a polymer of the invention grafted on a support, brings into contact an initiator of polymerization initiated with the derivative of 4-vinylpyridine of Formula XXXIII, to obtain a free polymer of Formula LXIII Formula LXIII

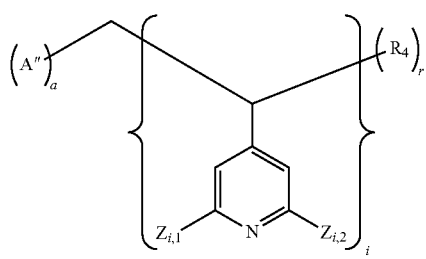

in which:
- the definitions of $R_4$, r, a, and i are as described in Formula II,
- the definitions of $Z_{i,1}$ et $Z_{i,2}$ are as described in Formula XXXIII,
- the definition of A" is as described in Formula LVII.

In this embodiment, the polymerization step of the method for synthesizing the polymer grafted onto a support of Formula III makes it possible to polymerize only monomer units derived from 4-vinylpyridine, in order to obtain a free polymer containing only monomer units derived 4-vinylpyridine.

In this embodiment, the polymerization step of the method for synthesizing the polymer grafted onto a support of Formula III can only be integrated into a "grafted to" technique.

According to a particular embodiment, said step of polymerization of the method for the preparation, as defined above, of a polymer of the invention grafted onto a support, brings into contact an initiated polymerization initiator with the derivative of 4-vinylpyridine of Formula XLIX, to obtain a free polymer of Formula LXIV, Formula LXIV

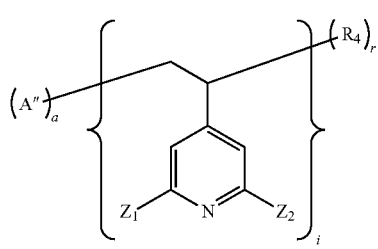

in which:
- the definitions of A", $Z_1$, $Z_2$, $R_4$, r, a, and i are as described in Formula IV, In this embodiment, the polymerization step of the method for synthesizing the polymer grafted onto a support of Formula IV makes it possible to polymerize a single type of monomer units derived from 4-vinylpyridine, in order to obtain a free homopolymer comprising only monomer units derived from 4-vinylpyridine.

In this embodiment, the polymerization step of the method for synthesizing the polymer grafted onto a support of Formula IV can only be integrated into a "grafted to" technique.

According to a particular embodiment, the method for the preparation, as defined above, of a polymer of the invention grafted onto a support, said polymer being of Formula XXVIII and said support being made of PET comprises:

a. a step of pretreatment of a PET support by bringing said support into contact with polyethyleneimine to obtain a pretreated support of Formula LXV, Formula LXV

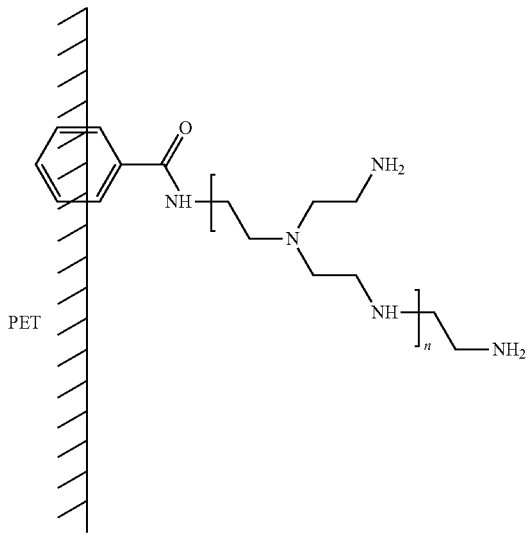

in which
T' represents a compound of Formula LXVI,

Formula LXVI

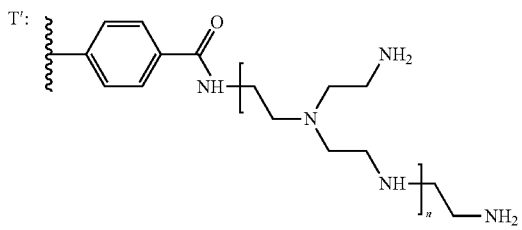

b. a step of pre-grafting the pretreated support of Formula LXV by bringing said support into contact with 4-(chloromethyl)benzoyl chloride, to obtain a pretreated and re-grafted support of Formula LXVII, Formula LXVII

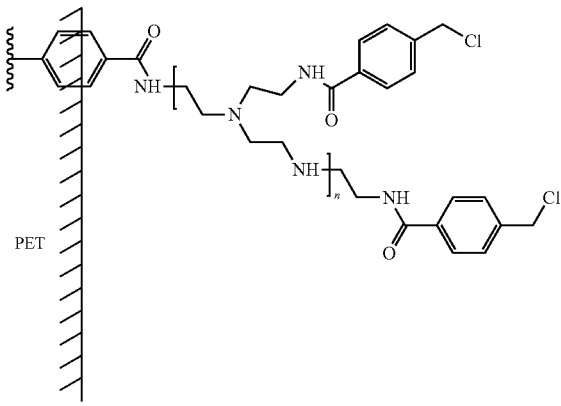

in which
T represents a compound of Formula XXII and X' a compound of Formula LXVIII,

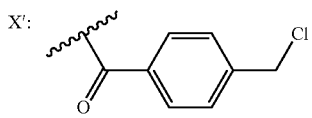
Formula LXVIII c. a radical polymerization step on the pretreated and pre-grafted support of Formula LXVII of the 4-vinylpyridine derivative of Formula LXIX,

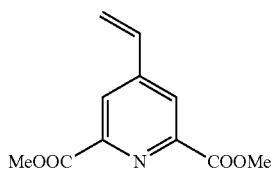
Formula LXIX by reacting said support with said derivative and with $CuCl_2$, TPMA and metallic copper, to obtain a polymer grafted on a support of Formula XXVII in which X represents a compound of Formula LXX et $R_4$ represents a chlorine atom.

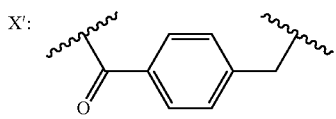
Formula LXX d. a step of modifying the polymer grafted on a support of Formula XXVII with a base to obtain a polymer grafted on a support of Formula XXVIII.

In this embodiment, the method for synthesizing the polymer grafted onto a support of Formula XXVIII is a polymerization according to the "grafted from" technique.

In this embodiment, the method for synthesizing the polymer grafted onto a support of Formula XXVIII comprises:
  a step of pretreatment of the support to obtain a pretreated support for Formula LXV,
  a pre-grafting step to obtain—a pretreated and pre-grafted support of Formula LXVII,
  a radical polymerization step using the pretreated and pre-grafted support as initiator to obtain a polymer grafted on a support of Formula XXVII,
  a modification step using the polymer grafted on a support of Formula XXVII to obtain a polymer grafted on a support of Formula XVIII.

In this embodiment, the support on which the polymer is grafted is made of PET.

According to a particular embodiment, the method for the preparation, as defined above, of a polymer of the invention grafted onto a support, said polymer being of Formula XXXV and said support being silica, comprises:
  a. a step of pretreatment of a silica support by bringing the support into contact with an acid to obtain a pretreated support of Formula LXXI,

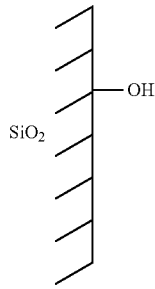
Formula LXXI in which
T' represents Si—OH,
  b. a step of pre-grafting the pretreated support of Formula LXXI by bringing said support into contact with APTES-CMB of Formula XXIII,
to obtain a pretreated and pre-grafted support of Formula LXXII,

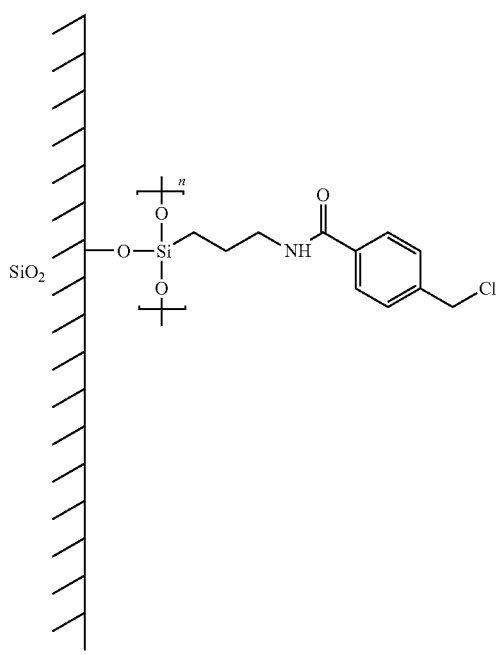
Formula LXXII in which
T represents —O— and X' represents the compound of Formula LXXIII,

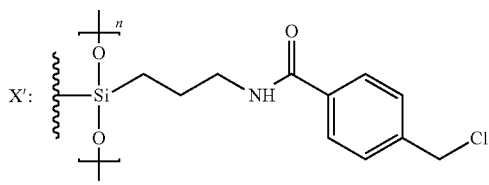
Formula LXXIII c. a step of radical polymerization of the 4-vinylpyridine derivative of formula LXIX, on the pretreated and pre-grafted support of Formula LXXII by reacting said support with said derivative and with CuCl$_2$, TPMA and metallic copper, to obtain a polymer grafted onto a support of Formula XXV in which X represents the compound of Formula LXXIV and R$_4$ a chlorine atom, Formula LXXIV

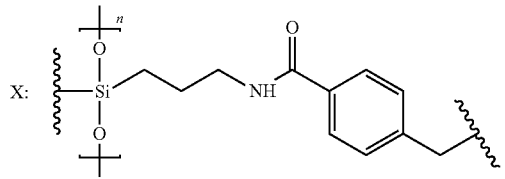

d. a step of modifying the polymer grafted on a support of Formula XXV with a base to obtain a polymer grafted on a support of Formula XXVI.

In this embodiment, the method for synthesizing the grafted polymer on a support of Formula XXVI is a polymerization using the "grafted from" technique.

In this embodiment, the method for synthesizing the polymer grafted onto a support of Formula XXVI comprises:
- a step of pretreatment of the support to obtain a pretreated support of Formula LXXI,
- a step of pre-grafting to obtain a pretreated and pre-grafted support of Formula LXVII,
- a radical polymerization step using the pretreated and pre-grafted support as initiator to obtain a polymer grafted on a support of Formula XXV,
- a modification step using the polymer grafted on a support of Formula XXV to obtain a polymer grafted on a support of Formula XXVI.

In this embodiment, the support on which the polymer is grafted is SiO$_2$.

According to a particular embodiment, the method for the preparation, as defined above, of a polymer of the invention grafted onto a support, said polymer being of Formula XXX and said support comprising PVC and PVDC, comprises:
a. a step of polymerization of the 4-vinylpyridine derivative of Formula LXIX, on said support, by reacting said support with said derivative and with CuCl$_2$, TPMA and metallic copper, to obtain a polymer grafted on a support of Formula XXIX, in which R$_4$ represents a chlorine atom,
b. a step of modifying the polymer of Formula XXIX with a base to obtain a polymer grafted on a support of Formula XXX.

In this embodiment, the method for synthesizing the polymer grafted onto a support of Formula XXX is a polymerization according to the "grafted from" technique.

In this embodiment, the method for synthesizing the polymer grafted onto a support of Formula XXVI comprises:
- a radical polymerization step by directly using the support as initiator to obtain a polymer grafted on a support of Formula XXIX,
- a modification step using the polymer grafted on a support of Formula XXV to obtain a polymer grafted on a support of Formula XXX.

In this embodiment, the support on which the polymer is grafted is PVC-co-PDVC.

According to a particular embodiment, said radical polymerization step of the preparation method, as defined above, may be a polymerization of NMP, RAFT, ATRP type or a conventional radical polymerization.

According to a particular embodiment, the method for preparing a polymer of the invention of Formula XXX, comprises:
a. a first reaction step by bringing a compound of Formula LXXV into contact Formula LXXV

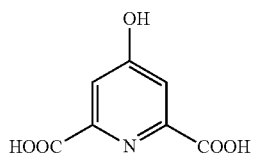

with PhPOCl$_2$ and methanol to synthesize the compound of Formula LXXVI,

Formula LXXVI

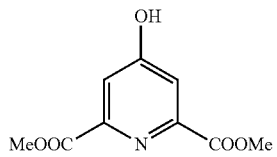

b. a second reaction step by bringing a compound of Formula LXXVI into contact with NaI, MeCN and MeCOCl to synthesize the compound of Formula LXXVII, Formula LXXVII

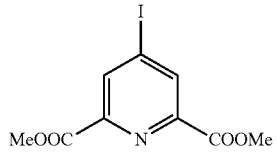

c. a third reaction step by bringing the compound of Formula LXXVII into contact with CH$_2$=CHBF$_3$K, du Cs$_2$CO$_3$, du PPh$_3$, and Pd(OAc)$_2$ to synthesize the compound of Formula LXXVIII, Formula LXXVIII

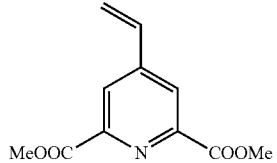

d. a fourth reaction step by bringing the compound of Formula LXXVIII into contact with a support of PVC-co-PDVC, CuCl$_2$ and metallic copper to synthesize the compound of Formula XXIX, e. a fifth reaction step by bringing the compound of Formula XXIX into contact with sodium hydroxide to obtain the compound of Formula XXX.

Formula XXX

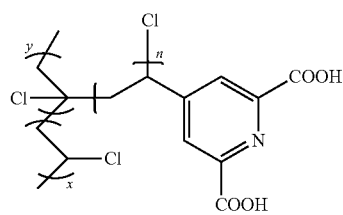

The present invention further relates to the use of the composition of the present invention chosen from the group comprising the capture of metals and their restitution, homogeneous or heterogeneous catalysis, labeling of organic and/or inorganic surfaces, labeling by fluorescence of biomolecules.

According to a particular embodiment, the composition of the present invention can be used as an adsorbent of metals in seawater, in particular the adsorption of actinides and lanthanides, more particularly the adsorption of uranium and even more particularly the selective absorption uranium versus vanadium.

According to a particular embodiment, the composition of the present invention can be used as a treatment for effluents contaminated with metals, in particular radioactive effluents and in particular nuclear waste from nuclear power plants.

DESCRIPTION OF THE PREFERRED EMBODIMENTS

Figure 1:
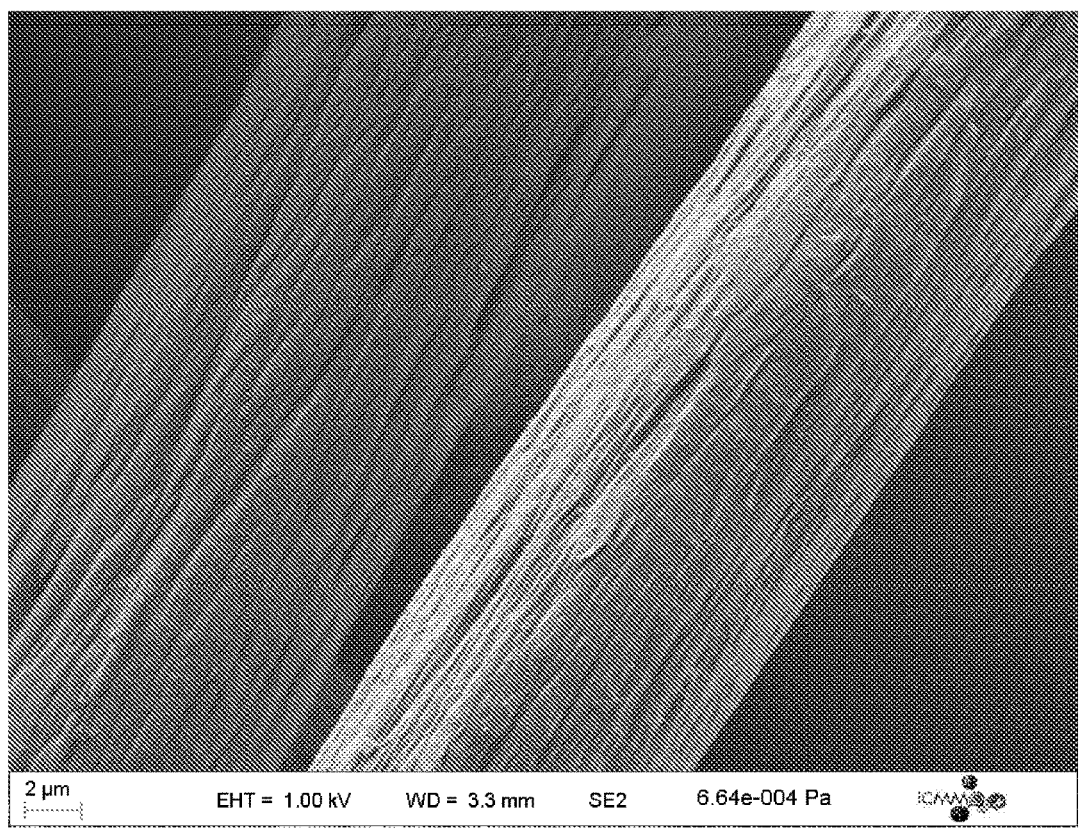
FIG. 1 shows the image of PVC-co-PDVC fibers (PVC/PDVC=7/3) before grafting obtained by scanning electron microscopy. The average diameter of the fibers is 12 μm.
Figure 2:
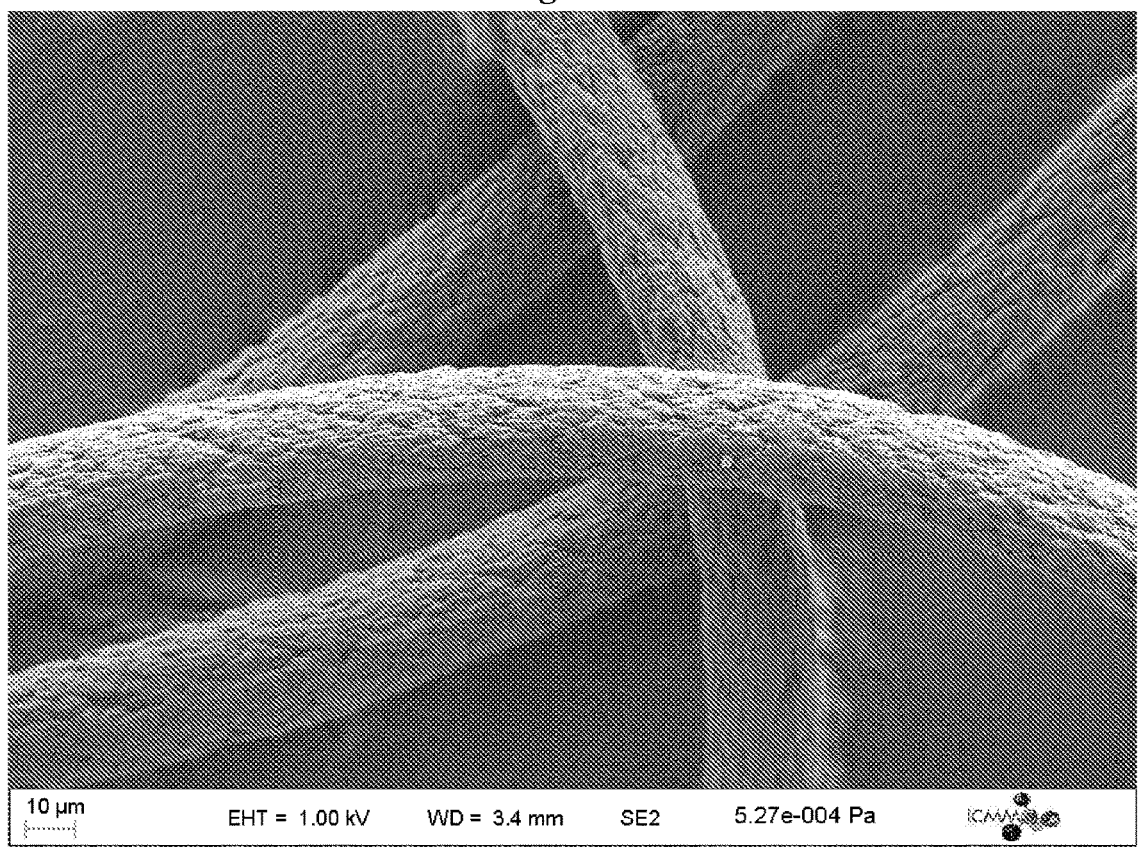
FIG. 2 represents the image of PVC-co-PDVC fibers (PVC/PDVC=7/3) after grafting of poly(2,6-dicarboxylic acid-4-vinylpyridine) obtained by scanning electron microscopy. The average diameter of the fibers is 23 μm.
Figure 3:
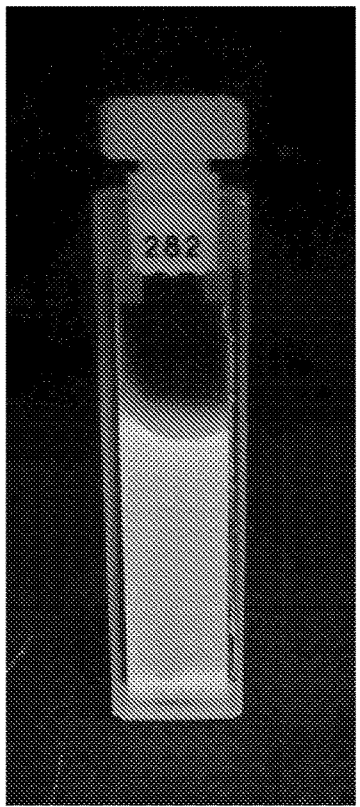
FIG. 3A shows a solution of uranyl nitrate at neutral pH with $UO_2(NO_3)_2$ alone. ($C_{uranyl}$=1 mM, $\lambda_{light}$=254 nm, room T).
FIG. 3B represents a uranium uptake test in the form of uranyl nitrate in solution at neutral pH with $UO_2(NO_3)_2$ and grafted poly(2,6-dicarboxylic acid-4-vinylpyridine) on the PVC-co-PDVC support of FIG. 2, ($C_{uranyl}$=1 mM, $m_{polymer}$=15 mg, $\lambda_{light}$=254 nm, room T). The fibers have a degree of grafting of 40%. (Degree of grafting=100×gain in mass of fibers/mass of fibers before grafting). Uranium ions are completely captured, within the detection limit (>98%).
Figure 3:
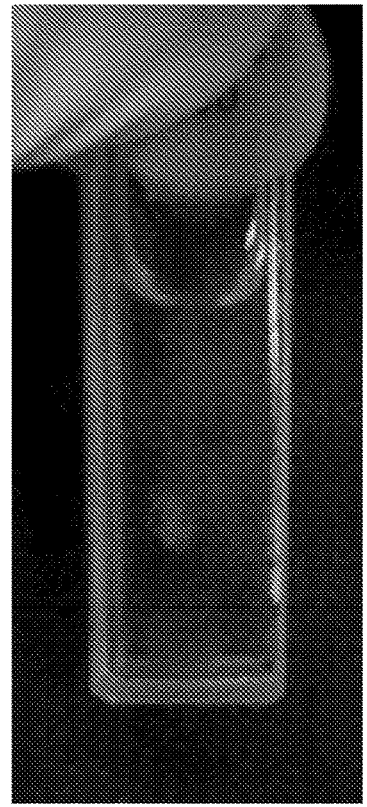

Example 1: Synthesis of the Monomer Dimethyl 4-vinylpyridine-2,6-dicarboxylate a. Synthesis of 4-hydroxypyridine-2,6-carboxylic Acid

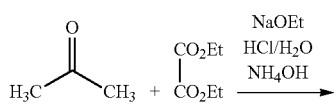

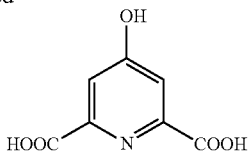

This reaction is known in the prior art, in particular in the reference. RSC Adv., 2014, 4, 25486.

b. Synthesis of Dimethyl 4-chloropyridine-2,6-dicarboxylate

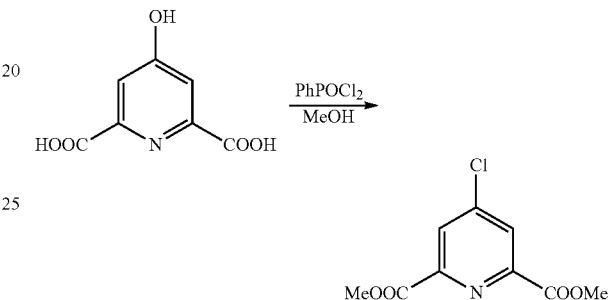

This reaction is known in the prior art, in particular in the reference J. Chem. Soc, Dalton Trans., 2000, 2031-2043.

c. Synthesis of Dimethyl 4-iodopyridine-2,6-dicarboxylate

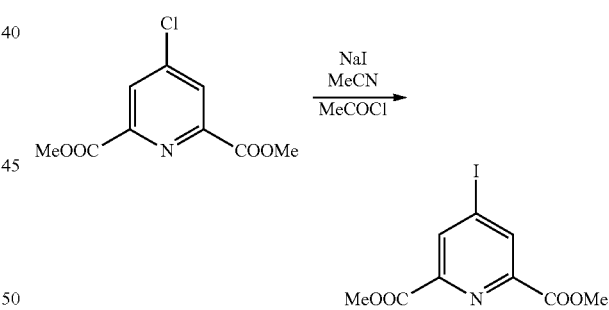

This reaction is known in the prior art, in particular in the reference Tetrahedron, 2008, 64, 399-411.

d. Synthesis of Dimethyl 4-vinylpyridine-2,6-dicarboxylate

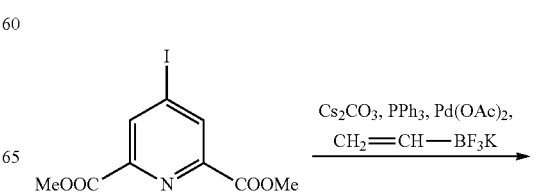

-continued

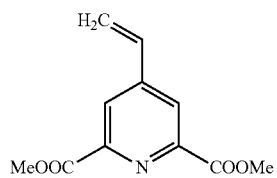

dimethyl 4-iodopyridine-2,6-dicarboxylate (6.2 mmol) was added to a flask with 1 mmol of triphenylphosphine, and 0.33 mmol of Palladium(II) acetate. These compounds were dissolved in 20 mL of a THF/water solution (Ratio 9/1). Cesium(III) carbonate (1 mmol) and potassium vinyl trifluoroborate (7.5 mmol) were added to the mixture. The medium was heated to 85° C. for 8 h with stirring, then cooled and finally filtered. The white residue obtained was washed with ethyl acetate and then concentrated. The concentrate obtained was purified on silica gel. Elution with a mixture of petroleum ether and ethyl acetate (3/1 Ratio) made it possible to obtain dimethyl 4-vinylpyridine-2,6-dicarboxylate in the form of one gram of white solid at 78% by mass, recrystallized from a mixture of dichloromethane and petroleum ether (1/10 Ratio).

Example 2: Preparation of the Supports

Preparation of the Pre-Poly(Ethylene Terephthalate) (PET) Support

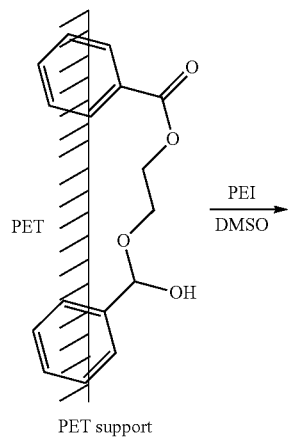

-continued

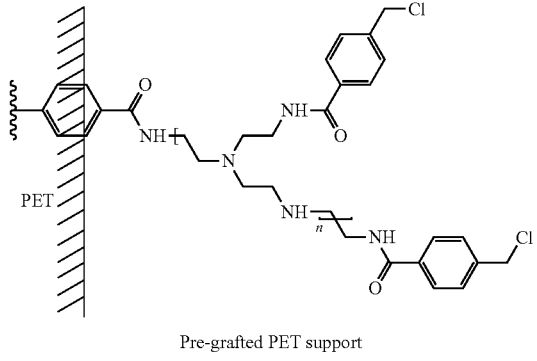

Pre-grafted PET support

PET fibers were aminolyzed in a solution of Polyethyleneimine between 5 and 10 mol % and dimethyl sulfoxide at 50° C. for 6 h. The fibers were then washed with water and dried, which made it possible to obtain a pretreated PET support. The pretreated support was then added in a solution of 4-(chloromethyl)benzoyl chloride in diethyl ether in the presence of ethylamine overnight. The resulting fibers were washed with dichloromethane and then dried, which made it possible to obtain a pre-grafted PET support.

b. Preparation of the Pre-Grafted Silica Support

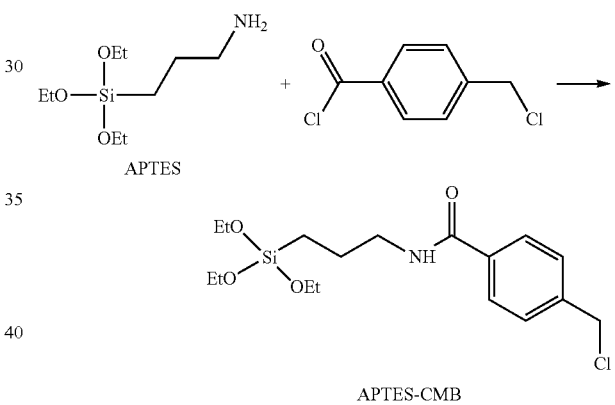

An initiator (APTES-CMB) was obtained by reaction between 6.2 mL of 3-aminopropyltriethoxysilane and 5.5 g of 4-(chloromethyl)benzoyl chloride under an inert atmosphere, in the presence of 4.5 mL of triethylamine, the whole being dissolved in 20 mL dichloromethane.

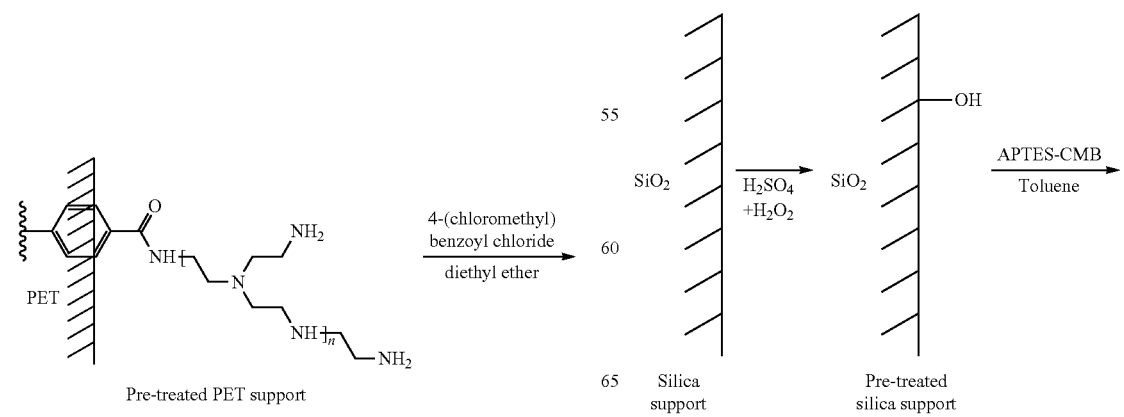

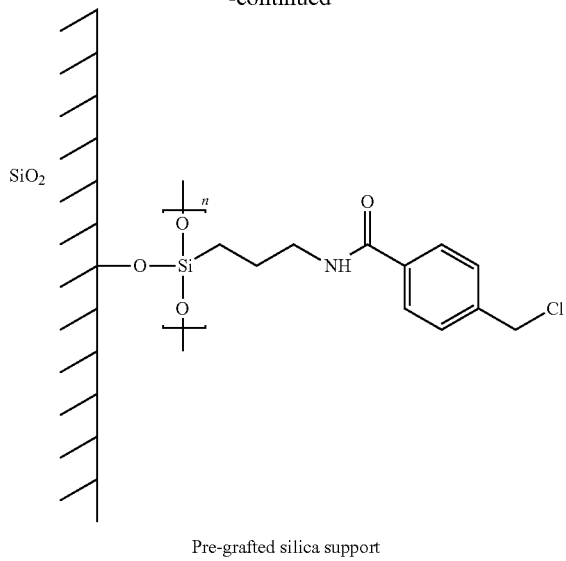

Pre-grafted silica support

A silica surface was treated with a piranha solution (mixture of sulfuric acid and hydrogen peroxide 7/3 by volume) which made it possible to obtain a pretreated silica support. The pretreated silica was placed in a solution containing APTES-CMB in anhydrous toluene. The mixture was brought to 70° C. for one hour and then it was washed with toluene and then water. The resultant was annealed at 100° C. for 15 minutes. The solid obtained is the pre-grafted silica support.

Example 3: Synthesis of Poly(dimethyl 4-vinylpyridine-2,6-dicarboxylate) Grafted onto the PET Support in "Rafted From"

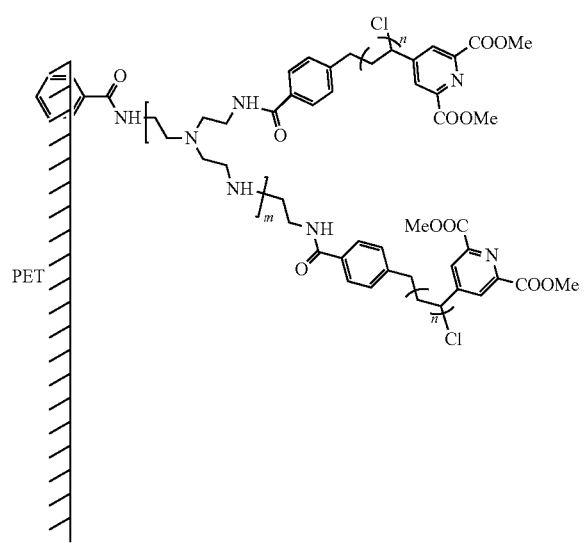

Dimethyl-4-pyrimidine-2,6-dicarboxylate (1.5 mmol) was dissolved in a volume of 3 ml of an organic solvent (acetonitrile). $CuCl_2$ (0.15 μmol) was added to the solution as well as 0.6 μmol of TPMA and 3 cm of copper wire (diameter 1 mm). A 2 cm by 1 cm plate of pre-grafted PET support was added to the solution. The reactor was left at room temperature for a time proportional to the thickness of the desired polymer layer (from a few hours to a few days). The plate was then washed with acetonitrile and then dried.

Example 4: Preparation of the Poly(4-vinylpyridine-2,6-dicarboxylic Acid) Grafted on the PET Support in "Grafted From"

The poly(dimethyl 4-vinylpyridine-2,6-dicarboxylate) grafted on the PET support plate, obtained previously, was inserted into 3 mL of 1 M NaOH. The plate is washed with 2M hydrochloric acid, then with distilled water. The poly(4-vinylpyridine-2,6-dicarboxylic acid) on the PET support was then recovered.

Example 5: Preparation of Poly(dimethyl 4-vinylpyridine-2,6-dicarboxylate) Grafted onto the Silica Support in "Grafted From"

Dimethyl 4-vinylpyridine-2,6-dicarboxylate (1.5 mmol) was dissolved in a volume of 3 ml of an organic solvent (Acetonitrile). $CuCl_2$ (0.15 μmol) was added to the solution as well as 0.6 μmol of TPMA and 3 cm of copper wire (diameter 1 mm). A plate of 2 cm by 1 cm of pre-grafted silica support was added to the solution. The reactor was left at room temperature for a time proportional to the thickness of the desired polymer layer (from a few hours to a few days). The plate was then washed with acetonitrile and then dried.

Example 6: Preparation of poly(4-vinylpyridine-2,6-dicarboxylic Acid) Grafted onto the Silica Support in "Grafted From"

The poly(2,6-dimethyl 4-vinylpyridine dicarboxylate) grafted onto the silica support plate, obtained previously, was inserted into 3 ml of 1 M NaOH. The plate is washed with 2M hydrochloric acid, then with distilled water. The poly(4-vinylpyridine-2,6-dicarboxylic acid) on the silica support was then recovered.

Example 7: Preparation of poly(dimethyl 4-vinylpyridine-2,6-dicarboxylate) Grafted onto the PVC-co-PVDC Support in "Grafted From"

Dimethyl 4-vinylpyridine-2,6-dicarboxylate (1.5 mmol) was dissolved in a volume of 3 ml of an organic solvent (acetonitrile). $CuCl_2$ (0.15 μmol) was added to the solution as well as 0.6 μmol of TPMA and 3 cm of copper wire (diameter 1 mm). PVC-co-PVDC fibers (50 mg) were added to the solution. The reactor was left at room temperature for a time proportional to the thickness of the desired polymer layer (from a few hours to a few days). The fibers were then washed with acetonitrile and then dried.

Example 8: Preparation of the poly(4-vinylpyridine-2,6-dicarboxylic Acid) Grafted onto the PVC-co-PVDC Support in "Grafted From"

The poly(dimethyl 4-vinylpyridine-2,6-dicarboxylate) grafted on the PVC-Co-PVDC support fibers, obtained previously, was inserted into 3 ml of 1 M NaOH. The fibers are washed with hydrochloric acid at 2M, then with distilled water. The poly(4-vinylpyridine-2,6-dicarboxylic acid) on the PVC-co-PDVC support was then recovered.

Example 9: Preparation of the Crosslinked Poly(dimethyl 4-vinylpyridine-2,6-dicarboxylate) Grafted onto the PET Support Dimethyl 4-vinylpyridine-2,6-dicarboxylate (1.5 mmol) is dissolved in a volume of 3 mL of an organic solvent (Acetonitrile), as well as 15 µmol of 1,3-divinylbenzene, $CuCl_2$ (0.15 µmol) is added to the solution along with 0.6 µmol of TPMA and 3 cm of copper wire (diameter 1 mm). A 2 cm by 1 cm plate of pre-grafted PET support is added to the solution. The reactor is left at room temperature for a time proportional to the thickness of the desired polymer layer (from a few hours to a few days). The plate is then washed with acetonitrile and then dried.

Example 10: Preparation of poly(dimethyl 4-vinylpyridine-2,6-dicarboxylate) with Blocks Grafted onto the PET Support Styrene (1 mL) is dissolved in 1 ml of sulfolane solvent. Copper(II) chloride (0.25 mg) is added to the solution, as well as 5 mg of Tri-(2-picolyl) amine and 1 cm of copper wire per milliliter of solution (D 1 mm). A pre-grafted PET plate is inserted. The reactor is closed and heated at 60° C. for 10 h with stirring. The PET plate polymerized with styrene is then washed with sulfolane then water and then acetone and dried.

Dimethyl 4-vinylpyridine-2,6-dicarboxylate (1.5 mmol) is dissolved in a volume of 3 ml of an organic solvent (Acetonitrile). $CuCl_2$ (0.15 µmol) is added to the solution as well as 0.6 µmol of TPMA and 3 cm of copper wire (diameter 1 mm), The PET plate polymerized with styrene is added to the solution. The reactor is left at room temperature for a time proportional to the thickness of the desired polymer layer (from a few hours to a few days). The plate is then washed with acetonitrile and then dried.

Example 11: Uranium Capture in Fresh Water

Poly(4-vinylpyridine-2,6-dicarboxylic acid) grafted on the PET support is put in a solution of uranyl nitrate $UO_2(NO_3)_2$ at 1 mM in 1 distilled water at neutral pH. After 5 minutes at room temperature, the modified support is removed, washed with water and examined under UV lamp (254 nm) for observation of fluorescence

Example 12: Uranium Capture in Simulated Seawater

Poly(4-vinylpyridine-2,6-dicarboxylic acid) grafted on the PVC-co-PVDC support (15 mg) to a degree of grafting of 40% is put in a solution of uranyl nitrate $UO_2(NO_3)_2$ at 1 mM in simulated seawater (initial pH: 8, initial ionic strength: 0.44) and at an. After 5 minutes at room temperature, the modified support is removed, washed with water and examined under UV lamp (254 nm) for observation of fluorescence. Uranium uptake is also verified by the disappearance of uranium in the solution seen by fluorescence.

Uranium uptake is more than 98% (detection limit).

Uranium uptake is also total in the case where the polymer grafted on a support has a degree of grafting of 175%, with an introduced mass of 3 mg.

The degree of grafting is the ratio between the mass of fibers gained during grafting, compared to the mass of non-grafted fibers.

The invention claimed is:
1. A composition comprising a polymer grafted covalently onto a support, said polymer having a degree of polymerization $n_p$, ranging from 2 to 10,000, and containing $n_p$ monomer units, said monomer units being:
  either monomer units derived from 4-vinylpyridine, in which the carbons in positions 2 and 6 can be substituted by one of the substituents of the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons,
  or monomer units derived from a co-monomer,
  provided that the two substituents cannot both be hydrogen,
  and provided that said monomer units derived from the 4-vinylpyridine represent at least 20% of the degree of polymerization $n_p$,
  said polymer being optionally complexed with a metal or a metal oxide,
  said polymer being linear or crosslinked,
  said polymer being irreversibly linked to a support.
2. The composition according to claim 1, comprising a polymer grafted onto a support, said polymer being selected from the group consisting of Formula I, Formula II and Formula III,

Formula I

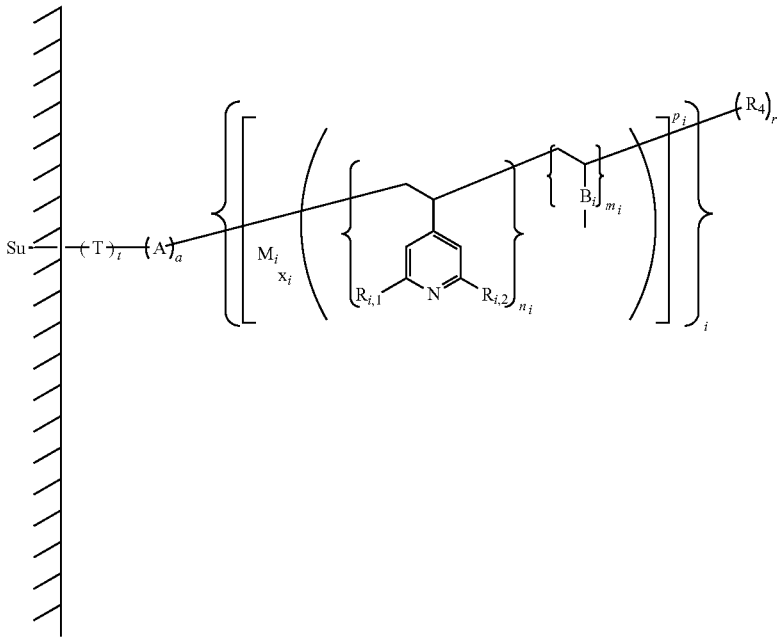

in which:

Su is the support on which the polymer is grafted,

A is derived from a polymerization initiator,

T is making the link between the support and the optional compound resulting from a polymerization initiator or between the support and the first monomer unit, $R_4$ is H when r is 0 or when r is 1 a moiety allowing the propagation of the polymerization, whether or not derived from said polymerization initiator, or allowing the termination of the polymerization, or a transfer agent, t, a and r are identical or different and are 0 or 1, i is a positive, indexed integer varying from 1 to $n_p$, $n_p$ being from 2 to 10,000, and for each i:

$R_{i,1}$ and $R_{i,2}$ are substituents chosen from the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, provided that when $R_{i,1}$ represents hydrogen, then $R_{i,2}$ is different from hydrogen, and vice versa, $B_i$ is a part of a monomer unit derived from a co-monomer when it is forming a crosslinking bridge, or a monomer unit derived from a co-monomer when it is not forming a crosslinking bridge, $M_i$ is a metallic cation, $n_i$ and $m_i$, are integers equal to 0 or 1, $n_i + m_i = 1$, $x_i$ is a number from 1 to 6, $p_i$ is the electrical charge of the metal complex ranging from −6 to +6, said polymer being linear when there is no $B_i$ forming a crosslinking bridge, said polymer being crosslinked when there is at least one $B_i$ forming crosslinking bridge between two linear polymers Formula II

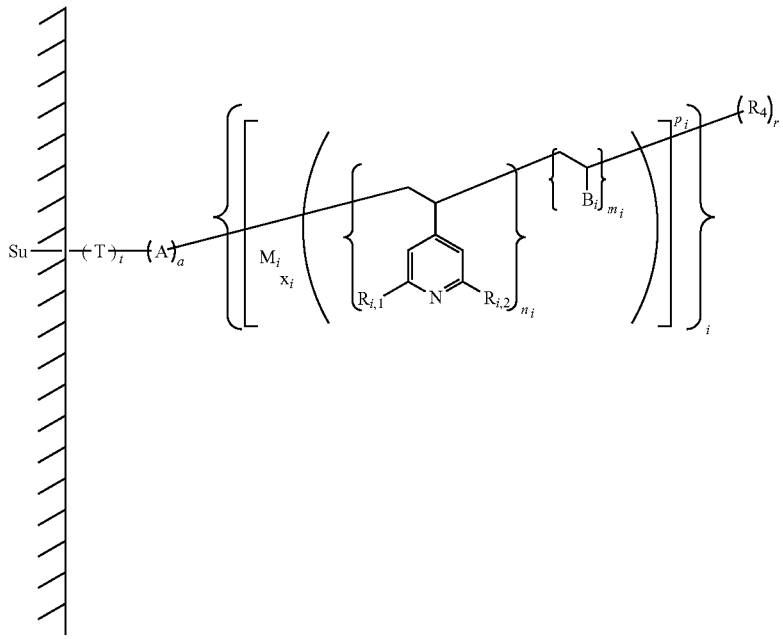

in which
the definitions of Su, $R_{i,1}$, $R_{i,2}$, T, A, $n_i$, $m_i$, $R_4$, $M_i$, t, a, r, $x_i$, $p_i$ and i are as described above,
$B_i$ is a part of a monomer unit derived from a co-monomer when it is forming a crosslinking bridge, or a monomer unit derived from a co-monomer when it is not forming a crosslinking bridge, Formula III

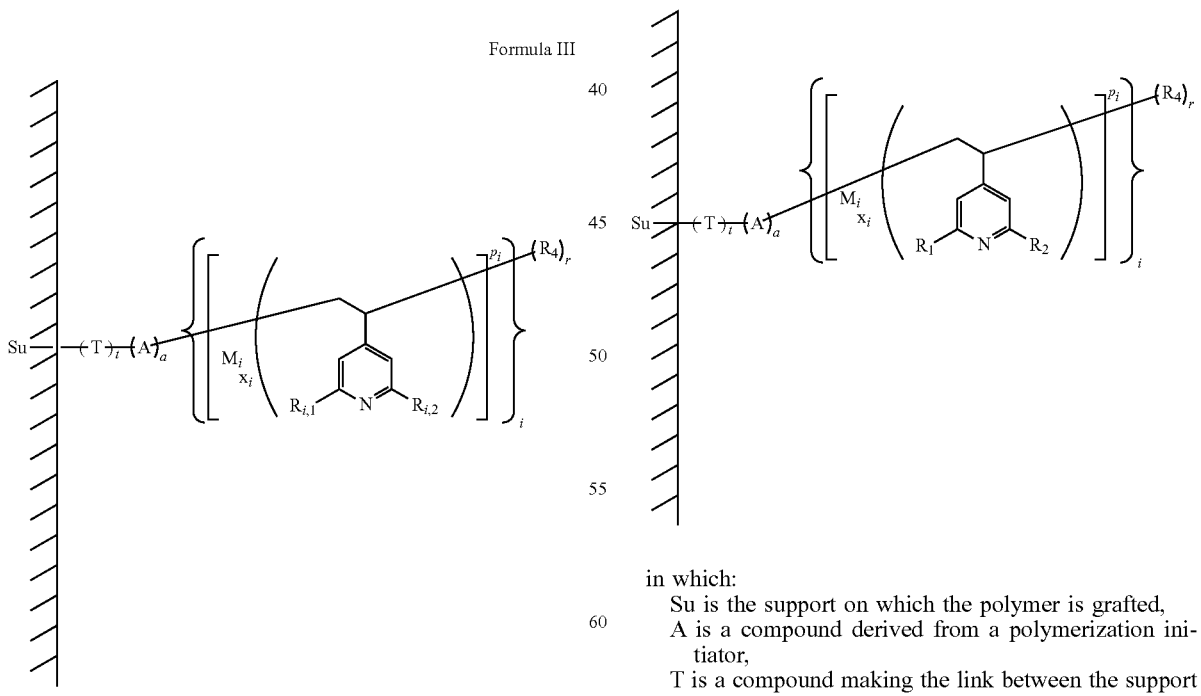

in which:
the definitions of Su, $R_{i,1}$, $R_{i,2}$, T, A, $R_4$, $M_i$, t, a, r, $x_i$, $p_i$ and i are as described above.

3. The composition according to claim 1, comprising a homopolymer grafted on a support, said polymer grafted on a support being of formula selected from the group consisting of Formula IV, Formula V, Formula VI, Formula XII and Formula XIII;

Formula IV in which:
Su is the support on which the polymer is grafted,
A is a compound derived from a polymerization initiator,
T is a compound making the link between the support and the optional compound resulting from a polymerization initiator or between the support and the first monomer unit,
$R_4$ is H when r is 0 or when r is 1 a moiety allowing the propagation of the polymerization, whether or not derived from said polymerization initiator, or allowing the termination of the polymerization, or a transfer agent, t, a and r are identical or different and are 0 or 1, i is a positive, indexed integer varying from 1 to n, n being from 2 to 10,000, and for each i:

$M_i$ is a metallic cation, $x_i$ is a number from 1 to 6, $p_i$ is the electrical charge of the metal complex ranging from −6 to +6, $R_1$ and $R_2$ are substituents chosen from the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, provided that when $R_i$ represents hydrogen, then $R_2$ is different from hydrogen, and vice versa;

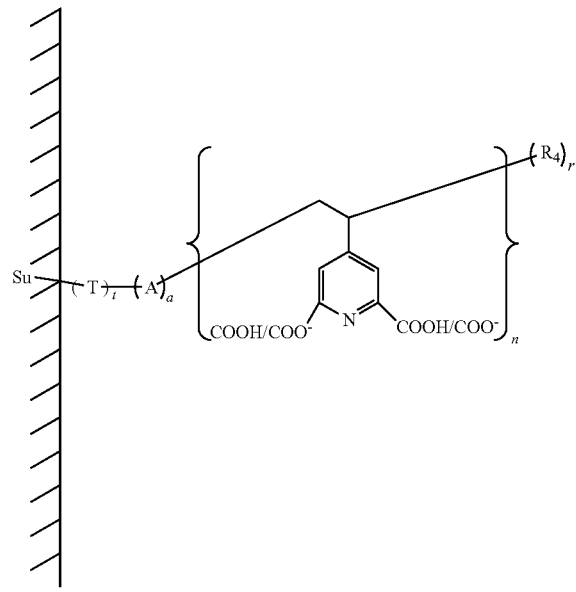

Formula VI in which:

the definitions of Su, T, A, $R_4$, t, a, and r are as described above;

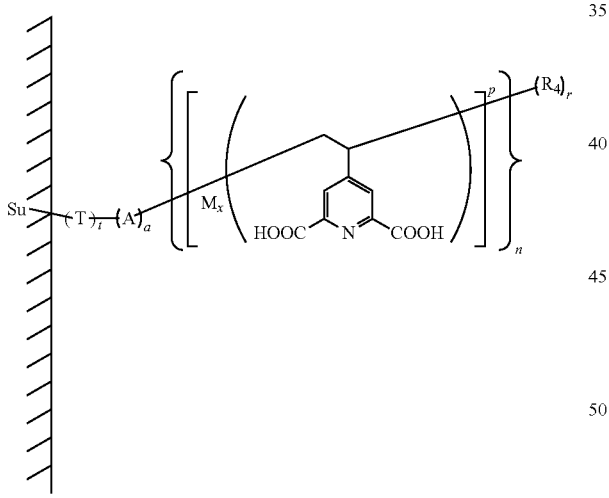

Formula V in which:

the definitions of Su, T, A, $R_4$, t, a, and r are as described above,

M is a metallic cation, x is a number comprised from 1 to 6, p is the electrical charge of the metal complex ranging from −6 to +6;

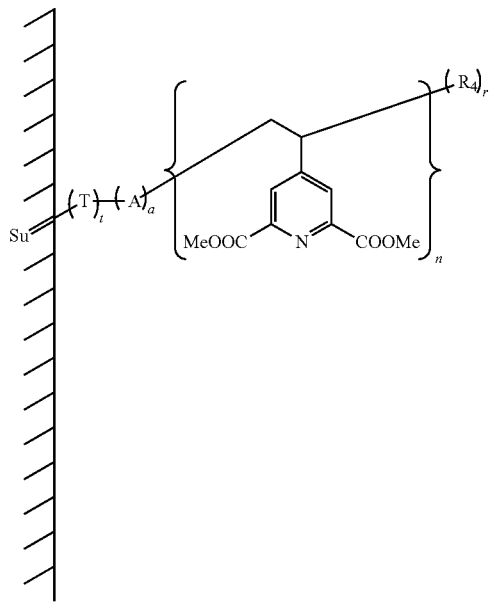

Formula XII in which:

the definitions of Su, T, A, $R_4$, t, a, and r are as described above;

Formula XIII

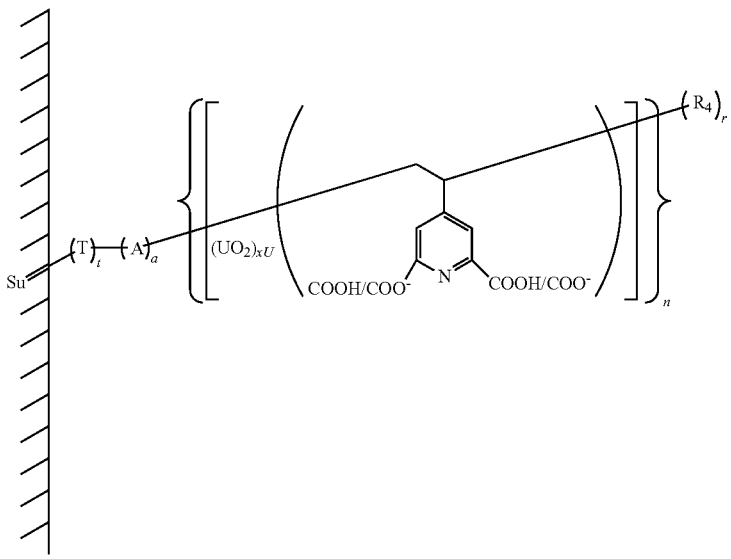

in which:
the definitions of Su, T, A, $R_4$, t, a, and r are as described above,
xU is a number comprised from 1 to 6.

4. The composition according to claim 1, comprising a polymer grafted on a support, said polymer having at least one monomer unit derived from a co-monomer,
or comprising a copolymer grafted on a support, in which the level of monomer unit derived from a co-monomer varies strictly from a value greater than 0% to a value less than 80%.

5. The composition according to claim 1, comprising of a two-block copolymer, grafted on a support, said polymer grafted on a support being of Formula XVIII or Formula XIX:

Formula XVIII

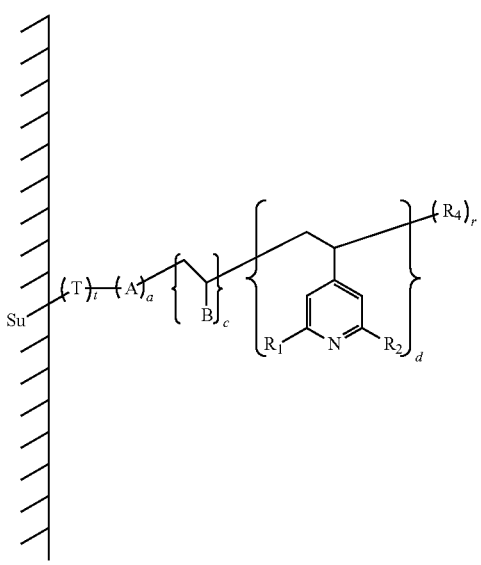

-continued

Formula XIX

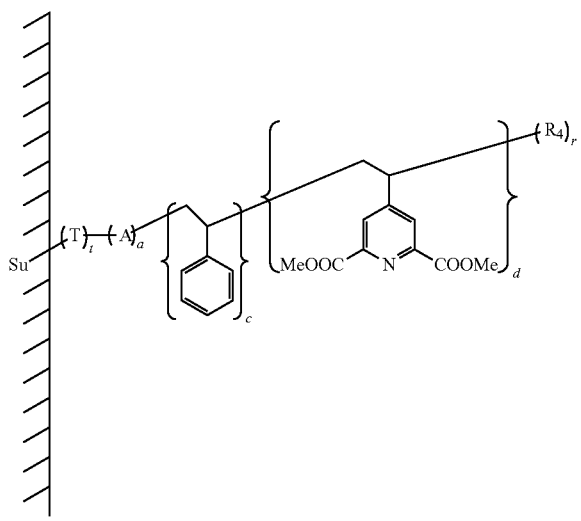

in which:
Su is the support on which the polymer is grafted,
A is a compound derived from a polymerization initiator,
T is a compound making the link between the support and the optional compound resulting from a polymerization initiator or between the support and the first monomer unit,
$R_4$ is H when r is 0 or when r is 1 a moiety allowing the propagation of the polymerization, whether or not derived from said polymerization initiator, or allowing the termination of the polymerization, or a transfer agent,
t, a and r are identical or different and are 0 or 1,
$R_1$ and $R_2$ are substituents chosen from the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms, provided that when $R_1$ represents hydrogen, then $R_2$ is different from hydrogen, and vice versa, B is a monomer unit derived from a co-monomer, d is the degree of polymerization of the block consisting of the monomer units derived from 4-vinylpyridine and d is an integer, c is the degree of polymerization of the block consisting of the monomer units derived from the co-monomer and c is an integer, d+c=n.

6. The composition according to claim 1, comprising a crosslinked copolymer grafted onto a support, said polymer grafted onto a support being of Formula XX or Formula XXI, Formula XX

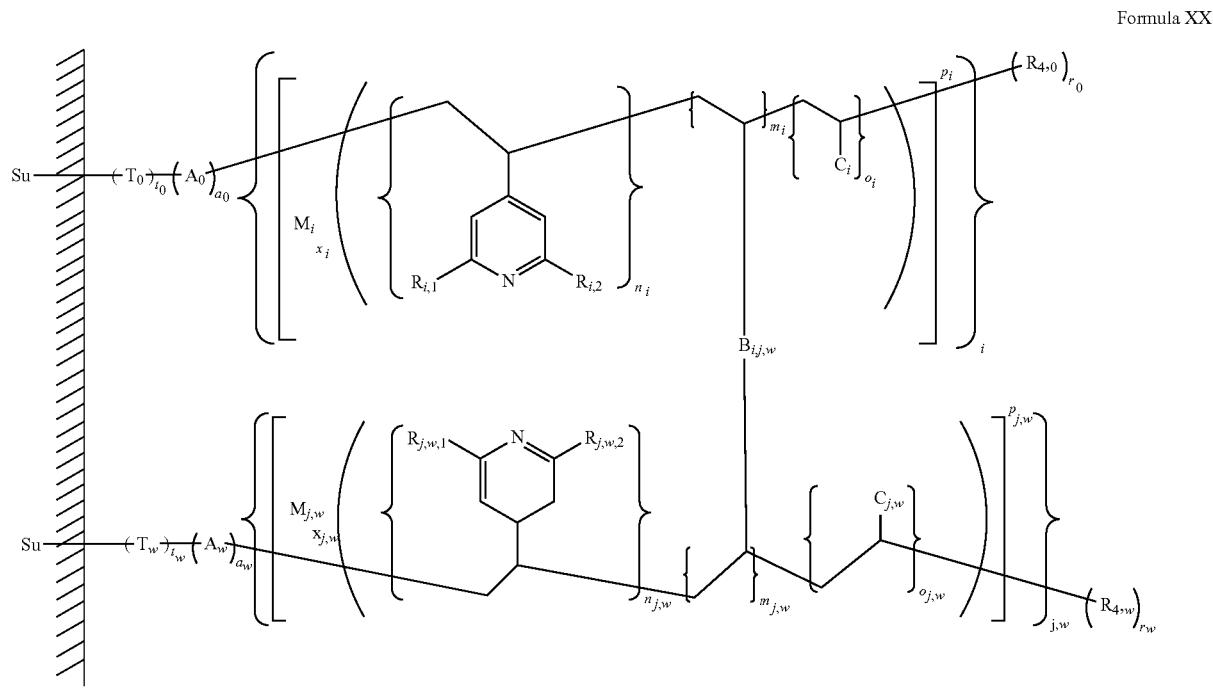

Formula XXI

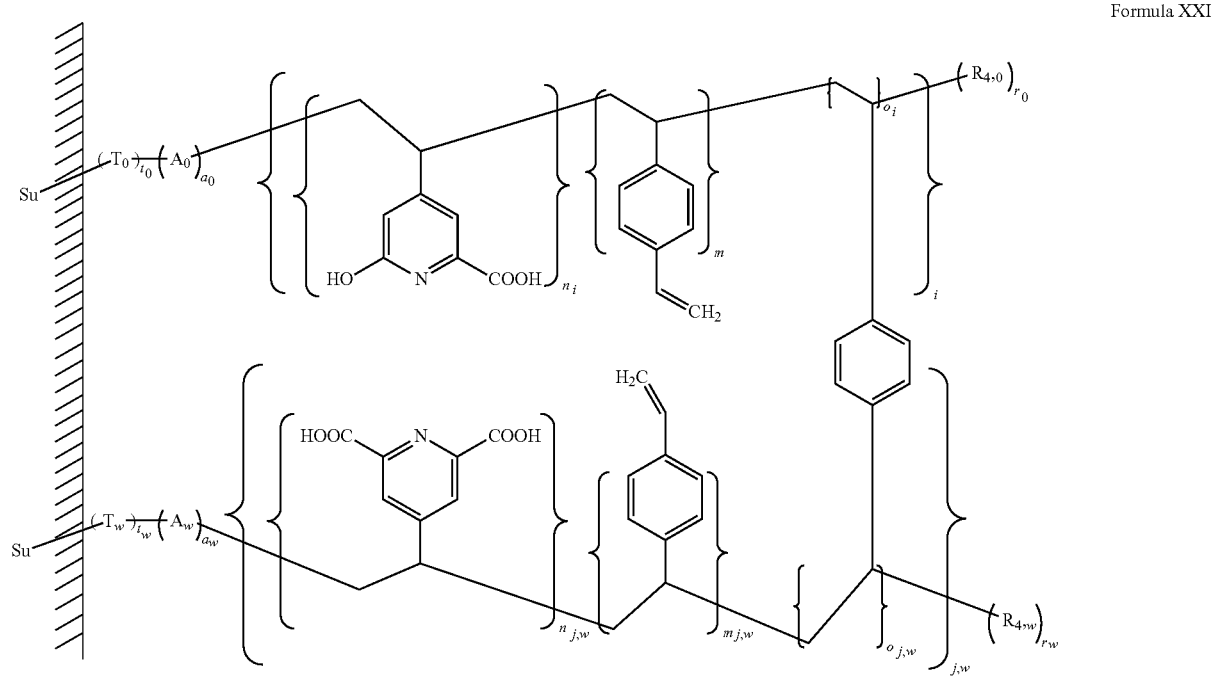

in which:
- Su is the support on which the polymers are fixed,
- w is a strictly positive, indexed whole number, varying from 1 to the number of polymers crosslinked with the polymer of index 0, and comprised from 1 to 1000,
- $A_0$ and the $A_w$ are compounds originating from polymerization initiators,
- $T_0$ and the $T_w$ are compounds making the link between the support and the possible compounds originating from polymerization initiators or between the support and the respective first monomer unit,
- $R_{4,0}$ and $R_{4,w}$, are H when $r_o$ or $r_w$ is zero and when $r_o$ or $r_w$ is 1 a moiety permitting the propagation of the polymerization, whether or not derived from said polymerization initiator, or allowing the termination of the polymerization, or a transfer agent,
- $t_0$, $a_0$, $r_0$, $t_w$, $a_w$ and the $r_w$ are the same or different and are 0 or 1,
- i and j, w are strictly positive, indexed integers, varying respectively from 1 to $n_i$, and from 1 to $n_{j,w}$, $n_i$ et $n_{j,w}$ being included from 1 to 9999,
- $n_i + n_{j,w} = n$, n being between 3 and 10,000, and for each i and each j, w:
- $R_{i,1}$, $R_{i,2}$, $R_{j,w,1}$ and $R_{j,w,2}$ are substituents chosen from the following group: hydrogen, alkene radical of 3 to 20 carbons, radical aryl of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, said substituents being able to be cyclized between them and which may contain sulfur or phosphorus atoms,
- provided that when $R_{i,1}$, represents hydrogen, then $R_{i,2}$ is different from hydrogen, and vice versa,
- provided that when $R_{j,w,1}$ represents hydrogen, then $R_{j,w,2}$ is different from hydrogen, and vice versa,
- $B_{i,j,w}$ is a monomer unit derived from a co-monomer, forming a crosslinking bridge between the polymer 0 in position i and the polymer of index w in position j,
- the $C_i$ and the $C_{j,w}$ are monomer units derived from a co-monomer which does not form a crosslinking bridge,
- $n_i$, $m_i$, $o_i$, $n_{j,w}$, $m_{j,w}$, and the $o_{j,w}$, are integers equal to 0 or 1,
- $n_i + m_i + o_i = 1$,
- $n_{j,w} + m_{j,w} + o_{j,w} = 1$
- the sum of the $o_{j,w}$, is non-zero, and the sum of $o_i$ is non-zero.

7. The composition according to claim 1, comprising a polymer grafted on a support in which said polymer grafted on a support is complexed with a metal chosen from actinides, lanthanides or transition metals, or with uranium.

8. The composition according to claim 1, comprising a polymer grafted on a support, said polymer grafted on a support being solvated in aqueous solution;
or said polymer grafted on a support being complexed with a metal, and being solvated or not in aqueous solution;
or said polymer grafted on a support being solvated in aqueous solution not complexed with a metal and non-solvated in solution complexed with a metal;
or said polymer grafted on a support being solvated or in organic solvents.

9. A method for preparing a polymer grafted covalently or not covalently to a support,
said polymer having a degree of polymerization n, ranging from 2 to 10,000, and containing n monomer units,
said monomer units being:
either monomer units derived from 4-vinylpyridine, in which the carbons in positions 2 and 6 can be substituted by one of the substituents of the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, said substituents can be cyclized with each other and contain sulfur or phosphorus atoms,
or monomer units derived from a co-monomer,
provided that the two substituents cannot both be hydrogen,
and provided that said monomer units derived from the 4-vinylpyridine represent at least 20% of the degree of polymerization n,
said polymer being optionally complexed with a metal or a metal oxide,
said polymer being linear or crosslinked,
said polymer being irreversibly linked to a support,
comprising the following preparation steps:
a. optionally a step of pretreatment of the support by bringing said support into contact with a pretreatment reagent and/or a physical pretreatment, in order to obtain a support that may be pretreated,
b. optionally a pre-grafting step on the support which may be pretreated by bringing said support, which may be pretreated, into contact with a polymerization initiator, in order to obtain a support which may be pretreated and optionally pre-grafted,
c. a radical polymerization step starting with the initiation of the support, if necessary pretreated and optionally pre-grafted into contact with, then continuing by bringing the support optionally pretreated and optionally pre-grafted with:
at least one monomer derived from 4-vinylpyridine in which the carbons in positions 2 and 6 can be substituted by one of the substituents of the following group: hydrogen, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, said substituents being able to be cyclized with one another and optionally containing sulfur or phosphorus atoms,
and optionally at least one co-monomer,
with or without crosslinking,
to obtain a polymer grafted onto the support,
optionally said radical polymerization step is a polymerization of NMP, RAFT, ATRP or or a conventional radical polymerization,
d. an optional modification step by bringing the polymer grafted onto the support into contact with a reagent to modify at least one of the above-mentioned substituents, to obtain a polymer grafted onto the support and optionally modified,
e. an optional complexation step by bringing the polymer grafted onto the support and optionally modified into contact with a metal cation to obtain a polymer grafted onto the support, optionally modified and optionally complexed.

10. The method according to claim 9, for preparing a polymer grafted on a support, said polymer grafted on a support being of Formula I,

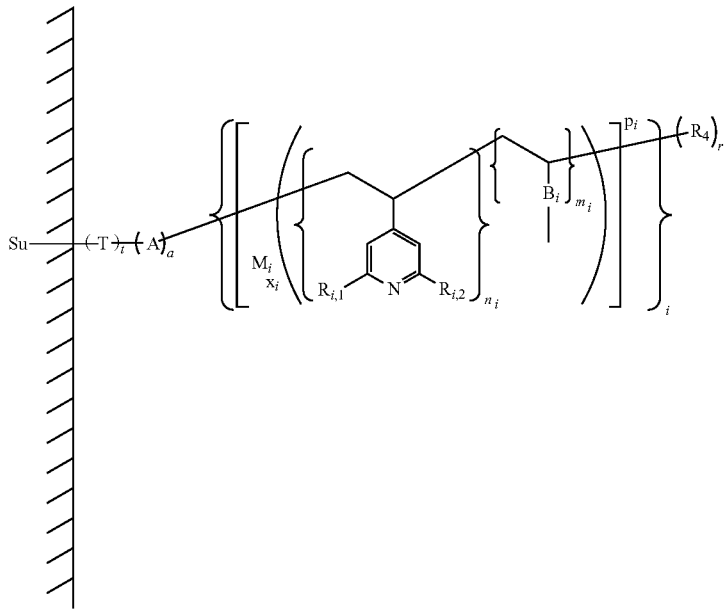

Formula I in which:
- Su is the support on which the polymer is grafted,
- A is a compound derived from a polymerization initiator,
- T is a compound making the link between the support and the optional compound resulting from a polymerization initiator or between the support and the first monomer unit,
- $R_4$ is H when r is 0 or when r is 1 a moiety allowing the propagation of the polymerization, whether or not derived from said polymerization initiator, or allowing the termination of the polymerization, or a transfer agent,
- t, a and r are identical or different and are 0 or 1,
- i is a strictly positive, indexed integer varying from 1 to n, n being from 2 to 10,000, and for each i:
- $R_{i,1}$ and $R_{i,2}$ are substituents chosen from the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms,
- provided that when $R_{i,1}$ represents hydrogen, then $R_{i,2}$ is different from hydrogen, and vice versa,
- $B_i$ is a part of a monomer unit derived from a co-monomer when it is forming a crosslinking bridge, or a monomer unit derived from a co-monomer when it is not forming a crosslinking bridge,
- $M_i$ is a metallic cation,
- $n_i$ and $m_i$ are integers equal to 0 or 1,
- $n_i + m_i = 1$,
- $x_i$ is a number from 0 to 6,
- $p_i$ is the electrical charge of the metal complex ranging from $-6$ to $+6$, said polymer being linear when there is no $B_i$ forming a crosslinking bridge, said polymer being crosslinked when there is at least one $B_i$ forming crosslinking bridge between two linear polymers, said method comprising:
a. optionally a step of pretreatment of the support by bringing said support into contact with a pretreatment reagent and/or by the action of a physical pretreatment on said support, in order to obtain a support that may be pretreated with Formula XXXI,

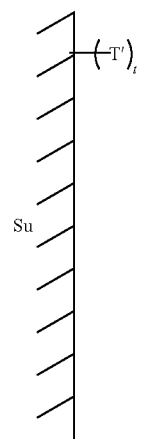

Formula XXXI in which
T' is a compound resulting from the pretreatment of the support Su, containing fragments either of the support, or of the pretreatment reagent, or of both,
t is an integer equal to 0 or 1,
b. optionally a step of pre-grafting onto the optionally pretreated support of Formula XXXI by bringing the support into contact with a polymerization initiator, in order to obtain a support that is optionally pretreated and optionally pre-grafted of Formula XXXII, Formula XXXII

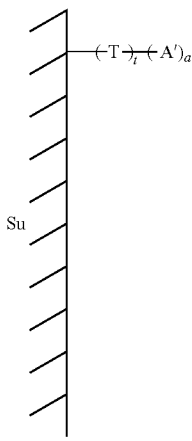

in which
A' is a compound resulting from the pre-grafting step on the support, containing fragments of the polymerization initiator,
a is an integer equal to 0 or 1,
c. a radical polymerization step starting with the priming of the optionally pretreated and optionally pre-grafted support of Formula XXXII followed by the contacting of the optionally pretreated and optionally pre-grafted support with the 4-vinylpyridine derivative of Formula XXXIII, Formula XXXIII

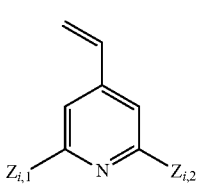

in which:
$Z_{i,1}$ and $Z_{i,2}$ are substituents chosen from the following group: hydrogen, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms,
said polymerization step being carried out:
optionally with at least one co-monomer,
with or without crosslinking,
to obtain a polymer grafted on a support of Formula XXXIV Formula XXXIV

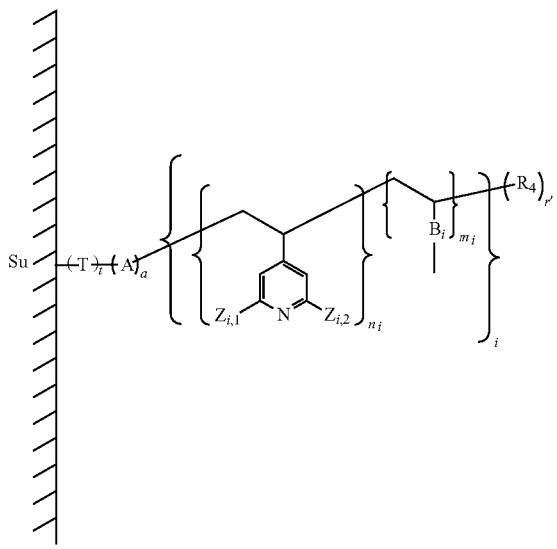

d. a modification step, when at least one of the $Z_{i,1}$ is different from $R_{i,1}$ or when at least one of the $Z_{i,2}$ is different from $R_{i,2}$, of the said polymer Formula XXXIV with a reagent for modifying at least one of the above substituents $Z_{i,1}$ and $Z_{i,2}$, said reagent containing a hydroxide, carbonate or phosphate anion, in order to obtain the polymer grafted on a support of Formula XXXV Formula XXXV

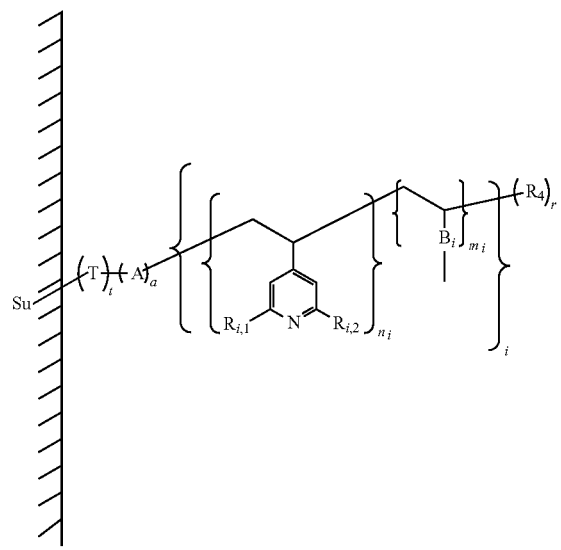

e. optionally a complexing step of said polymer grafted on a support of Formula XXXV with at least one metal cation to obtain the polymer grafted on a support of Formula I.

11. The method according to claim 9, for preparing a polymer grafted on a support said polymer being of Formula II with t=1 and a=1, Formula II

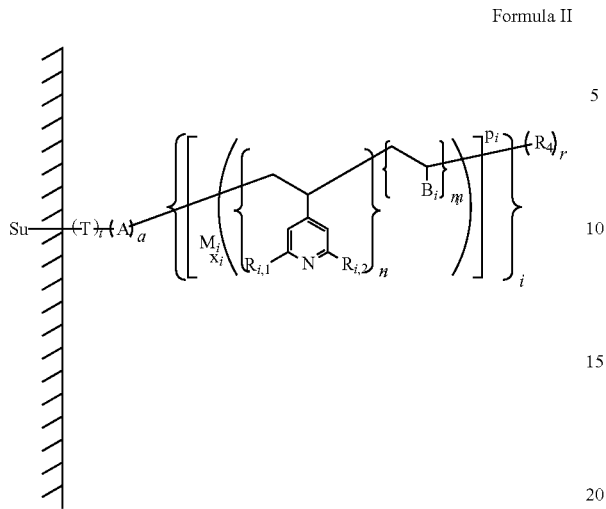

in which
- Su is the support on which the polymer is grafted,
- A is a compound derived from a polymerization initiator,
- T is a compound making the link between the support and the optional compound resulting from a polymerization initiator or between the support and the first monomer unit,
- $R_4$ is H when r is 0 or when r is 1 a moiety allowing the propagation of the polymerization, whether or not derived from said polymerization initiator, or allowing the termination of the polymerization, or a transfer agent,
- r is 0 or 1,
- i is a strictly positive, indexed integer varying from 1 to n, $n_p$ being from 2 to 10,000,
- and for each i:
  - $R_{i,1}$ and $R_{i,2}$ are substituents chosen from the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms, provided that when $R_{i,1}$ represents hydrogen, then $R_{i,2}$ is different from hydrogen, and vice versa,
  - $M_i$ is a metallic cation,
  - $n_i$ and $m_i$, are integers equal to 0 or 1,
  - $n_i+m_i=1$,
  - $x_i$ is a number from 0 to 6,
  - $p_i$ is the electrical charge of the metal complex ranging from −6 to +6,
  - $B_i$ is a monomer unit derived from a co-monomer, not forming a crosslinking bridge, said method comprising:
a. a step of pretreatment of the support by bringing the support into contact with a pretreatment reagent and/or by the action of a physical pretreatment on said support, in order to obtain a pretreated support of Formula XXXVIII, Formula XXXVIII in which:
- T' is a compound resulting from the pretreatment of the support Su, containing fragments either of the support, or of the pretreatment reagent, or of both, b. a step of pre-grafting said pretreated support of Formula XXXVIII by bringing it into contact with a polymerization initiator, in order to obtain a pretreated and pre-grafted support of Formula XLII

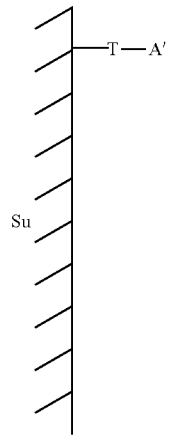

Formula XLII in which:
- A' is a compound resulting from the pre-grafting step on the support, containing fragments of the polymerization initiator, c. a radical polymerization step starting with the priming of the pretreated and pre-grafted support of Formula XLII followed by bringing the pretreated and pre-grafted support into contact with the 4-vinylpyridine derivative of Formula XXXIII and optionally with at least one co-monomer to obtain a polymer grafted on a support of Formula XLIII Formula XLIII

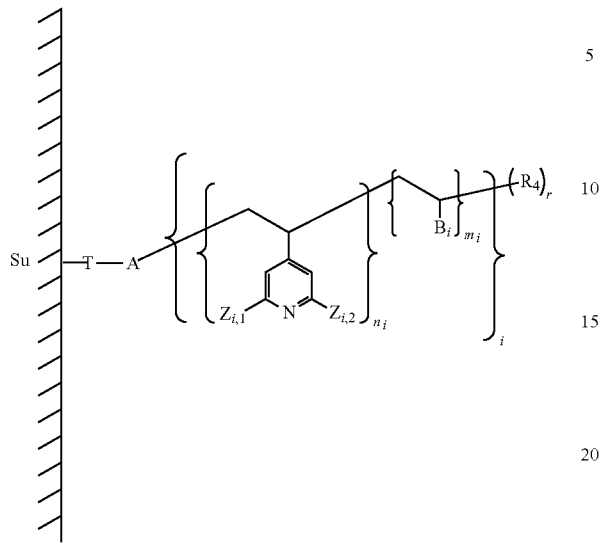

in which:
the definitions of A, $R_4$, $B_i$, $n_i$, $m_i$, r and i are as described above in Formula II,
$Z_{i,1}$ and $Z_{i,2}$ are substituents chosen from the following group: hydrogen, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms, d. a modification step, when at least one of the $Z_{i,1}$ is different from $R_{i,1}$ or when at least one of the $Z_{i,2}$ is different from $R_{i,2}$ of said polymer grafted on a support of Formula XLIII with a reagent for modifying at least one of $Z_{i,1}$ or $Z_{i,2}$ said reagent containing a hydroxide, carbonate or phosphate anion, to obtain the polymer grafted on a support of Formula XLIV Formula XLIV

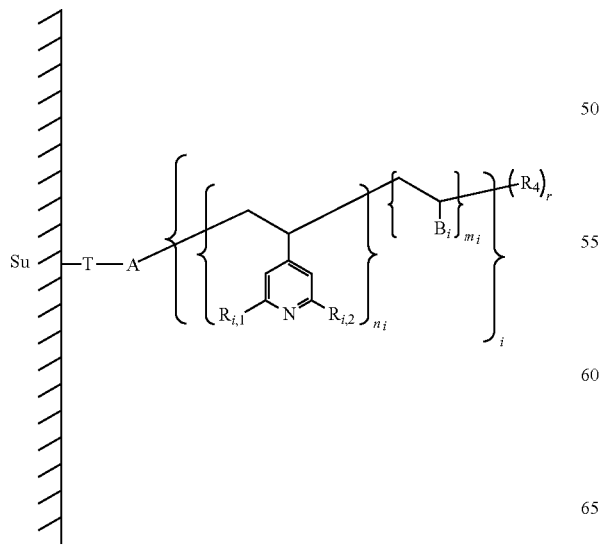

e. optionally a complexing step of said polymer grafted on a support of Formula XLIV with at least one metal cation to obtain the polymer grafted on a support of Formula II, in which t=1 and a=1;
or said polymer grafted on a support being of Formula II with t=0 and a=0,
said method comprising neither a pretreatment step nor a priming step and comprising
a. a radical polymerization step starting with the priming of the support and followed by bringing the support into contact with the 4-vinylpyridine derivative of Formula XXXIII, and optionally with at least one co-monomer, with or without crosslinking, for obtain a polymer grafted onto a support of Formula XLV Formula XLV

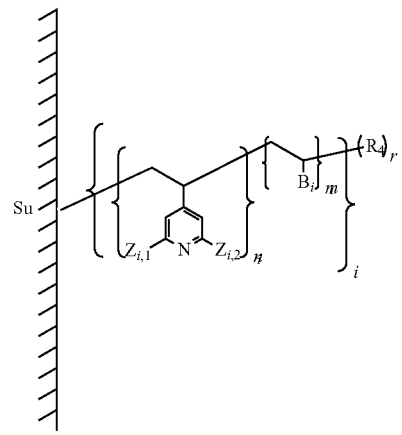

in which:
the definitions of Su, $R_4$, $B_i$, $n_i$, $m_i$, r and i are as described above,
the definitions of $Z_{i,1}$ and $Z_{i,2}$ are as described above,
b. a modification step, when at least one of $Z_{i,1}$ is different from $R_{i,1}$ or when at least one of $Z_{i,2}$ is different from $R_{i,2}$, of said polymer grafted on a support of Formula XLV with a reagent to modify at least one of $Z_{i,1}$ or $Z_{i,2}$ said reagent containing a hydroxide, carbonate or phosphate anion, to obtain the polymer grafted on a support of Formula XLVI, Formula XLVI

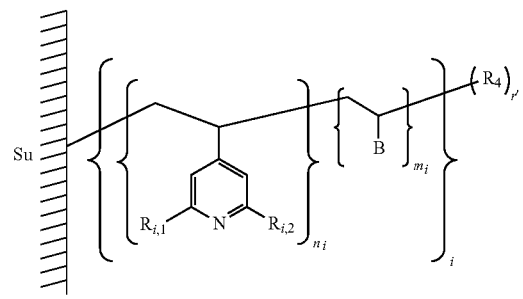

c. optionally a complexing step of said polymer grafted on a support of Formula XLVI with at least one metal cation to obtain the polymer grafted on a support of Formula II with t=0 and a=0.

12. The method according to claim 9, for preparing a polymer grafted on a support, said polymer being of Formula IV with t=1 and a=1,

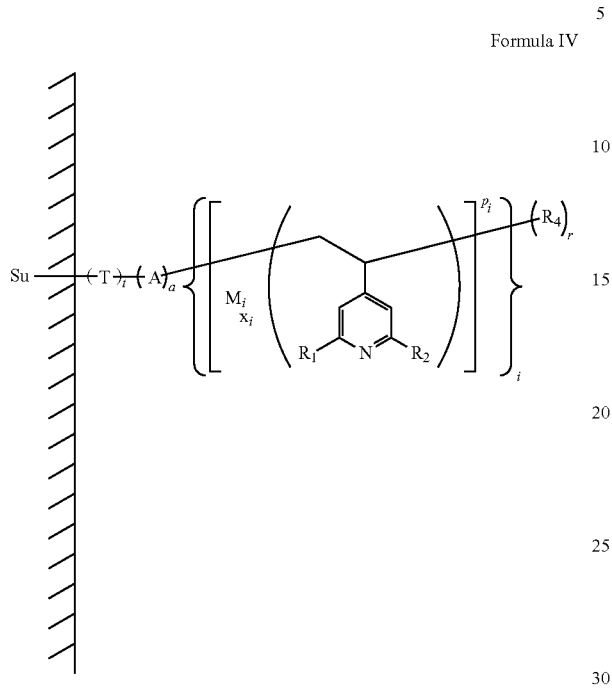

Formula IV in which:
Su is the support on which the polymer is grafted,
A is a compound derived from a polymerization initiator,
T is a compound making the link between the support and the optional compound resulting from a polymerization initiator or between the support and the first monomer unit,
$R_4$ is H when r is 0 or when r is 1 a moiety allowing the propagation of the polymerization, whether or not derived from said polymerization initiator, or allowing the termination of the polymerization, or a transfer agent,
r is 0 or 1,
i is a strictly positive, indexed integer varying from 1 to n, n being from 2 to 10,000,
and for each i:
$M_i$ is a metallic cation,
$x_i$ is a number from 0 to 6,
$p_i$ is the electrical charge of the metal complex ranging from −6 to +6,
$R_1$ and $R_2$ are substituents chosen from the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms,
provided that when $R_1$ represents hydrogen, then $R_2$ is different from hydrogen, and vice versa;
said method comprising:
a. a step of pretreatment of the support by bringing the support into contact with a pretreatment reagent and/or by the action of a physical pretreatment on said support, in order to obtain a pretreated support of Formula XXXVIII,

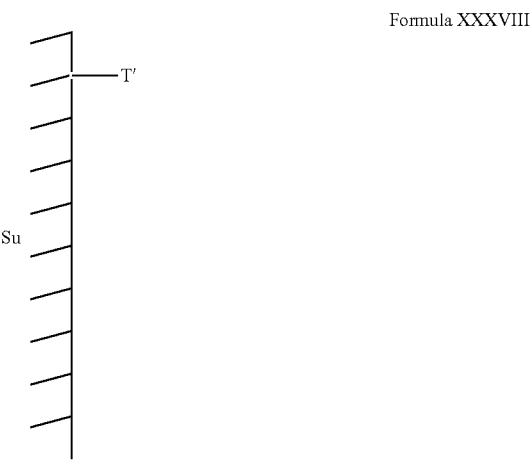

Formula XXXVIII in which
T' is a compound resulting from the pretreatment of the support Su, containing fragments either of the support, or of the pretreatment reagent, or of both, b. a step of pre-grafting the pretreated support of Formula XXXVIII by bringing it into contact with a polymerization initiator, to obtain a pretreated support and pre-grafting of Formula XLII,

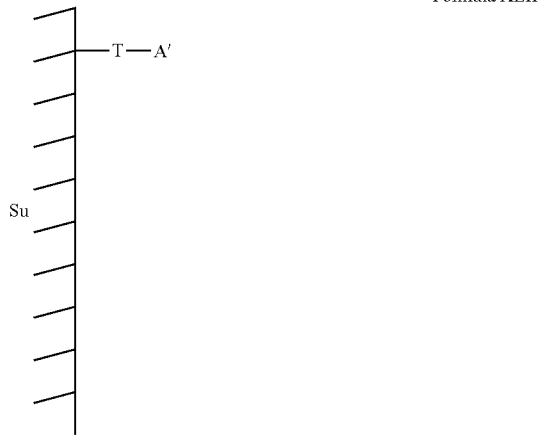

Formula XLII in which:
A' is a compound resulting from the pre-grafting step on the support, containing fragments of the polymerization initiator, c. a radical polymerization step, starting with priming the pretreated and pre-grafted support of Formula XLII, followed by bringing the pretreated and pre-grafted support into contact with the 4-vinylpyridine derivative of Formula XLIX,

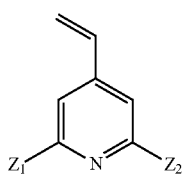

Formula XLIX in which:

$Z_1$ and $Z_2$ are substituents chosen from the following group: hydrogen, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents optionally being cyclized with one another and optionally containing sulfur or phosphorus atoms, to obtain a polymer grafted on a support of Formula L

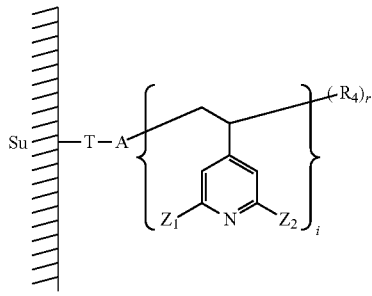

in which:

the definitions of T and A are as described above, $R_4$ is H when r is 0 or when r is 1 a moiety allowing the propagation of the polymerization, whether or not derived from said polymerization initiator, or allowing the termination of the polymerization, or a transfer agent, r is 0 or 1, i is a positive, indexed integer varying from 1 to n, n being from 2 to 10,000;

d. a modification step, when $Z_1$ is different from $R_1$ or when $Z_2$ is different from $R_2$, of said polymer grafted on a support of Formula L with a reagent to modify at least one of the above substituents $Z_1$ and $Z_2$, and containing a hydroxide anion, carbonate or phosphate, to obtain the polymer grafted on a support of Formula LI,

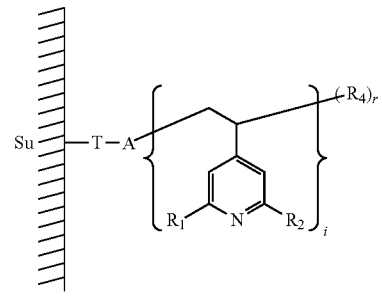

Formula LI e. optionally a step of complexing said polymer grafted on a support of Formula LI with at least one metal cation to obtain the polymer grafted on a support of Formula IV in which t=1 and a=1.

13. The method according to claim 9, for preparing a polymer grafted on a support in which the said polymerization step bringing into contact a 4-vinylpyridine derivative of Formula XLIX

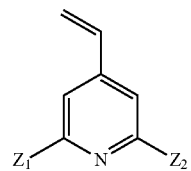

Formula XLIX in which:

$Z_1$ and $Z_2$ are substituents chosen from the following group: hydrogen, alkene radical of 1 to 20 carbons, aryl radical of 1 to 20 carbons, alcohol of 1 to 20 carbons, ether of 1 to 20 carbons, ester of I to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms with a polymer grafted on a support of Formula LX,

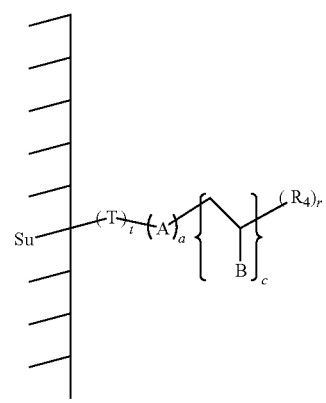

Formula LX in which:

Su is the support on which the polymer is grafted,

A is a compound derived from a polymerization initiator,

T is a compound making the link between the support and the optional compound resulting from a polymerization initiator or between the support and the first monomer unit, $R_4$ is H when r is 0 or when r is 1 a moiety allowing the propagation of the polymerization, whether or not derived from said polymerization initiator, or allowing the termination of the polymerization, or a transfer agent, t, a and r are identical or different and are 0 or 1, B is a monomer unit derived from a co-monomer, c is the degree of polymerization of the block consisting of the monomer units derived from the co-monomer and c is an integer, to obtain a polymer grafted onto a support of Formula LXI, Formula LXI

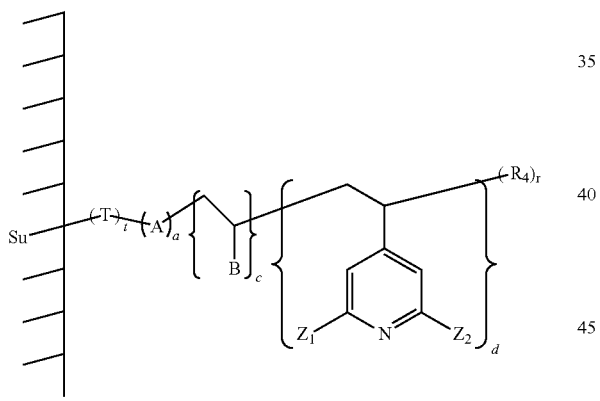

in which:

d is the degree of polymerization of the block consisting of the monomer units derived from 4-vinylpyridine and d is an integer, d+c=n;

or comprising:

a. a step of pretreatment of the support by bringing said support into contact with a pretreatment reagent and/or by the action of a physical pretreatment on said support, in order to obtain a pretreated support of Formula XXXI, Formula XXXI

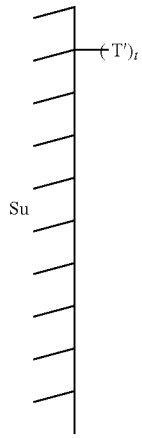

in which

T' is a compound resulting from the pretreatment of the support Su, containing fragments either of the support, or of the pretreatment reagent, or of both, b. a step of pre-grafting said pretreated support of Formula XXXI by bringing it into contact with a polymerization initiator, in order to obtain a pretreated and pre-grafted support of Formula XXXII;

Formula XXXII

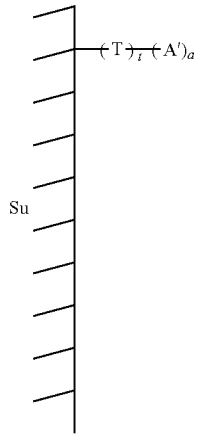

in which

A' is a compound resulting from the pre-grafting step on the support, containing fragments of the polymerization initiator, c. a radical polymerization step by bringing the pretreated and pre-grafted support of Formula XXXII into contact with a co-monomer of Formula LXII to obtain said free polymer of Formula LX Formula LXII

in which the definition of B is as described above, before the radical polymerization step by bringing a monomer derived from 4-vinylpyridine of Formula XXXIII into contact with a polymer grafted onto a support of Formula LX,

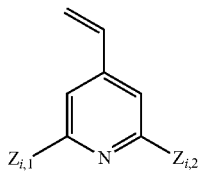

Formula XXXIII in which:

$Z_{i,1}$ and $Z_{i,2}$ are substituents chosen from the following group: hydrogen, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, the said substituents being able to be cyclized with one another and optionally containing sulfur or phosphorus atoms.

14. A method of fighting counterfeiting, comprising a step of labeling of organic and/or inorganic surfaces or luxury products with a composition comprising a polymer grafted covalently or not covalently onto a support, said polymer having a degree of polymerization n, ranging from 2 to 10,000, and containing n monomer units, said monomer units being:

either monomer units derived from 4-vinylpyridine, in which the carbons in positions 2 and 6 can be substituted by one of the substituents of the following group: hydrogen, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons other than heterocycles, amide of 1 to 20 carbons, thiols of 1 to 20 carbons, phosphine of 1 to 20 carbons, said substituents can be cyclized with each other and contain sulfur or phosphorus atoms, or monomer units derived from a co-monomer, provided that the two substituents cannot both be hydrogen, and provided that said monomer units derived from the 4-vinylpyridine represent at least 20% of the degree of polymerization n, said polymer being optionally complexed with a metal or a metal oxide, said polymer being linear or crosslinked, said polymer being irreversibly linked to a support.

* * * * *